(12) United States Patent
Bales et al.

(10) Patent No.: US 8,255,818 B2
(45) Date of Patent: Aug. 28, 2012

(54) SYSTEM AND METHOD FOR PROVIDING DRAG AND DROP FUNCTIONALITY IN A COMMUNITIES FRAMEWORK

(75) Inventors: Christopher E. Bales, Boulder, CO (US); Charles Coates, Erie, CO (US)

(73) Assignee: Oracle International Corporation, Redwood Shores, CA (US)

( * ) Notice: Subject to any disclaimer, the term of this patent is extended or adjusted under 35 U.S.C. 154(b) by 285 days.

(21) Appl. No.: 11/371,767

(22) Filed: Mar. 9, 2006

(65) Prior Publication Data

US 2007/0113194 A1    May 17, 2007

Related U.S. Application Data

(60) Provisional application No. 60/737,621, filed on Nov. 17, 2005, provisional application No. 60/742,186, filed on Dec. 2, 2005.

(51) Int. Cl.
  G06F 3/048 (2006.01)
  G06F 3/00 (2006.01)
  G06T 11/20 (2006.01)
  G06T 5/00 (2006.01)

(52) U.S. Cl. ........ 715/769; 715/810; 715/764; 715/751; 715/742; 345/440; 345/629

(58) Field of Classification Search .................. 715/769, 715/764, 751, 742, 810; 345/329, 348, 500
See application file for complete search history.

(56) References Cited

U.S. PATENT DOCUMENTS

| | | | |
|---|---|---|---|
| 5,321,841 A | 6/1994 | East et al. |
| 5,446,842 A | 8/1995 | Schaffer et al. |
| 5,463,555 A | 10/1995 | Ward et al. |
| 5,471,629 A | 11/1995 | Risch |
| 5,530,861 A | 6/1996 | Diamant et al. |
| 5,630,069 A | 5/1997 | Flores et al. |

(Continued)

FOREIGN PATENT DOCUMENTS

WO    2005/114383    12/2005

OTHER PUBLICATIONS

Thomas Meyer, Usability for component-based portals, published Jun. 1, 2002, published IBM.com, pp. 1.*

(Continued)

*Primary Examiner* — Mark Rinehart
*Assistant Examiner* — Erik Stitt
(74) *Attorney, Agent, or Firm* — Fliesler Meyer LLP

(57) ABSTRACT

A community accessible via a portal can be provided for maintaining user membership in a collaborative computing environment. Collaboration resources can be displayed on the portal page. Drag and drop functionality can be provided, which enables a community member to drag drop some resource into a target area, thereby causing a computer to execute an action upon the drop. A drag and drop tag library can be provided for allowing a developer to add this functionality to selected resources. For example, a draggable resource tag can be used by the developer to specify the resource displayed on the portal page, that is to be selected and dragged by a user. A resource drop zone tag can specify a particular area on the portal page into which the draggable resource will be dropped. The action can be a Javascript function call, a form or a page flow action initiated upon the drop.

19 Claims, 29 Drawing Sheets

U.S. PATENT DOCUMENTS

| | | | |
|---|---|---|---|
| 5,634,127 A | 5/1997 | Cloud et al. | |
| 5,694,563 A * | 12/1997 | Belfiore et al. | 715/821 |
| 5,704,017 A | 12/1997 | Heckerman et al. | |
| 5,748,975 A | 5/1998 | Van De Vanter | |
| 5,812,793 A | 9/1998 | Shakib et al. | |
| 5,835,769 A | 11/1998 | Jervis et al. | |
| 5,835,911 A | 11/1998 | Nakagawa et al. | |
| 5,836,014 A | 11/1998 | Faiman, Jr. | |
| 5,848,424 A | 12/1998 | Scheinkman et al. | |
| 5,877,765 A * | 3/1999 | Dickman et al. | 715/738 |
| 5,913,061 A | 6/1999 | Gupta et al. | |
| 5,926,798 A | 7/1999 | Carter | |
| 5,931,900 A | 8/1999 | Notani et al. | |
| 5,941,945 A | 8/1999 | Aditham et al. | |
| 5,960,404 A | 9/1999 | Chaar et al. | |
| 5,961,593 A | 10/1999 | Gabber et al. | |
| 5,983,214 A | 11/1999 | Lang et al. | |
| 5,995,945 A | 11/1999 | Notani et al. | |
| 6,002,402 A * | 12/1999 | Schacher | 715/810 |
| 6,018,716 A | 1/2000 | Denardo et al. | |
| 6,044,217 A | 3/2000 | Brealey et al. | |
| 6,052,684 A | 4/2000 | Du | |
| 6,055,543 A | 4/2000 | Christensen et al. | |
| 6,064,980 A | 5/2000 | Jacobi et al. | |
| 6,067,623 A | 5/2000 | Blakley, III et al. | |
| 6,073,109 A | 6/2000 | Flores et al. | |
| 6,073,138 A | 6/2000 | de l'Etraz et al. | |
| 6,088,679 A | 7/2000 | Barkley | |
| 6,098,054 A | 8/2000 | McCollom et al. | |
| 6,119,149 A | 9/2000 | Notani | |
| 6,122,666 A | 9/2000 | Beurket et al. | |
| 6,151,583 A | 11/2000 | Ohmura et al. | |
| 6,157,915 A | 12/2000 | Bhaskaran et al. | |
| 6,192,405 B1 | 2/2001 | Bunnell | |
| 6,212,548 B1 | 4/2001 | De Simone et al. | |
| 6,226,675 B1 | 5/2001 | Meltzer et al. | |
| 6,230,287 B1 | 5/2001 | Pinard et al. | |
| 6,233,591 B1 * | 5/2001 | Sherman et al. | 715/205 |
| 6,249,869 B1 | 6/2001 | Drupsteen et al. | |
| 6,330,569 B1 | 12/2001 | Baisley et al. | |
| 6,338,064 B1 | 1/2002 | Ault et al. | |
| 6,353,923 B1 | 3/2002 | Bogel et al. | |
| 6,393,456 B1 | 5/2002 | Ambler et al. | |
| 6,401,111 B1 | 6/2002 | Dan et al. | |
| 6,415,334 B1 | 7/2002 | Kanamori | |
| 6,457,076 B1 | 9/2002 | Cheng et al. | |
| 6,493,006 B1 | 12/2002 | Gourdol et al. | |
| 6,523,027 B1 | 2/2003 | Underwood | |
| 6,539,404 B1 | 3/2003 | Ouchi | |
| 6,550,054 B1 | 4/2003 | Stefaniak | |
| 6,572,660 B1 * | 6/2003 | Okamoto | 715/272 |
| 6,578,046 B2 | 6/2003 | Chang et al. | |
| 6,594,693 B1 | 7/2003 | Borwankar | |
| 6,604,198 B1 | 8/2003 | Beckman et al. | |
| 6,640,249 B1 | 10/2003 | Bowman-Amuah | |
| 6,677,964 B1 * | 1/2004 | Nason et al. | 715/764 |
| 6,701,314 B1 | 3/2004 | Conover et al. | |
| 6,714,219 B2 * | 3/2004 | Lindhorst et al. | 715/769 |
| 6,732,237 B1 | 5/2004 | Jacobs et al. | |
| 6,745,238 B1 | 6/2004 | Giljum et al. | |
| 6,795,967 B1 | 9/2004 | Evans et al. | |
| 6,801,949 B1 | 10/2004 | Bruck et al. | |
| 6,802,000 B1 | 10/2004 | Greene et al. | |
| 6,804,686 B1 | 10/2004 | Stone et al. | |
| 6,829,662 B2 | 12/2004 | King-Smith et al. | |
| 6,839,769 B2 | 1/2005 | Needham et al. | |
| 6,859,931 B1 | 2/2005 | Cheyer et al. | |
| 6,938,216 B1 | 8/2005 | Ishisaki | |
| 6,944,655 B1 | 9/2005 | Bellamy et al. | |
| 6,983,288 B1 | 1/2006 | Kirkwood et al. | |
| 6,987,726 B1 | 1/2006 | Elliott | |
| 7,120,625 B2 | 10/2006 | Kagimasa et al. | |
| 7,149,959 B1 * | 12/2006 | Jones et al. | 715/234 |
| 7,159,234 B1 | 1/2007 | Murphy et al. | |
| 7,171,619 B1 | 1/2007 | Bianco | |
| 7,203,731 B1 | 4/2007 | Coates et al. | |
| 7,251,785 B1 | 7/2007 | Howard | |
| 7,269,792 B2 | 9/2007 | Consolatti et al. | |
| 7,305,436 B2 * | 12/2007 | Willis | 709/204 |
| 7,308,583 B2 | 12/2007 | Matsuzaki et al. | |
| 7,325,196 B1 * | 1/2008 | Covington et al. | 715/251 |
| 7,343,379 B2 | 3/2008 | Marvin et al. | |
| 7,349,949 B1 * | 3/2008 | Connor et al. | 709/217 |
| 7,376,739 B2 | 5/2008 | Ramaswamy et al. | |
| 7,404,141 B1 | 7/2008 | Giljum et al. | |
| 7,406,510 B1 | 7/2008 | Feldman | |
| 7,444,597 B2 * | 10/2008 | Perantatos et al. | 715/769 |
| 7,472,350 B2 | 12/2008 | Hintermeister et al. | |
| 7,590,430 B1 | 9/2009 | Urbanek | |
| 2001/0037367 A1 | 11/2001 | Iyer | |
| 2002/0016759 A1 | 2/2002 | Macready et al. | |
| 2002/0075325 A1 | 6/2002 | Allor et al. | |
| 2002/0076025 A1 | 6/2002 | Liversidge et al. | |
| 2002/0078365 A1 | 6/2002 | Burnett et al. | |
| 2002/0122076 A1 * | 9/2002 | Nakaki | 345/847 |
| 2002/0165936 A1 | 11/2002 | Alston et al. | |
| 2002/0196273 A1 | 12/2002 | Krause | |
| 2003/0004956 A1 | 1/2003 | Johnson et al. | |
| 2003/0018665 A1 | 1/2003 | Dovin et al. | |
| 2003/0037052 A1 | 2/2003 | Kitain et al. | |
| 2003/0041198 A1 | 2/2003 | Exton et al. | |
| 2003/0058277 A1 | 3/2003 | Bowman-Amuah | |
| 2003/0103603 A1 | 6/2003 | Kurita et al. | |
| 2003/0110117 A1 | 6/2003 | Saidenberg et al. | |
| 2003/0115292 A1 | 6/2003 | Griffin et al. | |
| 2003/0126436 A1 | 7/2003 | Greenberg et al. | |
| 2003/0131050 A1 | 7/2003 | Vincent | |
| 2003/0160825 A1 * | 8/2003 | Weber | 345/769 |
| 2003/0167315 A1 * | 9/2003 | Chowdhry et al. | 709/218 |
| 2003/0182375 A1 | 9/2003 | Zhu et al. | |
| 2003/0192030 A1 | 10/2003 | Hostettler | |
| 2003/0204429 A1 | 10/2003 | Botscheck et al. | |
| 2003/0226107 A1 | 12/2003 | Pelegri-Llopart et al. | |
| 2004/0001094 A1 * | 1/2004 | Unnewehr et al. | 345/769 |
| 2004/0010607 A1 | 1/2004 | Lee et al. | |
| 2004/0015548 A1 | 1/2004 | Lee | |
| 2004/0015865 A1 | 1/2004 | Cirone et al. | |
| 2004/0034687 A1 | 2/2004 | Friedman | |
| 2004/0039934 A1 | 2/2004 | Land et al. | |
| 2004/0046804 A1 | 3/2004 | Chang | |
| 2004/0073615 A1 | 4/2004 | Darling | |
| 2004/0078435 A1 | 4/2004 | Dunbar et al. | |
| 2004/0078455 A1 | 4/2004 | Eide et al. | |
| 2004/0107212 A1 | 6/2004 | Friedrich et al. | |
| 2004/0111467 A1 | 6/2004 | Willis | |
| 2004/0133440 A1 | 7/2004 | Carolan et al. | |
| 2004/0133460 A1 | 7/2004 | Berlin et al. | |
| 2004/0133660 A1 | 7/2004 | Junghuber et al. | |
| 2004/0136511 A1 | 7/2004 | Schwartz et al. | |
| 2004/0145608 A1 | 7/2004 | Fay et al. | |
| 2004/0158610 A1 | 8/2004 | Davis et al. | |
| 2004/0172279 A1 | 9/2004 | Carolan et al. | |
| 2004/0183831 A1 * | 9/2004 | Ritchy et al. | 345/762 |
| 2004/0205566 A1 | 10/2004 | Aggarwal et al. | |
| 2004/0225995 A1 | 11/2004 | Marvin et al. | |
| 2004/0243928 A1 | 12/2004 | Hesmer et al. | |
| 2004/0254884 A1 | 12/2004 | Haber et al. | |
| 2004/0261010 A1 | 12/2004 | Matsuishi | |
| 2005/0021531 A1 | 1/2005 | Wen et al. | |
| 2005/0039141 A1 | 2/2005 | Burke et al. | |
| 2005/0050073 A1 | 3/2005 | Demiroski et al. | |
| 2005/0060653 A1 * | 3/2005 | Fukase et al. | 715/724 |
| 2005/0097111 A1 | 5/2005 | Mukherjee et al. | |
| 2005/0097188 A1 | 5/2005 | Fish | |
| 2005/0119793 A1 | 6/2005 | Amundson et al. | |
| 2005/0144563 A1 | 6/2005 | Hough et al. | |
| 2005/0149619 A1 | 7/2005 | Cowan et al. | |
| 2005/0203931 A1 | 9/2005 | Pingree et al. | |
| 2005/0204297 A1 | 9/2005 | Banatwala et al. | |
| 2005/0212915 A1 | 9/2005 | Karasaki et al. | |
| 2005/0223310 A1 | 10/2005 | Wachholz-Prill et al. | |
| 2005/0234874 A1 | 10/2005 | Berlin et al. | |
| 2005/0240863 A1 | 10/2005 | Olander et al. | |
| 2005/0262006 A1 | 11/2005 | Beartusk et al. | |
| 2005/0262007 A1 | 11/2005 | Beartusk et al. | |
| 2005/0262075 A1 | 11/2005 | Beartusk et al. | |
| 2005/0262092 A1 | 11/2005 | Beartusk et al. | |

| | | |
|---|---|---|
| 2005/0262093 A1 | 11/2005 | Beartusk et al. |
| 2005/0262094 A1 | 11/2005 | Beartusk et al. |
| 2005/0262095 A1 | 11/2005 | Beartusk et al. |
| 2005/0262185 A1 | 11/2005 | Beartusk et al. |
| 2005/0273382 A1 | 12/2005 | Beartusk et al. |
| 2005/0273702 A1 | 12/2005 | Trabucco |
| 2005/0273714 A1 | 12/2005 | Beartusk et al. |
| 2005/0278294 A1 | 12/2005 | Beartusk et al. |
| 2005/0278518 A1 | 12/2005 | Ko et al. |
| 2006/0004690 A1 | 1/2006 | Beartusk et al. |
| 2006/0010125 A1 | 1/2006 | Beartusk et al. |
| 2006/0010205 A1 | 1/2006 | Beartusk et al. |
| 2006/0031234 A1 | 2/2006 | Beartusk et al. |
| 2006/0031497 A1 | 2/2006 | Beartusk et al. |
| 2006/0053194 A1 | 3/2006 | Schneider et al. |
| 2006/0053195 A1 | 3/2006 | Schneider et al. |
| 2006/0053380 A1 | 3/2006 | Spataro et al. |
| 2006/0100892 A1 | 5/2006 | Ellanti |
| 2006/0107314 A1 | 5/2006 | Cataldi |
| 2006/0122971 A1 | 6/2006 | Berg et al. |
| 2006/0167996 A1 | 7/2006 | Orsolini et al. |
| 2006/0173857 A1 | 8/2006 | Jackson |
| 2006/0174199 A1* | 8/2006 | Soltis et al. .................. 715/700 |
| 2006/0184883 A1 | 8/2006 | Jerrard-Dunne et al. |
| 2006/0212822 A1* | 9/2006 | Facemire et al. ............ 715/769 |
| 2006/0218000 A1 | 9/2006 | Smith et al. |
| 2006/0225091 A1* | 10/2006 | Facemire et al. ................ 725/35 |
| 2006/0225094 A1* | 10/2006 | Facemire et al. ................ 725/45 |
| 2006/0277089 A1 | 12/2006 | Hubbard et al. |
| 2007/0006083 A1 | 1/2007 | Daniels et al. |
| 2007/0016650 A1 | 1/2007 | Gilbert et al. |
| 2007/0016872 A1 | 1/2007 | Cummins et al. |
| 2007/0043766 A1 | 2/2007 | Nicholas et al. |
| 2007/0113201 A1 | 5/2007 | Bales et al. |
| 2007/0150834 A1* | 6/2007 | Muller et al. ................. 715/810 |
| 2007/0220580 A1 | 9/2007 | Putterman et al. |
| 2008/0250057 A1 | 10/2008 | Rothstein et al. |

OTHER PUBLICATIONS

Microsoft.com, Windows XP Service Pack 2 Screen Dumps, dated 2001, pp. 1-4.*

Christophe Laurer, "Introducing Microsoft.net", Jul. 2, 2002; pp. 1-10; http://web.archive.org/web/20020702162429/http://www.freevbcode.com/ShowCode.asp?ID=2171.

Lauren Gibbons Paul, "RosettaNet: Teaching Business to Work Together", Oct. 1, 1999; 4 pages, http://www.developer.com/xml/article.php/616641.

Barkley, "Implementing Role-Based Access Control Using Object Technology", ACM RBAC Workshop, MD, USA, 1996.

* cited by examiner

Issues

Browse | Search

Show/Hide Folders

Community | Personal
- Issues
  - dfdfd

Sample Issue  [Edit]  [Delete]

Mark for Move                                                    [Done]

1706 — Title: Sample Issue
1708 — Description: Just a sample
1710 — Owner: weblogic
1712 — Priority: MEDIUM
1714 — Status: IN_PROGRESS
1716 — Resolution:
1718 — Flagged: false Created By: weblogic
Created Date: Tue Oct 11 15:43:18 MDT 2005
Modified By: weblogic
Modified Date: Tue Oct 11 15:43:18 MDT 2005

Related Content: Sample GroupNote —— 1704

1700                                                              [Done]

---

Rich Text

Browse | Search

Show/Hide Folders
Community
- RichText

○ RichText  [Edit]  [Delete]

[Create RichText]  [Create Folder]
Items per page: 25

Sample GroupNote — 1702

FIG. 17

SYSTEM AND METHOD FOR PROVIDING DRAG AND DROP FUNCTIONALITY IN A COMMUNITIES FRAMEWORK

CLAIM OF PRIORITY

This application claims priority to the following U.S. Provisional Patent Applications which are hereby incorporated herein by reference:

U.S. Provisional Patent Application No. 60/737,621, filed Nov. 17, 2005, entitled "SYSTEM AND METHOD FOR PROVIDING A COMMUNITY FRAMEWORK IN A COLLABORATIVE COMPUTING ENVIRONMENT."

U.S. Provisional Patent Application No. 60/742,186, filed Dec. 2, 2005, entitled "SYSTEM AND METHOD FOR PROVIDING A COMMUNITY FRAMEWORK IN A COLLABORATIVE COMPUTING ENVIRONMENT WITH SEARCH CONTROLS."

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 11/366,268 entitled "SYSTEM AND METHOD FOR PROVIDING EXTENSIBLE CONTROLS IN A COMMUNITIES FRAMEWORK" by Ray Polk et al., filed Mar. 2, 2006.

U.S. patent application Ser. No. 11/367,519 entitled "SYSTEM AND METHOD FOR PROVIDING GENERIC CONTROLS IN A COMMUNITIES FRAMEWORK" by Cindy McMullen et al., filed Mar. 3, 2006.

U.S. patent application Ser. No. 11/363,635 entitled "SYSTEM AND METHOD FOR PROVIDING SECURITY IN A COMMUNITIES FRAMEWORK" by Cindy McMullen et al., filed Feb. 28, 2006.

U.S. patent application Ser. No. 11/367,729 entitled "SYSTEM AND METHOD FOR PROVIDING UNIQUE KEY STORES FOR A COMMUNITIES FRAMEWORK" by Ray Polk et al., filed Mar. 3, 2006.

U.S. patent application Ser. No. 11/369,545 entitled "SYSTEM AND METHOD FOR PROVIDING ANALYTICS FOR A COMMUNITIES FRAMEWORK" by Aaron Schram et al., filed Mar. 7, 2006.

U.S. patent application Ser. No. 11/368,865 entitled "SYSTEM AND METHOD FOR PROVIDING NOTIFICATIONS IN A COMMUNITIES FRAMEWORK" by Christopher E. Bales et al., filed Mar. 6, 2006.

U.S. patent application Ser. No. 11/370,098 entitled "SYSTEM AND METHOD FOR PROVIDING TESTING FOR A COMMUNITIES FRAMEWORK" by Cindy McMullen et al., filed Mar. 7, 2006.

U.S. patent application Ser. No. 11/371,303 entitled "SYSTEM AND METHOD FOR PROVIDING RESOURCE INTERLINKING FOR A COMMUNITIES FRAMEWORK" by Christopher E. Bales et al., filed Mar. 8, 2006.

U.S. patent application Ser. No. 11/373,074 entitled "SYSTEM AND METHOD FOR PROVIDING ACTIVE MENUS IN A COMMUNITIES FRAMEWORK" by Christopher E. Bales et al., filed Mar. 10, 2006.

U.S. patent application Ser. No. 11/371,305 entitled "SYSTEM AND METHOD FOR PROVIDING DYNAMIC CONTENT IN A COMMUNITIES FRAMEWORK" by Christopher E. Bales et al., filed Mar. 8, 2006.

U.S. patent application Ser. No. 11/371,424 entitled "SYSTEM AND METHOD FOR DISPLAYING HTML CONTENT FROM PORTLET AS A PAGE ELEMENT IN A COMMUNITIES FRAMEWORK" by Christopher E. Bales, filed Mar. 9, 2006.

U.S. patent application Ser. No. 11/373,086 entitled "SYSTEM AND METHOD FOR PROVIDING SEARCH CONTROLS IN A COMMUNITIES FRAMEWORK" by Cindy McMullen et al., filed Mar. 10, 2006.

FIELD OF THE INVENTION

The invention relates generally to resources in collaborative computing environments and in particular to providing customizable drag and drop functionality for displayed resources in a communities framework.

BACKGROUND

The popularity and demand for collaborative and distributed computing environments has increased in the recent years due to the popularity of the internet, networks and portal frameworks. A wide variety of enterprises, ranging from large corporations to small development projects, often have use for such software. For example, employees, developers and other users within an enterprise often work on projects in groups, collaborating with one another as the project progresses. Such groups of users frequently need access to the same resources, materials and information on certain topics. Thus, software designed to allow a group of users on a network to work simultaneously on a project is desirable. Present day solutions typically provide services for communicating (such as email), group document development, scheduling, and tracking. For example, groupware is a form of application software that integrates work on a single project by several concurrent users on separate workstations on a computer network.

One area where these trends have been implemented has been in the context of content frameworks referred to as portals. A portal can be thought of as a gateway or an access point for users to various types of content and other collections of information. One example of a portal server is the WebLogic® Portal product available from BEA Systems Inc. Portals are typically visually represented and often have a portal page for allowing users to navigate the data provided therein. Portals are ideal for implementations of groupware programs since multiple users can be provided a single point of access to a wide variety of information.

There are several available groupware products deployed on portal frameworks and available on the market today. Most of them allow some form of user collaboration in an effort to increase productivity. However, these solutions are often very rigid in their requirements for the data and services they provide. For example, most of such software is geared toward specific enterprises, groups or projects and allow little in terms of customization. What is needed is a more abstract, dynamic and user-friendly approach, one that would provide a more fluid and adaptable system of collaboration between users over a distributed computing environment.

BRIEF DESCRIPTION OF THE FIGURES

FIG. 17 is an exemplary illustration of the user interface implementing the drag and drop and resource interlinking features of the communities framework, in accordance with various embodiments of the invention.

DETAILED DESCRIPTION

Aspects of the invention are illustrated by way of example and not by way of limitation in the figures of the accompanying drawings in which like references indicate similar elements. It should be noted that references to "an," "one," "various" and "further" embodiments in this disclosure is not necessarily to the same embodiment, and such references mean at least one. In the following description, numerous specific details are set forth to provide a thorough description of the invention. However, it will be apparent to one skilled in the art that the invention may be practiced without these specific details. In other instances, those features which are well-known in the art have not been described in detail so as not to obscure the invention.

In various embodiments, systems and methods for providing collaboration among users in the context of a distributed computing environment are provided. A community framework is presented for introducing a sense of memberships and communities to a portal desktop. In one embodiment, the communities framework can be implemented on a portal application server such as the WebLogic® Portal product available from BEA Systems Inc. Java® Development Kit (JDK) version 1.5 can be implemented to make use of Generics and Annotations provided therewith. A community can be provided for maintaining user membership during a collaboration project in a computing environment. A community can be thought of as a membership based desktop within a portal used to deliver user-tailored applications and workspaces. Thus, users who are members of the community, may share resources, such as documents, view resources, design and assign task lists, maintain a list of internet links, etc.

Communities can be the base level for collaboration in a portal. A community provides a sub-container within a portal to provide access to applications and content to specific groups of people, i.e. its members. In various embodiments, a community can provide a way to define access to areas of a portal. End users, developers as well as non-technical business users are provided the ability to quickly and easily define an area where they can choose the applications and content to be made available and the people who can participate—without requiring experts and technical knowledge of IT. In one embodiment, the community framework is essentially a desktop with additional features to support portal resource grouping and management by end users.

Figure 1:
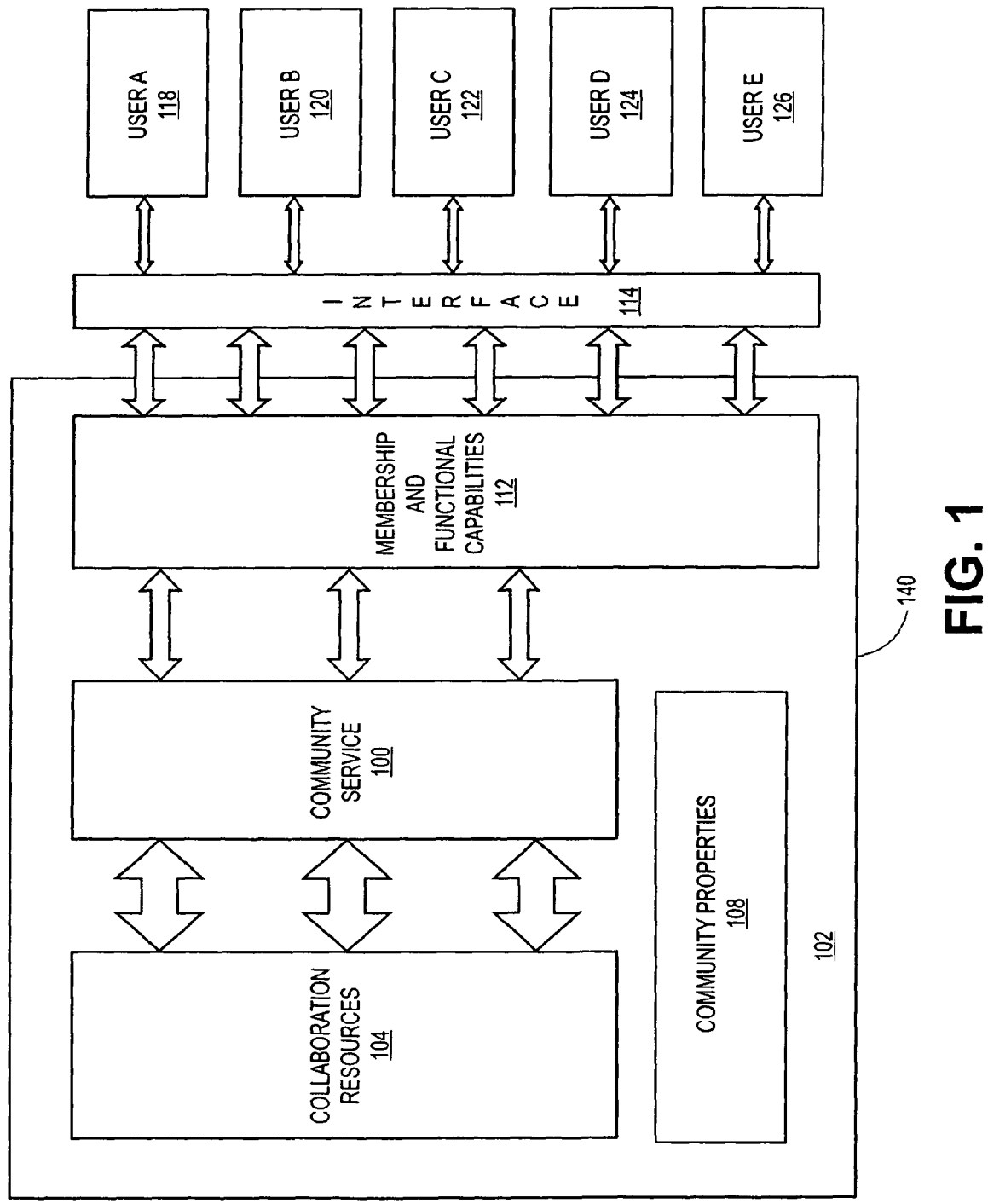
FIG. 1 is an illustration of an overall communities framework, in accordance with certain embodiments of the invention.

FIG. 1 is an exemplary illustration of the communities framework, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

For example, a community (140) may be composed of various collaboration resources (104) and community services (100) as well as users (118, 120, 122, 124, 126) who are members of the community and who have access to the resources and services. A community can also have its own community properties (108) which can allow for its customization. Community properties can be any key value pairs that are associated with a particular community. For example, a community property (108) may specify the type of the community it is, the project that the community is intended for, the period of time that the community is meant to exist, or whether a community is public. Similarly, a mapping of various security roles to functional capabilities (as discussed in further detail below) can be stored as a community property. The community properties can be contained within a separate community framework database of the community framework.

Various users (118, 120, 122, 124, 126) may be accessing and making use of the community (140) through an interface (114). The interface can be a graphical user interface (GUI) rendered on a display device, for example. Security access can be provided (as described in further detail below) by membership and functional capabilities (112) in the communities framework. Through such security control, users can obtain access to various community services (100), collaboration resources (104) and community properties (108) and make use of these features during their collaboration over a distributed computing environment.

Collaboration resources (104) are various content data types that may provide assistance to the members of the community during their collaboration on some project. Typically, a collaboration resource is stored in a repository and contains some type of information about a collaboration project that members of the community are working on. Some examples of collaboration resources include documents, issues, discussions, links, events, announcements, as well as other types of files, data and services. As an illustration, developers may maintain a list of open issues that are migrated to closed issues as they are resolved. Announcement resource, on the other hand, may be displayed initially in a special section of the community header, and can be scoped to either the entire community or a list of recipients. In one embodiment, announcements can be either "acknowledged" (marked as having been already read) or deleted which would remove them from the header. As another illustration, the links portlet may contain a list of links to documents, portal resources and remote sites that are of interest to a user of a desktop or member of a community. The link data can be stored in the content management system and CRUD (create, retrieve, update, delete) operations on that data can be supported according to user capability. Links may be organized in groups such as "News" or "Sports" and a hierarchical relationship among the various links can be implemented. Links can subsequently be displayed in a list that supports ordering and filtering. For example, a sort by creation date, name, description, type, visibility would sort the links accordingly and display the sorted list to the user.

A community can also have multiple users (118, 120, 122, 124, 126) which are members of that community. These members should be able to share the collaboration resources in the community. Sharing a resource can be accomplished by creating a link to the resource to be shared, by copying the entire resource, or by some other means available in the art. The decision of which method is to be employed may be left up to the system administrator of an enterprise.

A community member can be defined to represent the external unified view of the user of the community. In other words, it may be a single representation of the user, one that all community services can use. For example, the community services may need to integrate with separate and distinct concepts of the user such as the portal UUP (unified user profile) and the community framework concept of the user. The notion of the community member allows all community services to integrate with various separate concepts of users. A member can also be a unified idea of a group of users. Various data can be associated with a member, such as first_name, last_name, user_name, membership (of various groups), roles (what the member can do), email address, presence (online, offline), etc.

In one embodiment, community services (100) are individual portlets that provide various services and functionality to the community. They may be used individually or aggregated to form a new community application. For example, a content directory service can be a portlet that provides end users with the ability to browse the content directory where they have access privileges and create and manage content items as they have privileges. An issues service can be a portlet that allows users to create lists of issues related to the project that may need to be addressed. The community search service can be implemented, allowing advanced search options for searching the community's resources such as issues, announcements, documents in the document library and so on. This service can be scoped to the search in the member's local content or across an entire enterprise repository. A rich site summary (RSS) service can be a portlet that connects to external sites that provide RSS information, retrieves news topics based on visitor preference, and displays them as clickable links. Various other services can also be implemented.

Templates may be provided for the communities framework. A community template is the pre-packaged set of collaboration resources from which a community can be built. The template provides users with the ability to create applications without the need for any coding. Thus, by employing templates, a user can readily construct a community with specific collaboration resources and add members to that community without any detailed knowledge of the programming languages involved.

In various embodiments, multiple communities can be structured hierarchically such that each community may have multiple children but only one parent. Community members may create a new community from the parent community. Such a hierarchical relationship may be useful to scope data and to organize communities. For example data may be scoped to an individual user or to the community to which the user belongs, i.e. is a member of. The definition of what a hierarchy among several communities means can be made to be configurable by a user or system administrator. For example, some projects may require that the same data be made available to members of a child community as to members of the parent community. Other projects may need to make the members of the parent community also members of the child or vice versa. The particular implementation will vary with the particular type of project or enterprise choosing to implement this feature and consequently the above examples are not intended to exhaust all of the various possibilities.

Various data in the communities framework, such as the collaboration resources (104) can be stored in a separate instance of a repository for each community. Alternatively, each community may get a top level node within the repository. The choice of implementation may be made configurable by a system administrator.

Figure 2:
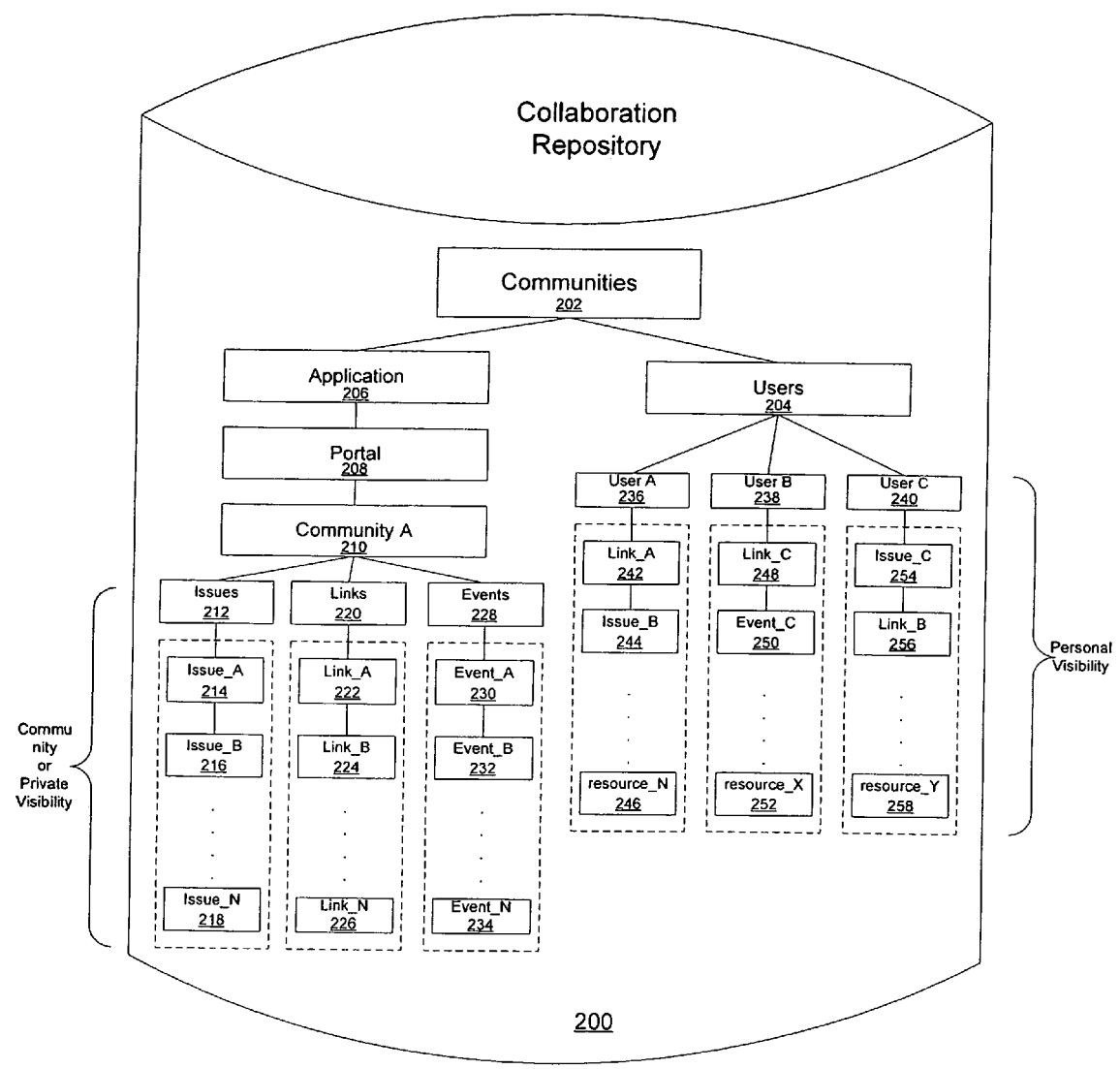
FIG. 2 is an illustration of a collaboration repository and data contained therein, in accordance with certain embodiments of the invention.

FIG. 2 is an exemplary illustration of data layout within a repository of an enterprise, in accordance with various embodiments of the invention. A repository (200) can be a database, file system or some other form of a persistent storage. In one embodiment, data is hierarchically laid out according to the community's universal resource identifier (URI). The collaboration repository (200) contains a top level folder named Communities (202). Beneath the main Communities folder, data is further split into various nodes such as the Application (206) node, the Portal (208) node and the community_A (210) node. The community_A node may contain all of the collaboration resources such as all the issues (212), links (220) and events (228) for the particular community named community_A. Other communities, such as community_B (not shown) for example, may have their own folders somewhere beneath the general Communities folder (202). Furthermore, each specific resource such as issue_A (214), issue_B (216) and issue_N (218) can be further located beneath the general issues (212) node. Similarly, each specific link such as link_A (222), link_B (224), link_N (228) and each specific event such as event_A (230), event_B (232) and event_N (234) can be located beneath their appropriate links (220) and events (228) folders.

In one embodiment, a Users (204) folder can be placed beneath the general Communities folder (202) and can contain all the data for each specific user, no matter which communities that user belongs to. Thus, user_A (236) may be the owner of link_A (242), issue_B (244) and resource_N (246) and as such, these resources would be located beneath the user_A folder in the content hierarchy. Similarly, user_B (238) may have access to link_C (248), event_C (250) and resource_X (252) while user_C may have access to issue_C (254), link_B (256) and resource_Y (258), all located beneath their own appropriate nodes.

Data within the content management system can be stored in folders and nodes as previously described. Each data type, such as the collaboration resource "link" for example, can be merely an object wrapper for the actual node in the content management system. Thus, during initial resource creation, a new node may be created and that new node would get assigned to the particular wrapper. For example, if a developer wants to create a new issue, a new node within the repository is created. Then that new node gets assigned to the issue wrapper. During object retrieval, such as during a method call get_all_issue ( ), all nodes would be found that satisfy a certain condition, and then new issues would be instantiated dynamically, directly from those nodes that are returned. This type of system provides the ability to perform very strong typing within the content management repository. Thus, for example, a developer need not request for a specific data type, instead he or she can merely request for all data types that match a certain criteria.

The top level folders for each community can be cached so as to increase performance of the access to the data. Content uniqueness can be guaranteed by the specification of primary keys (described in detail under "Unique Key Stores" heading below) for each data type. Data may be scoped to either the individual user or to the entire community. For example, a user may wish to have his/her own set of task items, but also wish to display the tasks that belong to the community.

Data such as the various collaboration resources can be marked with a visibility and ownership fields for the purposes of distinguishing it as well as for security purposes. As a non-limiting example, the "community" and "private" data could be placed in the data hierarchy directly beneath the specific community folder. The "personal" visibility data, on the other hand, could be placed in a top-level users folder. Then the "personal" data could be made available to a user in any community. In one embodiment, data can be created with "community" visibility by default. However, ability to override that default can also be provided, such as by a control constructor:

Link privateLink=lilksControl.create( . . . , Visibili-
    ty.PRIVATE);

In one embodiment, once content is deemed "personal," it will remain so. "Private" data may be promoted to "community" data and "community" data will remain "community" data. However, other implementations are possible and are well within the scope of the present invention.

Removal of community data may take place automatically when the corresponding community is removed. Alternatively, the removal could be performed manually by the manager, owner or some other member of the community. The selection of the two implementations could be made to be configurable by a system administrator.

All community data can be made to derive from a base class (e.g. CM_Content) and the User Interface facing controls can use strong typing via Java® generics and inheritance.

Level 1 Security

Security access to the collaboration resources can be restricted based on community membership capabilities or roles. These membership capabilities can determine certain privileges that a particular member is allowed in the community. In one embodiment, the communities framework membership capabilities are mapped one-to-one to specific WebLogic® Server roles. For example, five basic memberships included in a template can be Owner, Creator, Leader, Contributor, Member. The capability of Member can be implemented to be the absence of any other capability. The definition of these membership capabilities can be changed and scoped per application or per community. These membership capabilities can be declared in a community config.xml file and can subsequently be edited by the user or system administrator of the communities framework. Customers can also create an infinite number of new community roles or membership capabilities by editing this file. Alternatively such declarations can be stored in some other manner, such as in order to protect role definitions.

The membership capabilities or roles can be mapped to a set of functional capabilities which define what a member is or is not allowed to do. These mappings can be persisted by the membership security manager service and can be customizable to each specific community. A security control can supply default mappings and it can also permit community administrators to override those mappings and/or to define and map additional membership capability/functional capability pairs for the community. This security control can be implemented to initialize the security for the entire community and should preferably be called from a page flow by the community administrator prior to any content access.

Examples of functional capabilities can include browse, update, view, create, delete as well as other data and resource editing abilities. Thus, every role defined in an editable file has a set of functional capabilities associated with it, which specify what a member in that role is allowed to do. For example, a role of community Creator can be allowed to create a new community, add a manager to the community, remove a manager, add a user or edit content. On the other hand, a community Manager role may be allowed to add or remove users from the community, enable or disable self-registration for a community and edit certain types of content within the community. It should be noted that these are mere examples of some definitions, many other enterprise-specific implementations are possible. A user interface can be provided in order to make it easier for developers to define what a particular membership capability is allowed to do or, in other words, what functional capabilities that role is assigned to.

Figure 3:
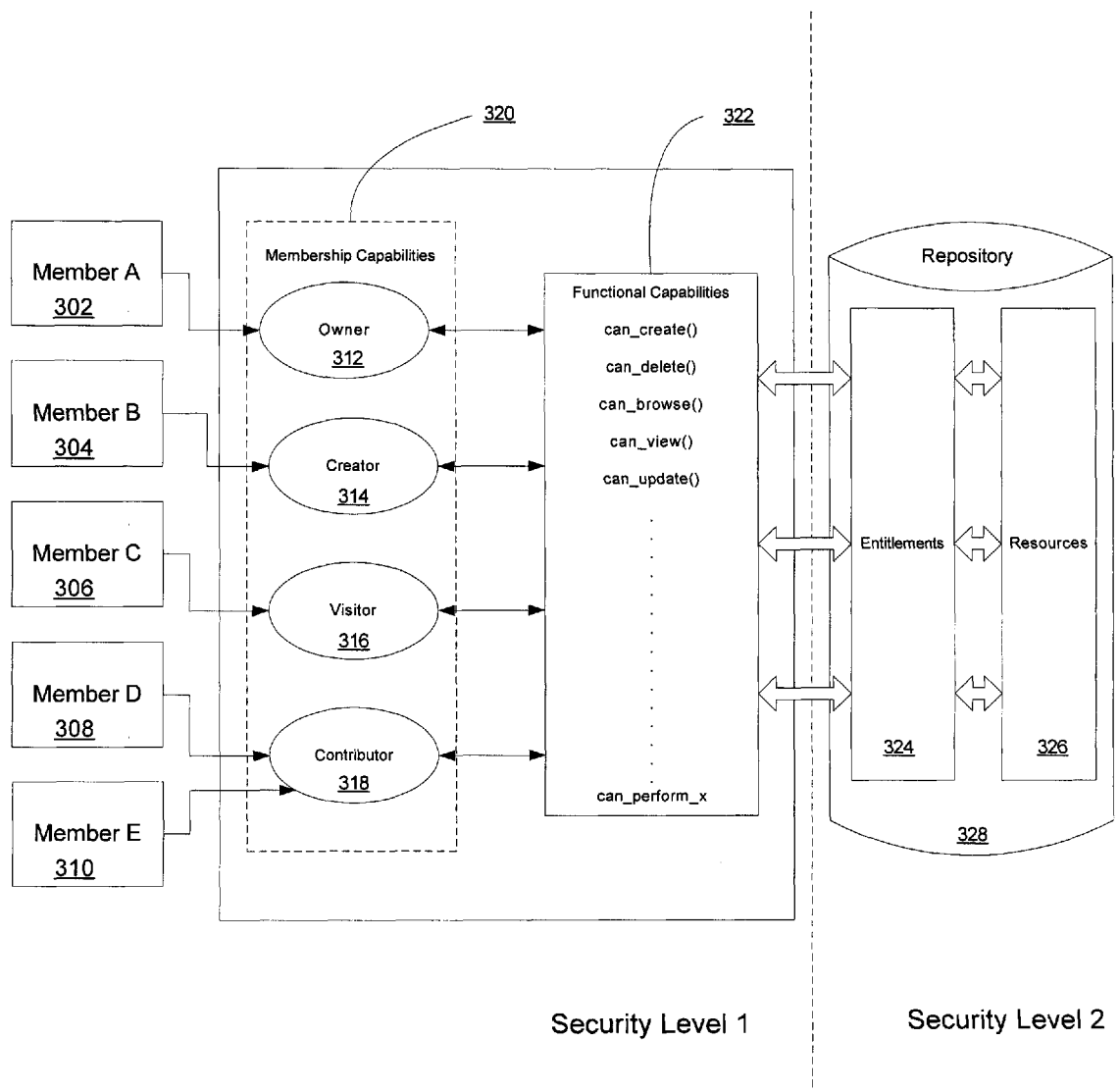
FIG. 3 is an illustration of security implementation in the communities framework, in accordance with certain embodiments of the invention.

FIG. 3 is an exemplary illustration of the security features provided in the communities framework, in accordance with various embodiments of the invention. Various members (302, 304, 306, 308, 310) of the community are each assigned to a specific membership capability or role (312, 314, 316, 318). For example, member A (302) is assigned to the membership capability of Owner (312) while member B (304) can be assigned to the role Creator (314). Similarly, member C (306) is assigned to the Visitor (316) membership capability and members D (308) and E (310) are assigned to the role of Contributor (318). This set of membership capabilities (320) is further mapped to a set of functional capabilities (322) such as can_create( ), can_delete( ), can_browse( ), can_view( ), can_update( ) and so on. As such, the role of Owner (312) has some defined functional capabilities that it is allowed to perform, while the role of Visitor (316) has some other functional capabilities associated with it. Thus, all the members that are assigned to a specific role are allowed to perform its appropriate functions. The various membership capabilities (320) and the functional capabilities (322) can be created, modified and removed by the system administrator, user or developer within an enterprise. Other community-specific implementations are also possible. For example, one community may wish to define a role of Visitor, while another community may not wish to allow this particular role definition. Such community-specific definitions and mappings can be stored as community properties and allow for further customization of each community.

The security access control described above constitutes the security level one feature of the communities framework. Thus, if a given member is not allowed to perform a certain task by the membership capability and functional capability definitions, he or she will not even be allowed access to the repository (328). If, however, the user's chosen task is allowed by the capabilities definitions, then the user will enter level two security, wherein access to the resources (326) in the repository (328) is controlled by entitlements (324). This will be described in further detail below, under the heading "Level 2 Security."

Figure 4:
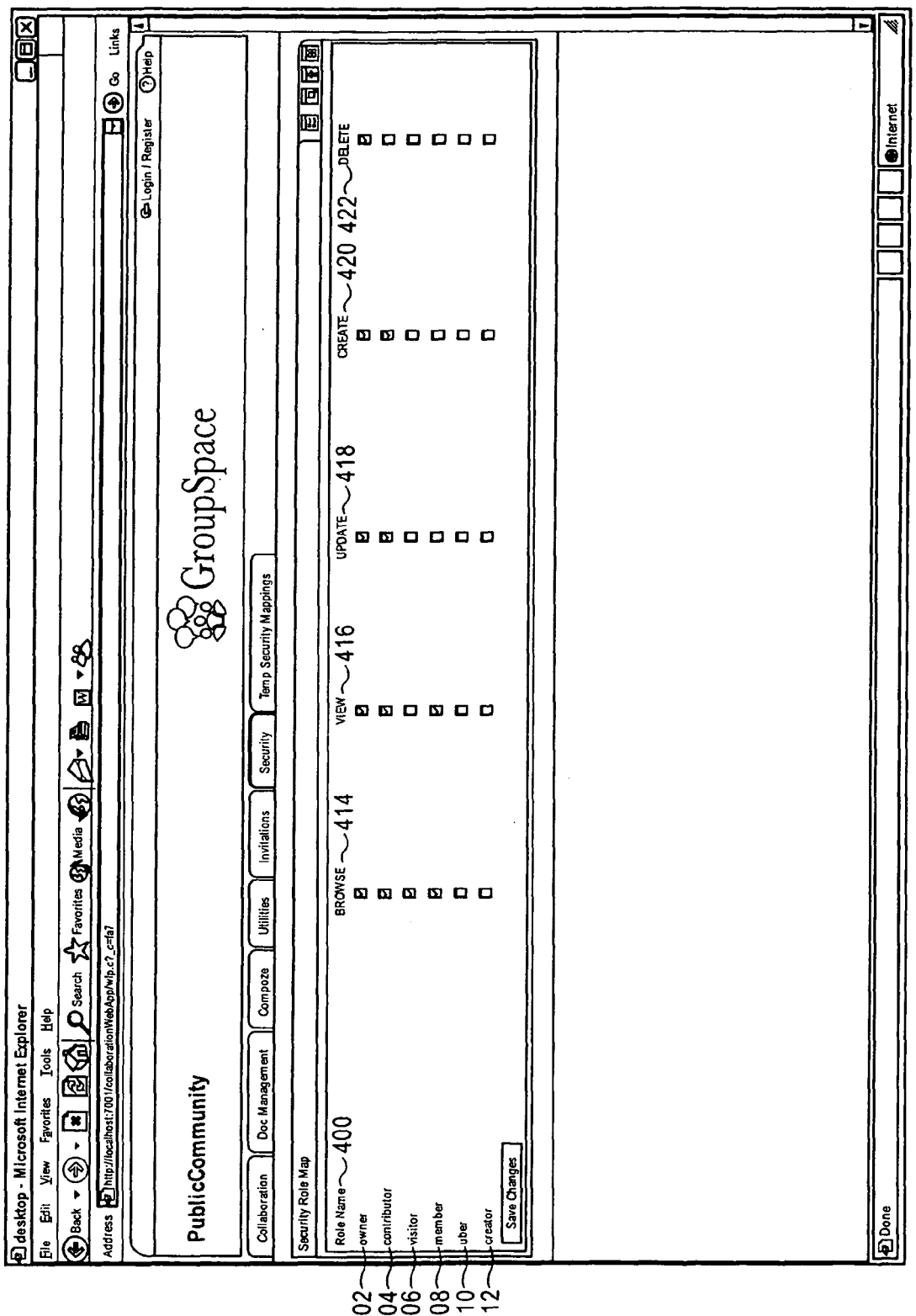
FIG. 4 is an illustration of the user interface of the security level one feature, in accordance with certain embodiments of the invention.

FIG. 4 is an exemplary illustration of the user interface for the administration of the level 1 security feature, in accordance with various embodiments of the invention. The role (i.e. membership capability) names are listed in the role name column (400) and include such definitions as Owner (402), Contributor (404), Visitor (406), Member (408), Uber (410), and Creator (412). The functional capabilities are listed in separate columns to the left of the role name column (400) and include Browse (414), View (416), Update (418), Create (420) and Delete (422) columns. Below each functional capability is a checkbox for the appropriate role definition. A system administrator or a particular member of a community can be allowed to define the appropriate functional capabilities for each membership capability, thereby controlling security access of various members assigned to the membership capabilities. A checked box indicates that the appropriate role is allowed to perform the specified function by the functional capability. Thus, for example, the role of Owner (400) is allowed to perform each of Browse (414), View (416), Update (418), Create (420) and Delete (422) functional capabilities. On the other hand, the role of Visitor is only allowed to perform the Browse (414) action for the resources within the repository. Of course, other enterprise-specific and community-specific implementations are possible and fall within the scope of the present invention.

Figure 5:
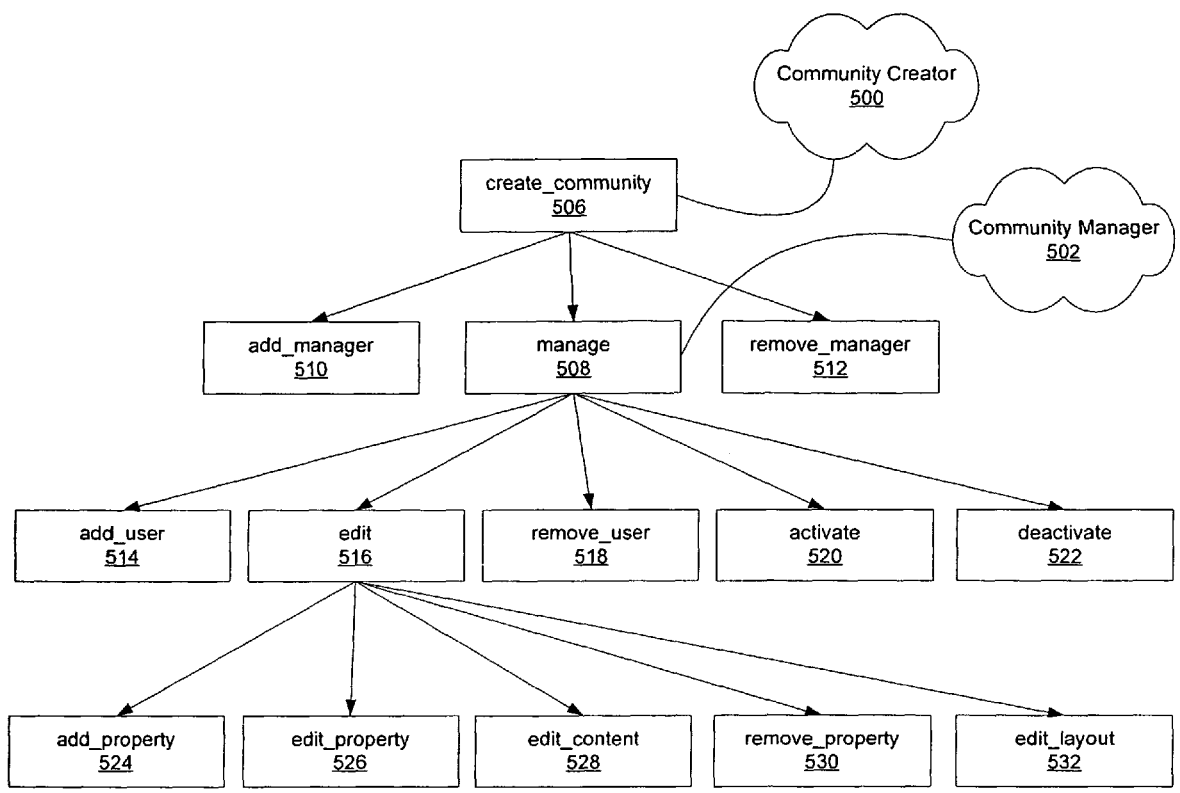
FIG. 5 is an illustration of the hierarchy of various functional capabilities of the communities framework, in accordance with certain embodiments of the invention.

FIG. 5 is an exemplary illustration of a possible hierarchy for the various functional capabilities of the communities framework, in accordance with certain embodiments of the invention. Such a hierarchical relationship can be used to enable delegation and inheritance for the functional capabilities. For example, the functional capability of create_community (506) can be the top node in the hierarchical tree and it may have several children such as add_manager (510), manage (508) and remove_manager (512). The manage node (508) in turn can have its own children nodes such as add_user (514), edit (516), remove_user (518) activate (520) and deactivate (522). A parent-child relationship can provide for inheritance of all children nodes functional capabilities to the parent. Thus, for example, the role of Community Creator (500) can be mapped to the functional capability create_community (506) and thereby inherit all the capabilities beneath it, such as manage (508), edit (516) or edit_content (528) as well as others. Similarly, a role of Community Manager (502) can be mapped to the manage functional capability (508). Through it, the Community Manager role can inherit the functional capabilities of add_user (514), edit (516), remove_user (518), activate (520), deactivate (522) as well as add_property (524), edit_property (526) edit_content (528), remove_property (530) and edit_layout (532). Thus, any member assigned to the Community Manager role would be allowed to perform all of the aforementioned tasks.

Level 2 Security

Access to the resources and data within the repository can be further restricted by entitlements and visibility. Thus, a double-layer security can be implemented for the collaboration environment—one layer at the community level and another one at the repository level. At the community level, authorization and authentication can be provided by the use of roles and functional capabilities as described above under the heading "Level 1 Security." At the repository level, on the other hand, access to data can be restricted by entitling each collaboration resource. Entitlements can have a single role called CommunityContentRole, not to be confused with the roles (membership capabilities) declared in the communities-config.xml file and implemented by level 1 security feature. Those roles preferably do not apply at security level 2.

For example, the collaboration resources in the repository can each be entitled according to the community restrictions and content visibility. An entitlement can be a combination of a resource (e.g. a node within the repository) and a security policy that is associated with that node. In other words, an entitlement can be implemented as a rule that grants or denies access to a collaboration resource.

Figure 6:
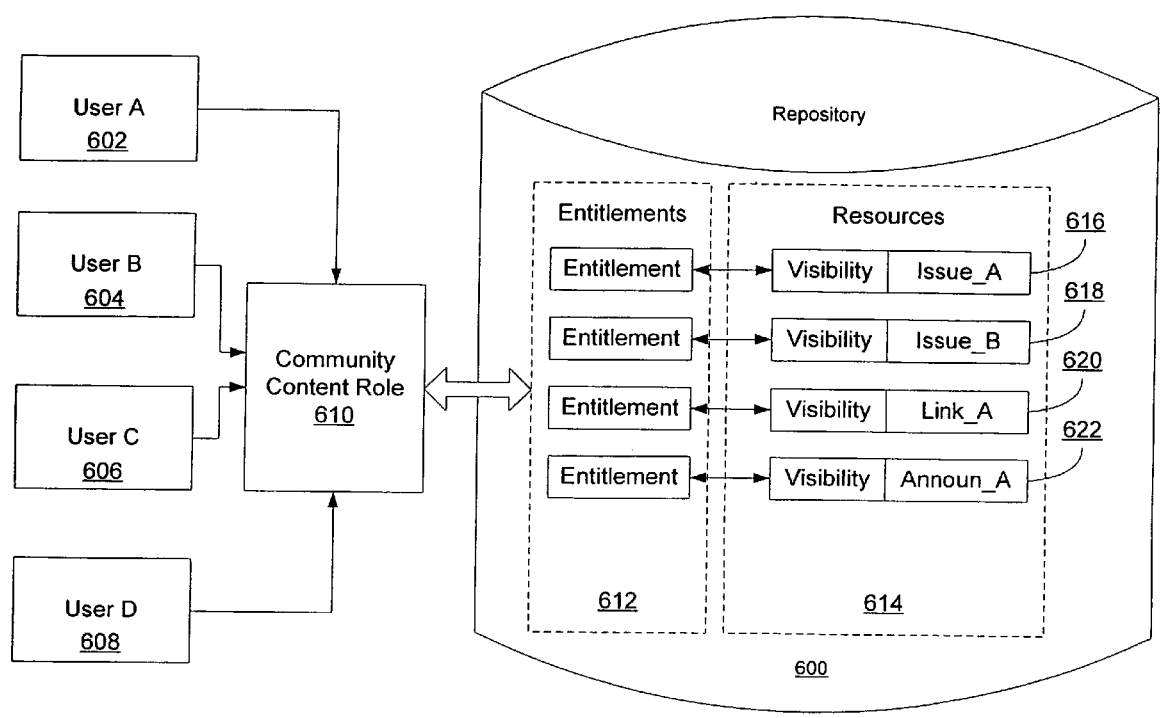
FIG. 6 is an illustration of security level two feature of the communities framework, in accordance with various embodiments of the invention.

FIG. 6 is an exemplary illustration of security level two feature of the communities framework, in accordance with various embodiments of the invention. Various entitlements (612) can restrict access to the data (614) within the repository (600) regardless of whether the repository is accessed from a community or from some kind of content management repository browser. The data includes various collaboration resources such as issue_A (616), issue_B (618), link_A (620) and announcement_A (622). The entitlements (612) can have a single role such as the CommunityContent Role (610). Thus, every member of the community such as member_A (602), member_B (604), member_C (606) and member_D (608) can satisfy the requirements of the CommunityContentRole provided that they are in the right community at the right time, and otherwise fulfill various other requirements. This CommunityContentRole can be implemented as a properties file and is basically a set of rules that can be applied to different nodes within the content repository. Thus, if a user meets certain criteria (e.g. they are in Community A viewing data with Community visibility), then they are considered within the CommunityContentRole and access to the particular resource can then be allowed. Such access to each node within the repository can be evaluated whenever CRUD (create, read, update and delete) operations are requested for it. In this manner, the entitlements control access to the collaboration resources at their individual node level.

When the community instance is first created, the hierarchy of the nodes can be laid out within the content repository. Then each node is entitled according to the community to which it belongs and according to the rules contained in the CommunityContentRole.properties file. One entitlement given to a node within the repository, can also be applied to all other nodes within the hierarchy unless overridden with another entitlement.

Subsequently at runtime, when a member is requesting to perform an action on some node of a particular community, that member must first prove himself to be in the CommunityContentRole. In order to determine whether the member is in the CommunityContentRole, the system can go through the rules in the CommunityContentRole.properties, checking whether this particular member satisfies them. Thus if member_A satisfies the rules, he is considered to be within the CommunityContentRole and access can be granted to member_A. In this manner, instead of having to assign every user to a particular role right at the beginning, the communities framework need not finally determine security until that user gets ready to perform some specific action on the data within the content management repository. This provides for a more flexible, dynamic and secure approach for accessing various resources within the repository.

In one embodiment, resources (616, 618, 620, 622) may each have a visibility of "private," "personal," or "community." Thus, if the collaboration resource has the visibility of "private," only the member of the community who is the owner of the data can have access to it. On the other hand, if the data has "community" visibility, then all members of that community can be allowed to access it. Yet a third possibility is "personal" visibility which would allow the user access to data in all communities that the user is a member of, as well as any other data that the user is an owner of.

Figure 7:
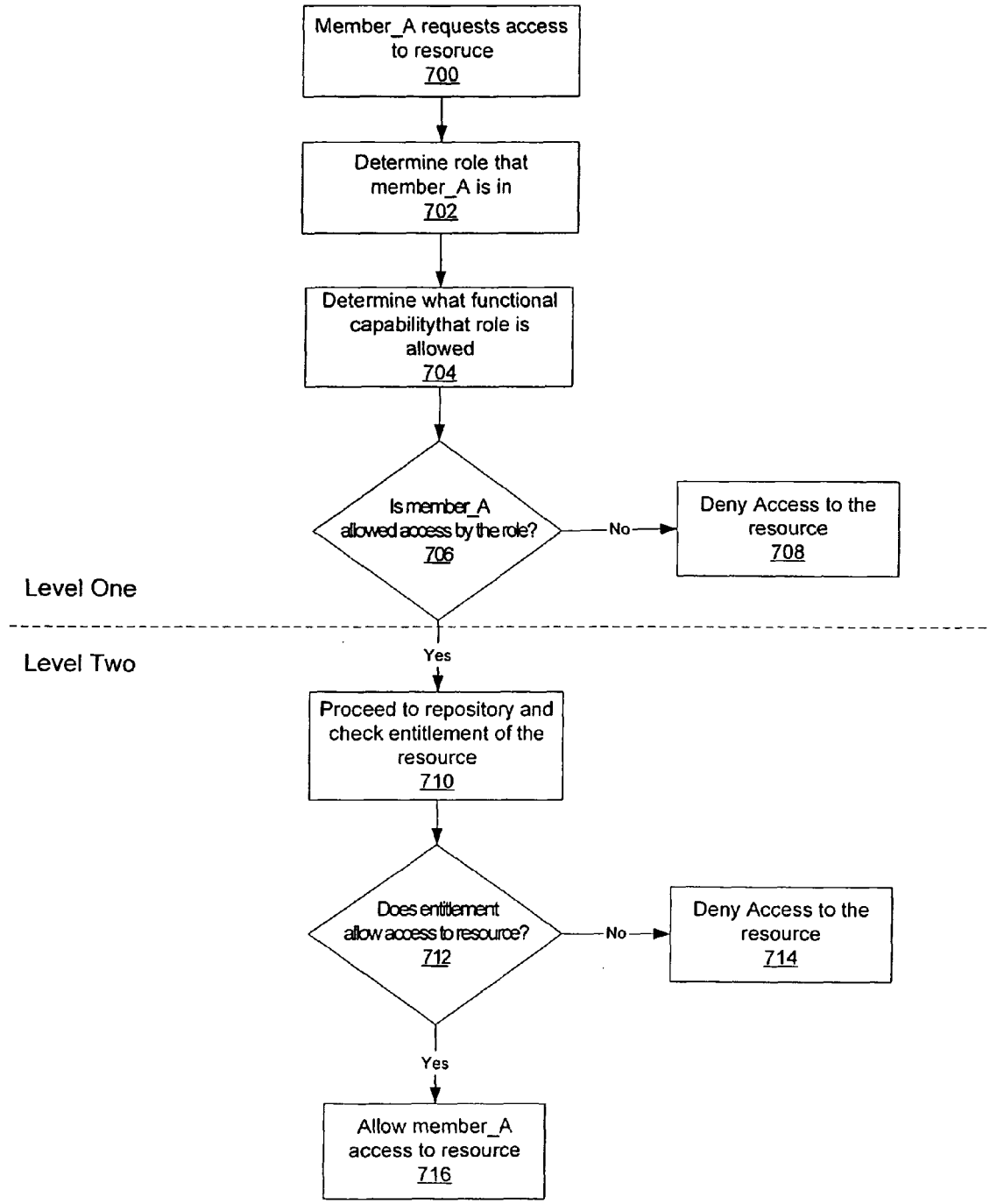
FIG. 7 is a flow diagram illustration of the functionality of the combined levels of security for the communities framework in accordance with various embodiments of the invention.

FIG. 7 is a flow diagram illustration of the functionality of the combined levels of security for the communities framework in accordance with various embodiments of the invention. Although this figure depicts functional steps in a particular order for purposes of illustration, the process is not necessarily limited to this particular order or steps. One skilled in the art will appreciate that the various steps portrayed in this figure can be omitted, rearranged, performed in parallel or adapted in various ways.

In step 700, a member such as member_A requests to perform a specific task on some resource. For example, member_A may wish to update issue_A by requesting to resolve it and move it to the list of closed Issues.

In step 702, the system can then determine what membership capability (role) member_A has been assigned to. For example, member_A may have been assigned to the role of Contributor.

In step 704, the system can check which functional capabilities member_A's role is mapped to. For example, the role of Contributor may be mapped to a set of functional capabilities including browse( ), view ( ), update( ), and create( ).

In step 706, the system can use the information obtained in steps 702 and 704 to determine whether security level one allows member_A access to the repository. Following the above example, since member_A has been assigned to Contributor role and since the Contributor role is allowed to update resources in the repository, the system can allow member_A security access to the repository and proceed to step 710. If the Contributor role were not mapped to the update( ) functional capability, then access would be denied to member_A at level one, thereby precluding him from getting to the repository level, as illustrated in step 708.

In step 710, security level two is entered. The system proceeds to the repository level and obtains the entitlements and visibility information for the requested resource. Following the example above, the system would obtain the visibility for issue_A and determine if member_A can have access to it based on that visibility. Similarly, it would check the entitlement for issue_A and determine if member_A fits in the community content role, i.e. can properly update issue_A based on that entitlement, as illustrated in step 712. If the entitlement and visibility information also allow access, then member_A would be allowed to update the resource issue_A, as illustrated in step 716. On the other hand, if entitlements or the visibility of issue_A preclude member_A from updating it, access would be denied as illustrated in step 714.

It is worth noting that member_A could be denied access at two different levels; once at security level one and once at security level two (the repository level). This is done for reasons of efficiency, simplicity and performance. For example, entitlement evaluation may not be very efficient. Furthermore, complex rules in addition to the restriction of which membership capability a user is in are not required. If a user does not pass level 1, there is no need to go on to level 2. Rather, access can be denied then and there. Once in level 2, the user is granted all CRUD operations by virtue of the role policies; level 1 filters out those requirements. Level 1 security permits the flexibility of having arbitrary sets of CRUD rights granted to any membership capability.

One advantage of such a security system is that it can reduce the number of connections to the repository, thereby improving speed and performance of data access. Another advantage is that it can provide increased and more dynamic security, making the system more resistant to unauthorized entry and other types of security breaches.

Extensible Controls and Generic Controls

Another feature that can be provided to the communities framework, is extensible controls. Extensible controls can be used to create different data types in the content management system of the communities framework. They can completely abstract away from the content management application programing interfaces (APIs) and make type creation code easier to read and write. An extensible portlet can also provided for enabling easy creation of highly configurable and flexible content types and properties at runtime. The extensible portlet can call upon various controls to implement this functionality. Generic controls, on the other hand, can further wrap the extensible controls in order to add more intuitive and flexible APIs for the developers. Resources within the content management repository can be actually stored as nodes i.e. properties and values that describe the content as well as the content itself. These nodes are further wrapped by simple Java objects that represent the property value attributes of each particular node. Thus, an object class can be dynamically generated and cached for performance reasons. The primary keys associated with the object classes can also be cached so as to improve access time.

In one embodiment, a Generic Control deals with a node wrapper object and not the actual node. For example, a LinksControl<Link> could be created that deals with only Link objects or a IssuesControl<Issue> could be created that deals only with issues, and so on. Extensible Controls, on the other hand, can be used to perform the actual CRUD (create, read, update and delete) operations on the data, via the content management APIs. In this manner, each generic control wraps an extensible control that deals directly with the content management system. So the LinksControl<Link> can have a LinksCmxControl (extensible control) that understands how to map the link object to the node in the content management repository.

In one embodiment, a developer using extensible controls can be a more sophisticated and knowledgeable developer since extensible controls can require detailed knowledge of the content repository, node structure as well as the control structure itself. On the other hand, generic controls do not require such intimate knowledge of the repository and this developer need only be aware of certain aspects of object types in order to implement this functionality. Thus, generic controls can be conceptually easier to understand and implement than extensible controls.

Different annotations can be used to represent the properties of each content type. Users or developers can then be allowed to dynamically create new content types in the repository. Similarly, developers can also be given the ability to dynamically add, modify, or remove properties from each existing resource (i.e. content type). Node creation code can be annotated in order to create types. Rather than maintaining dual code for object and node creation a single implementation can be instituted via the use of annotations.

Figure 8A:
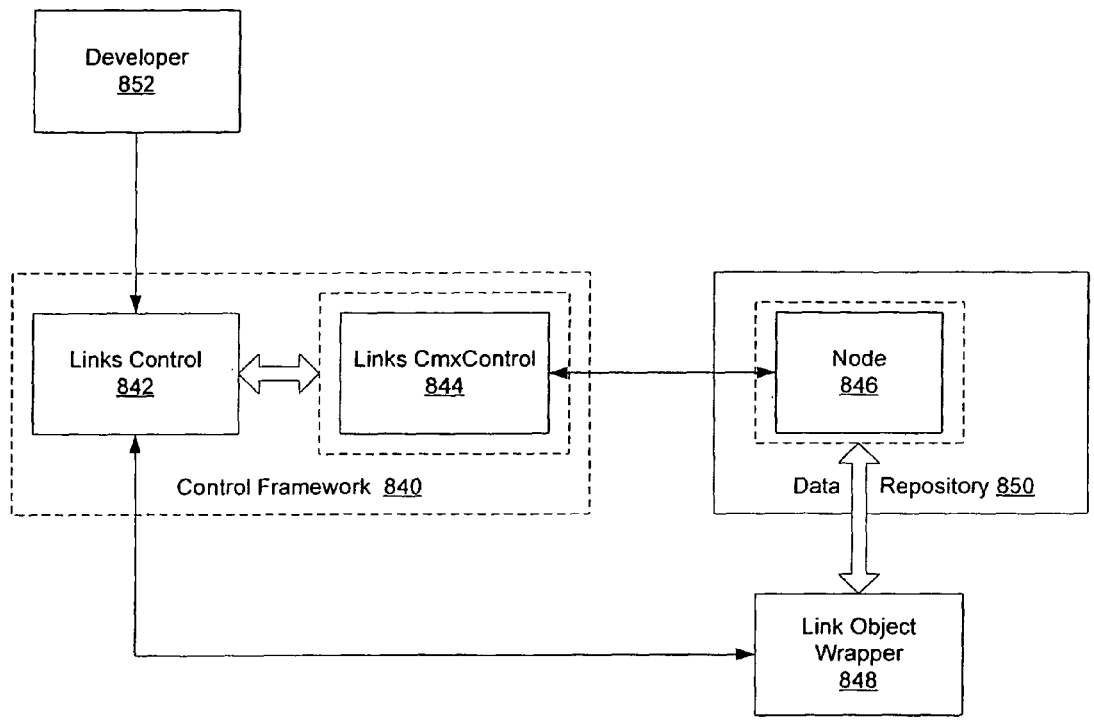
FIG. 8A is an exemplary illustration of the extensible and generic controls features of the communities framework, in accordance with various embodiments of the invention.

FIG. 8A is an exemplary illustration of the generic and extensible controls feature, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

In one embodiment, community data can be contained within a repository (850) as discussed above, and stored in various nodes (846). Content object wrappers (848) can be used to wrap each node in the repository containing the data. Thus, a link object wrapper can be used to wrap the data contained in the node for that particular link. An object wrapper can be a simple java object which is associated with the particular node in the repository. A control framework (840) can also be provided to simplify access to the community content. In one embodiment, a generic links control (842) can be provided to encapsulate the business logic and provide a valuable interface to the repository data. The links generic control can wrap an extensible links CmxControl (844) which can be responsible for performing CRUD operations on the nodes in the repository. Thus, a links control can have a links CmxControl which understands how to map the link object to the node within the content management system. A developer (852) can use the various controls in order to easily create and access content within the various communities by placing a call to the control within a JSP for example. Calls to the controls can also be placed within an extensible portlet.

In various embodiments, a generic control encapsulates business logic and/or provides programmatic access to one or more resources. Generics can provide typesafe arguments and returns. Implementations of common methods can allow finding nodes by expression, ids, parents, etc and creating type specific paged results. The control framework can allow a collaboration process or portlet to access the business logic or resource in a consistent, straightforward manner as though it was a simple Java® object. Controls can simplify access to common resources such as databases, Java® Message Service (JMS) queues and Enterprise JavaBeans™ (EJBs). However, the present disclosure is not limited to or dependent on any particular control implementation, programming language or programming paradigm. It will be apparent to those of skill in the art that a control can be implemented in many other ways including, but not limited to, as a library, subroutine, function, method, macro, procedure, and any other suitable means for encapsulating program logic and/or resources.

In aspects of these embodiments and by way of illustration, a control can be implemented as a Java® class and can be managed at runtime by a J2EE EJB container. The container can provide automatic transactions, asynchrony, state management and other services. In aspects of these embodiments, a control's Java® class definition includes annotations (e.g., Javadoc annotations) that define the control's runtime behavior. A control can use and be used from a web service, a pageflow, a JSP, a business process, a portlet and another control. Preferably, controls are community-scoped, since each is associated with a given community that created it.

As an illustration, code for creating a resource without the use of extensible controls can be similar to the example illustrated below.

```
//Create a property definition
PropertyDefinition[ ] propDefs = {
        new PropertyDefinition(new ID( ), "NAME", null,
        Property.STRING, false, false, false, false,
        true /*isPrimary*/, null)
};
ID typeID = new ID( );
typeID.setRepositoryName(repoName);
//Create a type with that property definition
ObjectClass oc = new ObjectClass(typeID, "PERSON_TYPE",
propDefs[0], propDefs);
oc = typeManager.addType(cc, oc);
```

```
// Create an instance of that type
Property[ ] nodeProps = {new Property("NAME", "Ray"};
Node node = nodeManager.addNode(cc, parentPath +
PathHelper.SEPARATOR + nodeName, ocName,
nodeHierarchyContentType, nodeProps);
// Create a node wrapper instance
Person person = new Person(node);
```

In one embodiment, using extensible controls can enable more developer friendly and less complex code. Thus:

```
//PersonCmxControl.jcx - creates type and instance
@Create(node Type = "PERSON_TYPE")
public Person createPerson (
        @Property(name="NAME, isKeyField = true,
        isPrimary=true) String Name
);
//In NewNodeControlImpl.jcs:
@Control NewNodeCmxControlBean newNodeControl;
Person person = newNodeControl.createPerson("Ray");
```

Administration tools can also be provided to enable users and developers to create new content types and to add new property types to the existing content types all during runtime. Templates can be provided for users to add their desired properties. For example, a user may edit the provided template to change the order of the properties for a given resource. Alternatively, the user may implement a custom template laying out the resource data type in a completely different manner, customized to the specific needs of the community.

Node wrappers can also provide various benefits to data access and manipulation. Access to data can be significantly simplified. For example, a call such as "getProperty("TITLE")!=null? getProperty("TITLE").getStringValue( ): null" can be abstracted into a much simpler call such as "getTitle( )." Type information as class rather than data can enable a Folders/Beans composite pattern which can mirror the Hierarchy/Content Nodes. Inheritance of common attributes can be supported and when used in concert with controls, node wrappers also serve to provide type safety.

Illustrated below are code examples for creating a newtype, newTypeCmxControl, newTypeControl and newTypeControlImpl in accordance with various embodiments of the invention. The code included in this application is not intended in any way to restrict the scope of the invention but is merely being provided for illustrative purposes.

```
//create NewType
//extend CommunityContent
public class NewType extends CommunityContent
//Node Conversion Constructor
public NewType(Node node) { this.node = node;}
//getters, setters
public String getProperty( ) {return
getValue(getNodeProperty("PROP")); }
public void setResolution(String r) {setProperty("PROP", new Value(r));}
//create NewTypeCmxControl
//extend CmxControl and annotate
@org.apache.beehive.controls.api.bean.ControlExtension
@CmxControl.RepositoryInfo(repositoryName=
"Community_Repository")
public interface IssuesCmxControl extends CmxControl
//@Create
@Create(nodeType="ISSUE")
public Issue createIssue(
@ParentId( )      ID     parentId,
@Property(name="PROP", isKeyField=true) String property)
) throws Exception;
//@FindBy (retrieve & delete)
@FindBy(expression="PROP == '{prop}'")
public NewType getNewType(String prop) throws Exception;
@FindBy(expression="PROP == '{prop}'", removeResults=true)
public NewType removeNewType(String prop) throws Exception;
//create newTypeControl
//extend CM_Control and annotate
@ControlInterface
public interface NewTypeControl extends CM_Control<NewType>
//create
public NewType create(ID parentId, String prop);
//retrieve
public NewType getNewType(String prop);
//create NewTypeControlImpl
//extend CM_Control and annotate
@ControlInterface
public class NewTypeControlImpl extends CM_ControlImpl<NewType>
        implements IssuesControl {
                        @Control IssuesCmxControlBean issuesBeanX; . . .
}
//create
public NewType create(ID parentId, String prop) {
        return issuesBeanX.createIssue(parentId, prop); }
public NewType create(String prop) throws Exception {
        return
        issuesBeanX.createIssue(DEFAULT_PARENT_ID, prop); }
//retrieve
public NewType getNewType(String prop) {
        return issuesBeanX.getNewType(prop); }
//delete
public NewType deleteNewType(String prop) {
        return issuesBeanX.removeNewType(prop); }
//delete
public NewType deleteNewType(String prop);
```

Figure 8B:
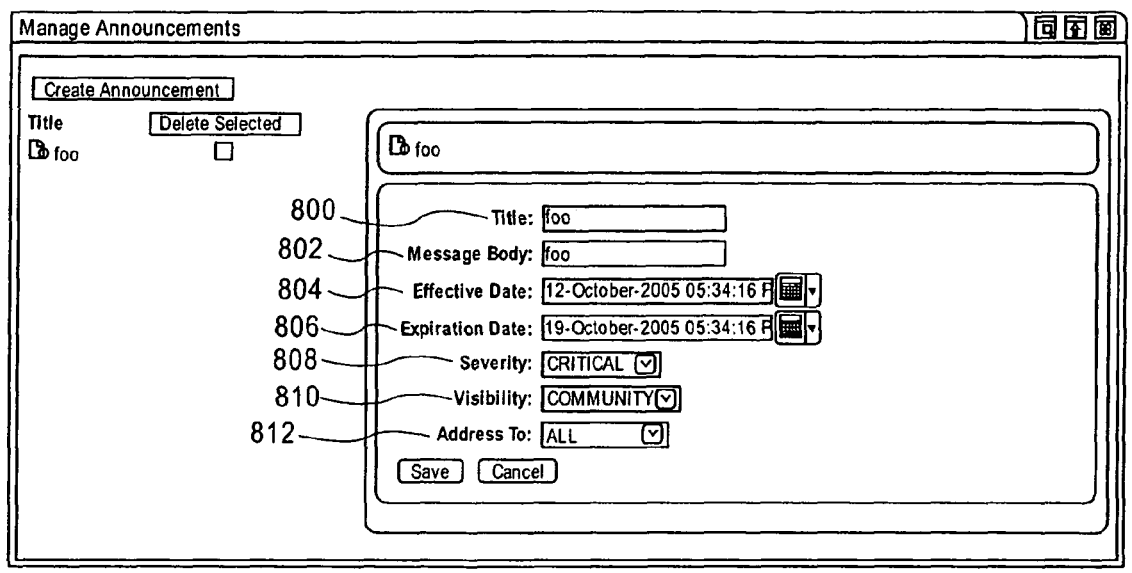
FIG. 8B is an exemplary illustration of the user interface implementing the extensible controls feature of the communities framework, in accordance with various embodiments of the invention.

FIG. 8B is an exemplary illustration of a graphical user interface for some benefits of the extensible controls feature of the communities framework, in accordance with various embodiments of the invention. As illustrated, one example of a collaborative resource may be the content data type announcement. An announcement can have several properties associated with it, such as Title (800), Message Body (802), Effective Date (804), Expiration Date (806), Severity (808), Visibility (810) and Address To (812). However, an enterprise may wish to define an Announcement in a different form, i.e. as containing other properties. Extensible controls can provide the developer with the ability to add new properties to the defined version of the Announcement resource, thereby creating a new and customized version of that resource. For example, one enterprise or community may wish the Announcement data type to contain the property Department, which may contain the department number of the Announcement's recipients, for example. Extensible Controls can allow the developer to add such a property. Furthermore, a user can also create entirely new collaborative resources at runtime by implementing extensible controls. Thus, an enterprise can define a new resource such as a Meeting (not shown), for example, which may contain its own user created and defined properties.

Figure 9:
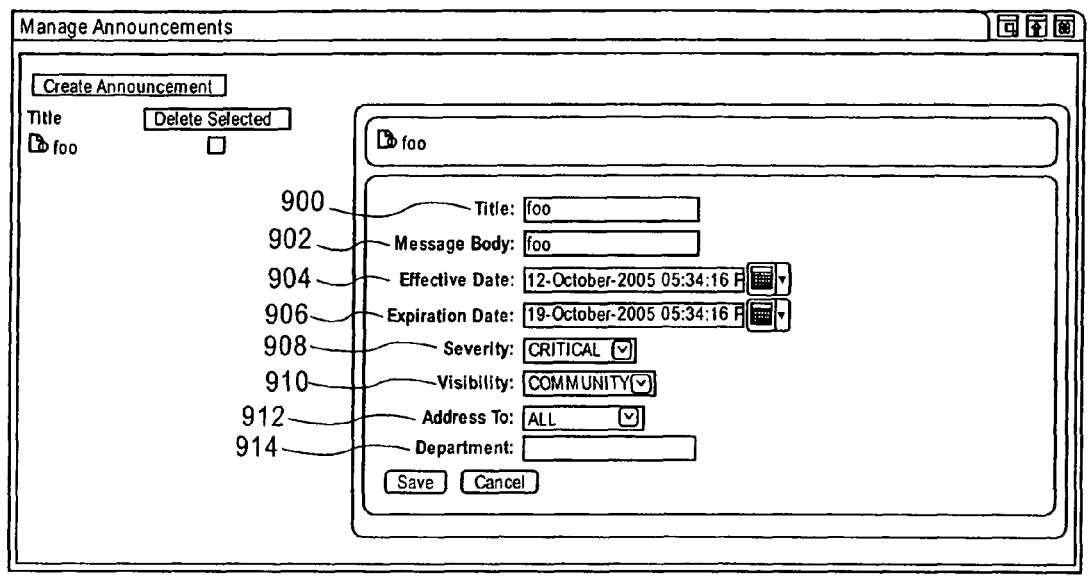
FIG. 9 is an exemplary illustration of the user interface implementing the extensible controls feature of the communities framework, in accordance with various embodiments of the invention.

FIG. 9 is an exemplary illustration of a graphical user interface displaying a user-edited version Announcement resource, in accordance with various embodiments of the invention. As previously described, a developer may wish to add the Department property to the existing Announcement type. The extensible controls feature allows the developer to do this without extensive knowledge of API editing or other technical expertise. Once a user has added the Department property (914) to the existing Announcement data type, the display of a new version of that resource is illustrated in FIG.

9. It can be seen that the Announcement data type contains all the previously shown fields such as Title (900), Message Body (902), Effective Date (904), Expiration Date (906), Severity (908), Visibility (910) and Address To (912). However, in addition, this resource now also contains the property of Department (914), as specified by the user. It should be noted that property fields such as Title (900), Department (914) and others can be arranged and rearranged in a different order, as well as removed from the Announcement data type alltogether. Similarly, entire new data types can be created by the user with new properties specified therein. In this manner, extensible controls provide for a more adaptive approach to creating and managing data types and allows for a much more fluid and user friendly system of collaboration.

In various embodiments, the communities framework can allow users to implement existing functionality such as Search or Analytics (as discussed below) as well as others, to interoperate with the newly declared and defined resources and properties. Thus, for example, users can search through the newly created resources, sort the resources by their new user-created properties or implement Analytics to monitor trends on the new resources. Of course, other such implementations are possible and well within the scope of the present invention.

Analytics

Another feature that can be provided to the communities framework is Analytics. Analytics can provide the functionality of data mining, trend observation, and community health monitoring to the communities framework. In other words, it can allow community users and administrators to view specified statistics pertaining to their community. Analytics can provide more than a mere snapshot who is on the website or how many visitors log onto the website. It is designed to monitor various aspects of the health of the community. For example, a developer may wish to monitor how many people are visiting the enterprise's website over a specific period of time. Alternatively, a community manager may wish to monitor how many members are becoming contributors to his/her community. Yet another member (e.g. community owner) may wish to observe how his/her community compares to other communities on a particular scale. All this information can be displayed graphically within a portlet as part of the communities framework.

Figure 10:
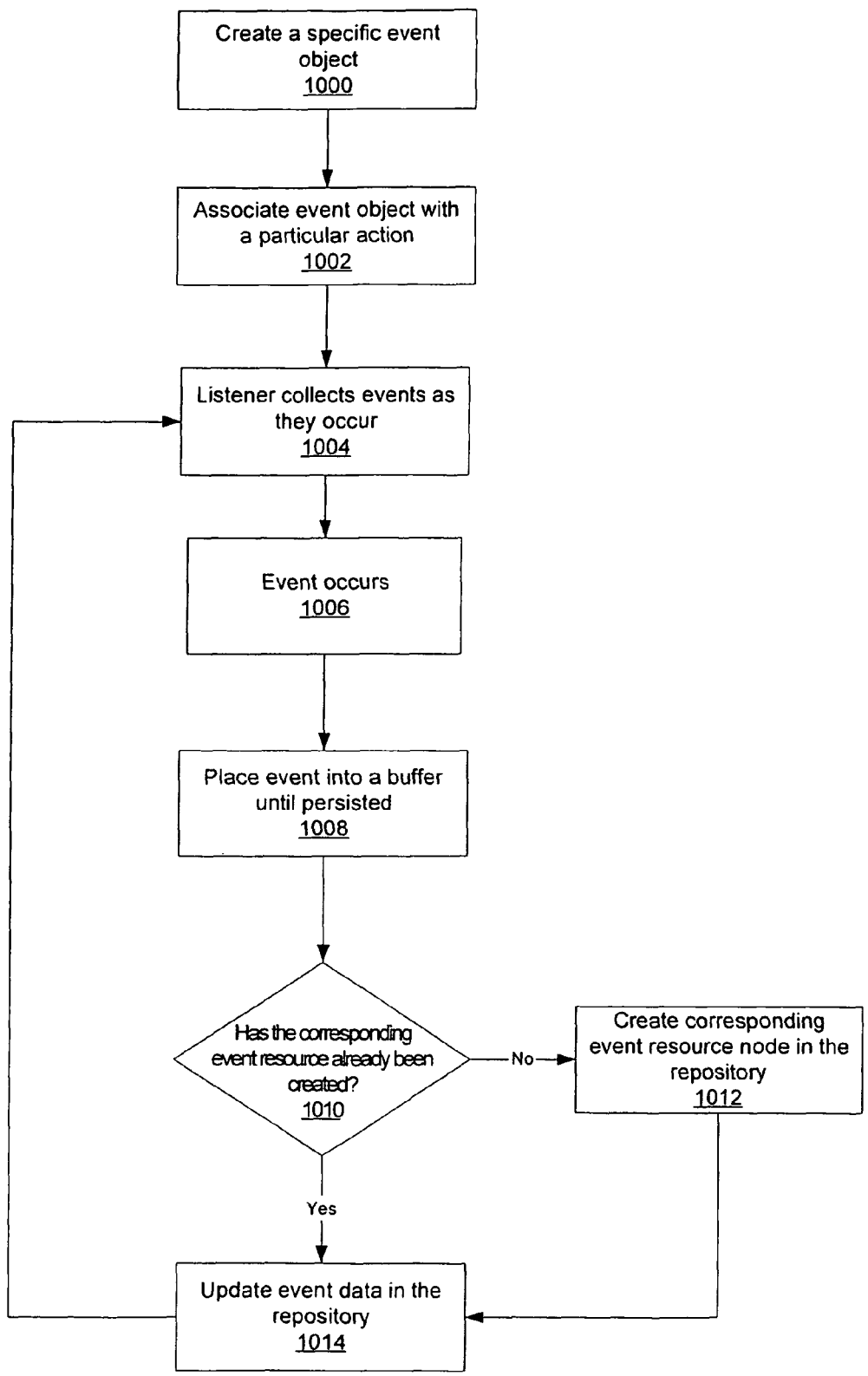
FIG. 10 is a flow diagram illustration of the functionality of the analytics feature in accordance with various embodiments of the invention.

FIG. 10 is a flow diagram illustration of the Analytics feature of the communities framework, in accordance with various embodiments of the invention.

In step 1000, a new event object is created. A developer can provide the name for the desired event. The analytics information can be derived from this custom created event object which can serve as a counter for the Analytics system, carrying a very minimal payload. The event object can contain a minimum of three attributes, namely event type, membership role and community URI. All events can be made to differ via the event type attribute that is set before dispatch. This allows for the creation of new events for use by the system simple by annotating the new event type before dispatch.

In step 1002, a developer can associate the new event with a some specific action in the communities framework. For example, the event can be associated with a particular pageflow or a Java Server Page (JSP). The analytics will then take care of counting, organizing and displaying the data associated with that event, such as for example counting the number of event occurrences.

In step 1004, a custom event listener can be implemented to collect community events as they occur. In step 1006, the action associated with the event (as shown in step 1002) may occur, thereby firing off the event. In step 1008, the event is placed into a buffer. A buffer object can be created in order to receive events from the listener and hold them until they are persisted into the content management system as illustrated and described in steps 1010, 1012, and 1014 below.

In step 1010, the system can determine whether an event resource data type has been created that corresponds to the event that has occurred. In one embodiment, for every event object that is created, there exists a corresponding event resource within the repository. For example, every event object can have a unique event type attribute which is used to describe the corresponding node within the content management system, which holds information for that event.

In step 1012, if no corresponding event resource exists, a new such resource can be created by the system. The new event resource node can contain the properties of description (i.e. a displayable description of the event the node contains information for), the current date, a counter and parent Id. All properties can be made to be single-valued and non-restricted. In other words, the new content management system node type can specify a displayable description of the event that the node contains information for, the current date, a counter for keeping track of the number of occurrences of the event and a parent_id. The new node can subsequently be added to the data hierarchy in the collaboration repository. In one embodiment, that new node will represent the event specified by the user or system and will keep a count of such events that have occurred. Users can also be provided with the ability to delete event information in case it gets too large.

In step 1014, the data for the event is persisted into the repository. For example in one embodiment, the counter for the number of occurrences of the event can be incremented and committed to the repository. An extensible CMXControl can be written in order to handle all interaction with the nodes in the content management system. A data content object can be created to wrap the analytics node type. Multiple components may be implemented to handle the management of the buffer and to manage persisted analytics data and creation of analytics charts. These components can take various forms such as objects, beans or any other components that are reusable program building blocks or can be combined with other components in the same or other computers in a distributed network to form an application.

Analytics can provide users with the ability to create any event types that they choose. For example, a developer can provide an event name to the event object and place it onto the pageflow or JSP that should be associated with that event. The Analytics feature of the communities framework can then keep track of these events and organize them in the repository such that a user can display a number of events that created during the course of some time period. A portlet may be provided to display a created chart of the analytics data to the user. The user can be given an option to select a collected statistic and a time frame (e.g. week, month, year). The matching chart can then be displayed in the analytics portlet. In this fashion, analytics allows the system administrator or developer to efficiently monitor the health of a particular community, such as whether it is growing or whether it is dying off, whether members are interested in becoming contributors, or some other trend of interest.

Unique Key Stores

Another feature that can be provided to the communities framework is Unique Key Stores for the content management system. The Unique Key Stores feature can allow a user or developer to specify several properties of a resource, which can then be used to identify that resource and to make it unique. As an illustration, two different members of one community may wish to create a resource with the same name within the content management system. This may create problems because in content management systems, uniqueness of data is typically guaranteed based on the names of particular resources. Thus, if two resources have the same name, the uniqueness of data may be jeopardized. Yet it may be desirable to allow several users to create resources with identical names. The communities framework provides a way for a developer to specify a different field or several fields from which data can be guaranteed to be unique.

Content management systems are generally hierarchical in nature and define uniqueness much like a file system. In one embodiment, all entities (nodes) within a repository of content have a name. That name is typically unique within the context of its containing folder. The node is uniquely identified within that repository by its name and path of containing folders. This is analogous to a fully pathed file name such as "c:\folder1\folder2\fileName.txt" This can be very limiting. The name field of a node in the content management system is usually of a limited size, such as 50 characters, for example. On the other hand, forcing hierarchy onto the data is not always the best idea, often more than one property of a node makes it unique. In one embodiment, to remedy this problem a unique key can be generated for a given type. Thus, a node can be uniquely identified per type/objectClass within the content management system. The author of extensible controls can designate which of the node properties will be used to define uniqueness. As an illustration, for a link, it might be the combination of a title, description and owner properties. In one embodiment, a unique key can be generated by taking into account these properties. In an alternative embodiment, the system can dynamically perform a comparison of the two resources without the necessity of actually creating a key.

In one embodiment, two different members of the community may wish to create a collaboration resource Link and name that Link "link_A." Normally, the content management system would not allow both members to create such a Link because it would not have a way of making those two Links unique from each other. Unique Key Stores, however, gives the ability to a developer to specify which fields can make that Link unique. Thus, a developer may notify the content management system to combine the Name, Visibility and the Owner properties of each Link, thereby making each Link named "link_A" unique as to each other. The two members would thus be allowed to create their versions of the link "link_A." Other property fields may also be specified by the developer in accordance with various embodiments of the invention.

Figure 11:
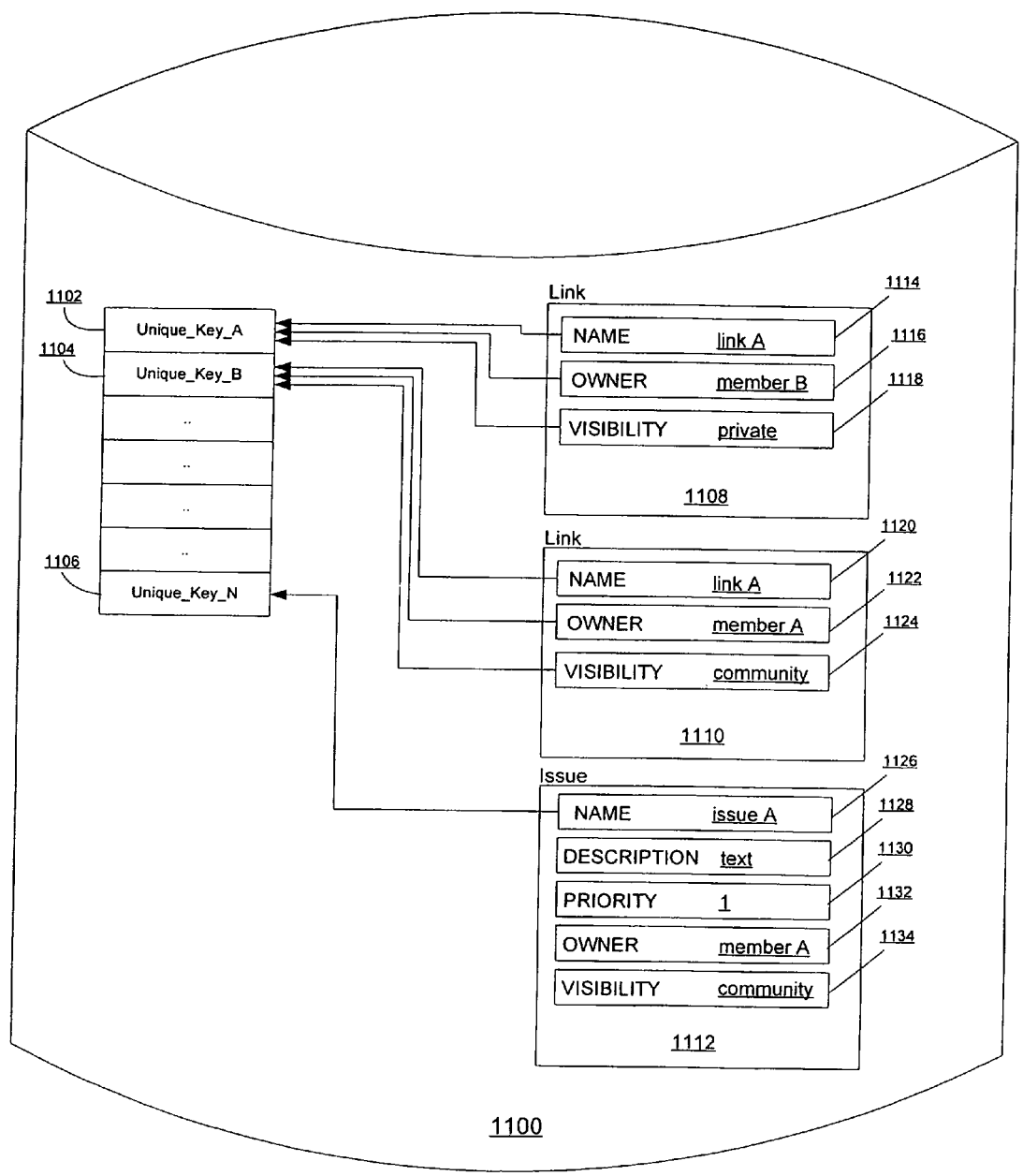
FIG. 11 is an exemplary illustration of the unique key stores feature of the communities framework, in accordance with various embodiments of the invention.

FIG. 11 is an exemplary illustration of the unique key stores feature of the communities framework, in accordance with various embodiments of the present invention. Two members of a community may each wish to create a link within the repository (1100). The content management system must have a way of making certain data types such as links unique as to one another in order to provide access to the data. Thus, a unique key, such as unique_key_A (1102), unique_key_B (1104) and unique_key_N (1106) can be generated for each collaboration resource such as the two links (1108, 1110) and the issue (1112) within the repository (1100). A unique key can be generated from one or more properties of each collaboration resource, as dictated by the user. For example, the user may opt for the name (1114, 1120), the owner (1116, 1122) and the visibility (1118, 1124) properties to be used in generating a unique key for the link collaboration resource (1108, 1110). Such an implementation would allow two members to each create a link with the same name as the other member such as "link_A" as illustrated above.

Meanwhile, other collaboration resources such as an issue (1100) could have their unique keys generated from other properties such as name (1126), description (1128), priority (1130), owner (1132) and visibility (1134). As illustrated in FIG. 11, for example, a user can select only the name (1126) field to be used in generating the unique keys for issues resources. In alternative embodiments, the properties can be dynamically compared and no actual key needs to be generated. The implementation of the two options can be made configurable. In this manner, the unique key stores feature allows for a much more flexible and user-adaptable collaboration and community customization.

Dynamic Content

Another feature that can be provided to the communities framework is dynamic content. A dynamic content tag library can be provided for allowing developers to add dynamic content functionality to a portlet, without any need for javascript coding or API editing. The dynamic content feature provides users with the ability to update a certain portion or portlet of a page or a portion of a portlet. In other words, it can allow for granular micro-interaction between the server and the browser without reloading the entire browser each time that interaction occurs.

A dynamic container can be declared to be a targeted dynamic area in the user interface which can be updatable dynamically. The dynamic container (such as an HTML table) can be specified by an id number. An update request can be executed implementing a series of actions (e.g. pageflow actions), the results of which return an HTML fragment to replace the contents of the dynamic container marked by the appropriate id number. Thus, a client request can be populated by parameter tags and executed behind the scenes, without the need to refresh the entire browser.

One advantage of updating the dynamic container in such a fashion is that the page flow actions implemented are completely normal and the Java Server Pages (JSPs) that they forward to are also completely normal, i.e. there is nothing different that must be modified in order to achieve dynamic updates. No Javascript needs to be written by the developer, the dynamic content tags provide all of the Javascript and other coding necessary. A developer can thus merely target a particular action with dynamic content tags and the rest is generated for him. A JSP can be passed a parameter to populate a certain portion of a web page with the results of a particular action. The dynamic tags can run pageflow actions which run the logic and then forward off to a JSP. The JSP can be a page fragment, a portlet fragment, a table, a table fragment or some other piece of the page that gets forwarded to by the pageflow action. Thus, the developer can use regular tags, JSPs and regular pageflow actions to implement dynamic content tag updates in a completely normal web development experience, without the requirement of in-depth knowledge of Javascript or other complex programming languages.

In one embodiment, Asynchronous JavaScript And XML (AJAX) type functionality can be provided. Thus, instead of the traditional form of client-server communication where the client sends a completed form to the server and the server responds by sending a new web page, a more modular form of interaction is possible. An AJAX application can send a request to the web server to retrieve only the data that is needed, such as by using a SOAP or XML-based web dialect. Consequently, a much more responsive interface can be achieved because the amount of data exchanged between the web server and the client is significantly reduced. In turn, a higher number of client-server transactions could be supported by one server, since dynamic content tags enable for much smaller communications between the server and each client. For example, merely a portlet can be updated instead of refreshing the entire browser. Furthermore, even more granularity can be provided with the dynamic content tags feature. Just one piece of the portlet's user interface can be updated dynamically without the need to update the entire portlet. For example, a stock trading value within a portlet can be updated via the dynamic content tags feature, without re-posting the entire browser or even the portlet. Full pages, portions of pages, tables, portions of tables as well as other pieces and segments can be updated dynamically. Such granularity of communication allows for a much more responsive user interface and data exchange. Another advantage can be reduced server workload because the server is not burdened with re-running security on every portlet, re-rendering all HTML for the entire page and re-downloading all of the Javascript every time that a communication occurs. Instead, only the necessary updates are sent via this dynamic granular interaction.

Figure 12A:
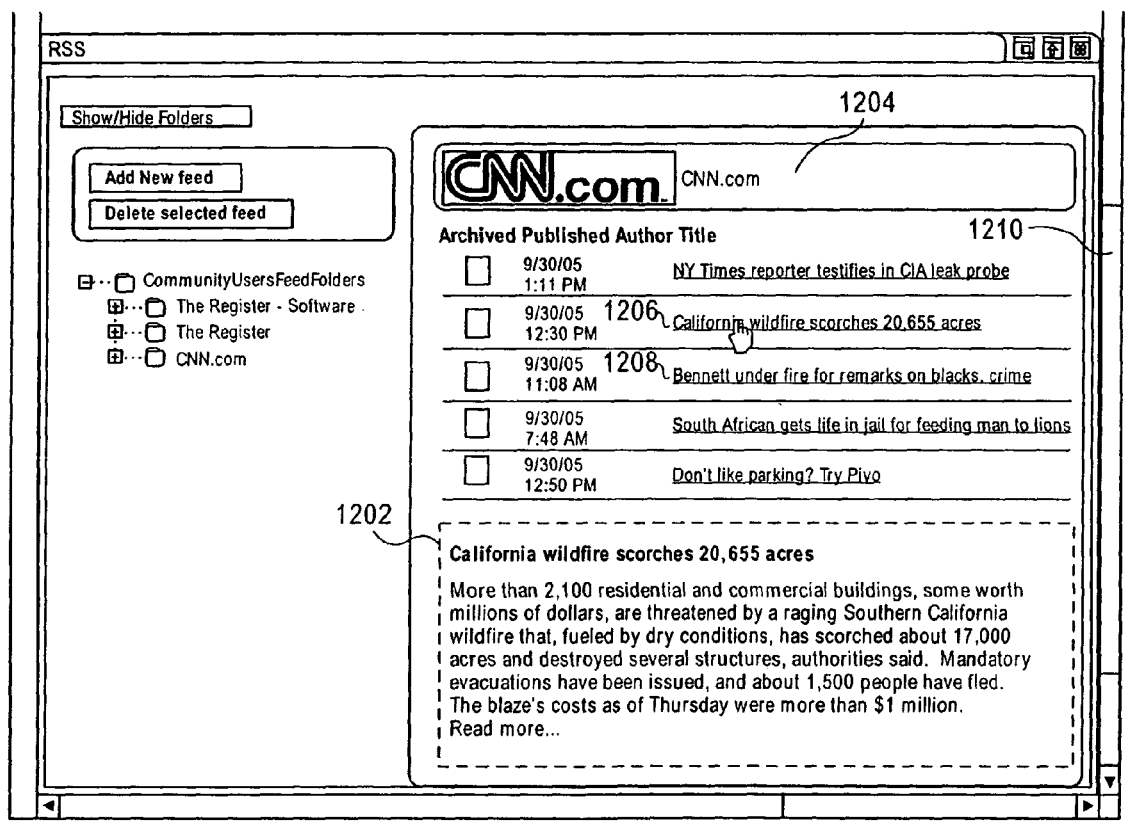
FIG. 12A is an exemplary illustration of the user interface implementing the dynamic content tags feature of the communities framework, in accordance with various embodiments of the invention.

FIG. 12A is an exemplary illustration of a graphical user interface during the execution of dynamic content feature, in accordance with various embodiments of the invention. RSS (1200) is a rich site summary feed implemented as a portlet on a page, which provides constantly updated content from other web sites that a community member may have subscribed to. For example, this user has subscribed to the CNN® (cable news network) website and consequently the RSS portlet is displaying a list of web links (1204) to various news stories offered on CNN. The dynamic container (1202) is set to display a selected news story or a portion thereof. In FIG. 12A, the user has selected the news story "California wildfire scorches 20,655 acres" (1206) and the dynamic container (1202) is displaying the text of the appropriate news story.

Figure 12B:
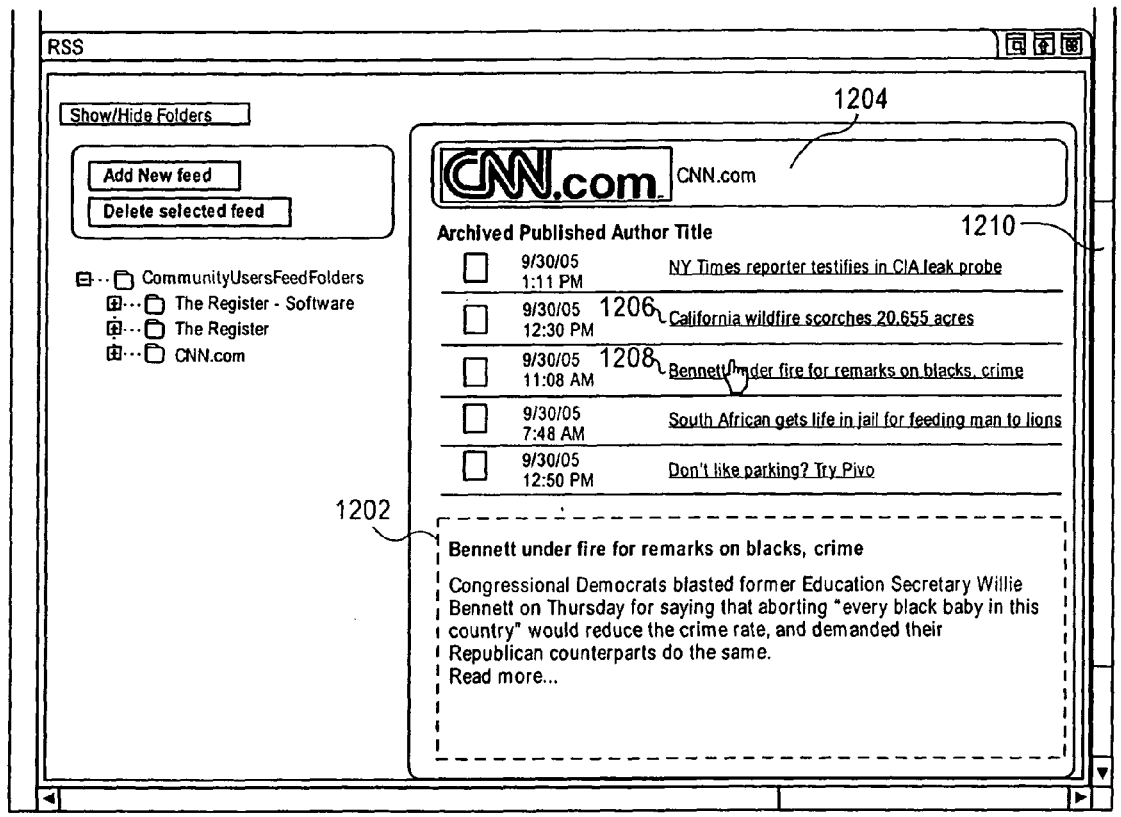
FIG. 12B is an exemplary illustration of the user interface implementing the dynamic content tags feature of the communities framework, in accordance with various embodiments of the invention.

In FIG. 12B, the user has clicked on the next story link, i.e. the "Bennett under fire for remarks on blacks, crime" link (1208) and the dynamic container (1202) has changed accordingly to display the text of that news story. An update request was executed behind the scenes, the results of which returned an HTML fragment to replace the contents of the dynamic container with a new news story corresponding to the link that the user has clicked on. It is important to note that while a communication occurred between the user's desktop and the CNN server, the entire page did not get re-posted. For example, the scroll bar (1210) did not get re-sent to the top of the web page, as normally happens during a full refresh of the entire browser. Similarly, if some forms were filled out on the other parts of the page, they would not have been erased. Only the contents of the dynamic container (1202) were updated by this piece of micro-interaction between the CNN server and the client computer.

The dynamic content feature can be implemented by various services in the communities framework. For example, during drag and drop (as described in further detail below) only the resource drop zone may be updated, instead of refreshing the entire browser. Similarly, other services and features can use the functionality of the dynamic content tags in order to provide a more dynamic and responsive user interface. The amount of data exchanged between the server and various clients can also be greatly reduced, leading to performance enhancements and ability to support more numerous users and clients per each server.

The dynamic content tags allow a hit to the same pageflow instance that the portlet is running against. For example, in a pageflow based portlet, the state of the portlet along with other variables can be maintained by the pageflow. In one embodiment, access to these variables, such as the state of the portlet, is available during the dynamic content tags based update. During a regular re-post of a page, if a user leaves the page and subsequently returns, the pageflow remembers the state, what was selected on the page and any values that may have been set or forms that may have been filled out by the user. In one embodiment, the same access to the pageflow state and other variables is available to the dynamic content tags updates. Thus, the client server can interact with the dynamic update and access to the pageflow state is provided.

Figure 12C:
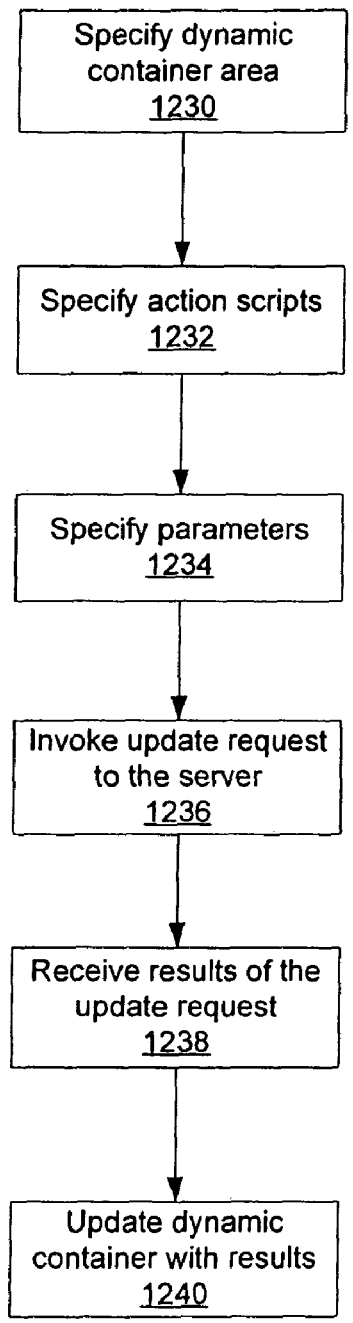
FIG. 12C is a flow diagram illustration of the dynamic content feature, in accordance with various embodiments of the invention.

FIG. 12C is a flow diagram illustration of the dynamic content feature, in accordance with various embodiments of the invention. In step 1230, a dynamic container tag can be provided to specify the targeted area on a client's user interface to be updated dynamically. This area will be referred to as the dynamic container and can take the form of an HTML table or some other portion of the page on the user interface that may be referenced by some assigned unique id. In step 1232, a series of container action script tags can be provided to specify the action (such as a pageflow action for example) to be executed. In step 1234, parameter tags can describe the parameters which will be used to populate the action described by the action script tags. In step 1236, the action can be executed. In one embodiment, the action can take the form of an update request and the results of the request can return the HTML fragments with the intention to replace the dynamic container. In step 1238, the client can receive the results of the action (e.g. update request). Thus, in step 1240, the old contents of the dynamic container can be deleted and replaced with the new contents returned by the specified action script. In various embodiments, other action script tags can also be provided to specify which actions can be used to update this particular dynamic container area.

As an illustration, one Java Server Page (JSP) that implements dynamic content tags can be written as follows:

```
<%@page contenType="text/html; charset=UTF-8" language="java"%>
<@page import="org.apache.beehive.netui.pageflow.PageFlowUtils"%>
<@ taglib uri="http://java.sun.com/jsp/jstl/core" prefix="c"%>
<@ taglib uri="http://java.sun.com/jsp/jstl/fmt" prefix="fmt"%>
<%@ taglib uri="http://beehive.apache.org/netui/tags-html-1.0" prefix="ne tui"%>
<@ taglib uri="http://beehive.apache.org/netui/tags-databinding-1.0"
    prefix="netui-data"%>
<@ taglib uri="http://www.bea.com/servers/portal/tags/netuix/render"
    prefix="render"%>
<@ taglib uri="dragdrop.tld" prefix="dragdrop"%>
<@ taglib uri="/WEB-INF/tags/wlpGroupSpace/util"
    prefix="wlpGroupSpaceUtils"%>
<@ taglib uri="dc.tld" prefix="dc"%>
<fmt:bundle basename="${pageFlow.il8nBundle}">
<fmt:message key="add.issues.link" var="addIssues"/>
<fmt:message key="add.folder.link" var="addFolders"/>
<fmt:message key="in.label" var="inLabel"/>
```

```
</fmt:bundle>
<fmt:bundle basename="com.bea.apps.groupspace.Common">
<fmt:message key="toggle.folders" var="toggleFolders"/>
</fmt:bundle>
<%
String theHref = PageFlowUtils.getRewrittenActionURI(pageContext.getServlet
Context( ), request, response, "searchIssues",)
String[ ][ ] tabsArray = new String[2][2];
tabsArray[0][0] = "Browse";
tabsArray[0][1] = null;
tabsArray[1][0] = "Search";
tabsArray[1][1] = theHref;
%>
<dragdroy dragDropScript/>
<dc:script/>
<wlpGroupSpaceUtils:renderTabs tabsArray="<%=tabsArray%>"/>
<br>
<dragdrop:dragDropScript/>
<button onclick="toggleFolderView('<netui:rewriteName name='treeContainer
<table width="100%" border="0" cellspacing="0" cellpadding="3">
<tr>
<td valign="top" width="0%" id="<netui:rewriteName name='treeContainer'/>"
        nowrap>
<wlpGroupSpaceUtils:roundedBox outerColor="white" innerColor="graylight"
        innerStyle="padding:6px;padding-bottom:12px;">
<wlpGroupSpaceUtils:roundedBox outerColor="gray-light" innerColor="gray-dark">
<dc:container dcContainerId="selectNode">
<dc:containerActionScript action="selectNode" initial="true">
</dc:container>
</wlpGroupSpaceUtils:roundedBox>
<dc:container dcContainerId="issuesTree">
<dc:containerActionScript action="displayIssuesTree" initial="t rue" async="false"/>
<dc:containerActionScript action="moveIssue">
<dc:containerActionParam name="sourceId" jsEval="getSourceId( )"/>
<dc:containerActionParam name="targetId" jsEval="getTargetId( )"/>
</dc:containerActionScript>
</dc:container>
</wlpGroupSpaceUtils:roundedBox>
</td>
<td valign="top" width="100%">
<dc:container dcContainerId="issueDetails">
<dc:containerActionScript action="displayIssueDetails" initial="t rue"
        async="false"/>
<dc:containerActionScript action="removeIssue" async="false"/>
<dc:containerActionScript action="addEditIssue"/>
<dc:containerActionScript action="editIssue" async="false">
<dc:containerActionParam name="title" inputId="title"/>
<dc:containerActionParam name="description" inputId="descriptio n"/>
<dc:containerActionParam name="resolution" inputId="resolution">
<dc:containerActionParam name="status" inputId="status"/>
<dc:containerActionParam name="priority" inputId="priority"/>
<dc:containerActionParam name="owner" inputId="owner"/>
<dc:containerActionParam name="knowledgeBase" inputId="knowledgeBase"/>
</dc:containerActionScript>
<dc:containerActionScript action="createIssue" async="false">
<dc:containerActionParam name="title" inputId="title"/>
<dc:containerActionParam name="description" inputId="description"/>
<dc:containerActionParam name="resolution" inputId="resolution"
<dc:containerActionParam name="status" inputId="status"/>
<dc:containerActionParam name="priority" inputId="priority"/>
<dc:containerActionParam name="owner" inputId="owner"/>
<dc:containerActionParam name="knowledgeBase" inputId="knowledgeBase"/>
</dc:containerActionScript>
<dc:containerActionScript action="addEditIssueFolder"/>
<dc:containerActionScript action="createIssueFolder" async="false">
<dc:containerActionParam name="title" inputId="title"/>
</dc:containerActionScript>
<dc:containerActionScript action="editIssueFolder" async="false">
<dc:containerActionParam name="title" inputId="title"/>
</dc:containerActionScript>
<dc:containerActionScript action="nextFolderChildrenPage" async="false">
<dc:containerActionScript action="prevFolderChildrenPage" async="false">
```

```
<dc:containerActionScript action="lastFolderChildrenPage" async="false">
<dc:containerActionScript action="firstFolderChildrenPage" async="false">
</dc:container>
</td>
</tr>
</table>
<script language="javascript">
        function toggleFolderView(theId)
        {
                var obj;
                if(obj = document.getElementById(theId)){
                        if(obj.style.display == "none"){
                                obj.style.display = "block";
                        }
                        else{
                                obj.style.display = "none";
                        }
                }
        }
</script>
</script>
```

Notification System

Another feature that can be provided to the communities framework is the notification system. For example, a notification manager can provide the community with the functionality of monitoring various announcements and display them as they become due. In one embodiment, the notification manager can be implemented as a work manager timer object provided by the WebLogic® Server from BEA Systems Inc. The notification manager can be set to execute every n seconds (n seconds being some arbitrary specified period of time) and during one these executions, it can determine whether there are any announcements in the repository which need to be sent to their respective recipients or some other updates that may need to be executed.

Figure 13A:
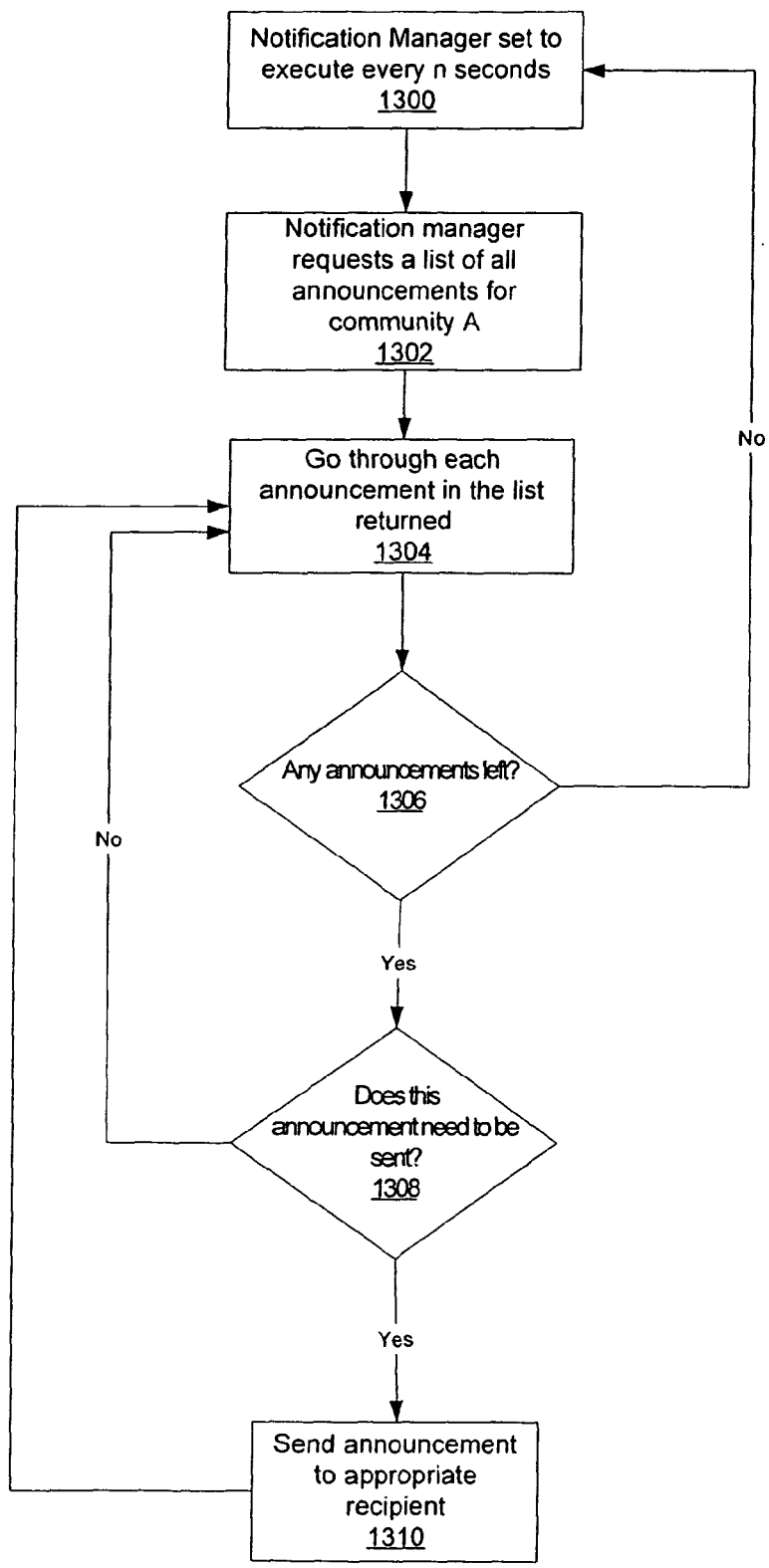
FIG. 13A is a flow diagram illustration of the functionality of the notification manager in accordance with various embodiments of the invention.

FIG. 13A is a flow diagram illustration of the notification manager managing various announcements, in accordance with one embodiment of the invention.

In step 1300, the notification manager may be set by the developer or user to go off and execute every 30 seconds. At this time the notification manager would request a manager class object to provide it with a list of all the announcements for this community within the repository, as illustrated in step 1302.

In step 1304, the notification manager would then iterate through each announcement in the list of returned announcements to determine whether it is time for the particular announcement to be sent to its recipient. Thus, during each iteration, the notification manager would check if there are any more announcements left (step 1306) and if there are, it would determine whether it is time for that announcement to be sent to its recipient (step 1308). It could use the announcement's property of notification_date in determining whether it is time for the particular announcement to be sent. If the announcement should be sent, the notification manager can send the announcement (step 1310) and continue with the iteration through the announcement list. The notification manager can obtain the recipient information for the announcement from its address_to field. If there are no more announcements left in the list, the notification manager could then go back into dormant state and wait until its next execution time.

Figure 13B:
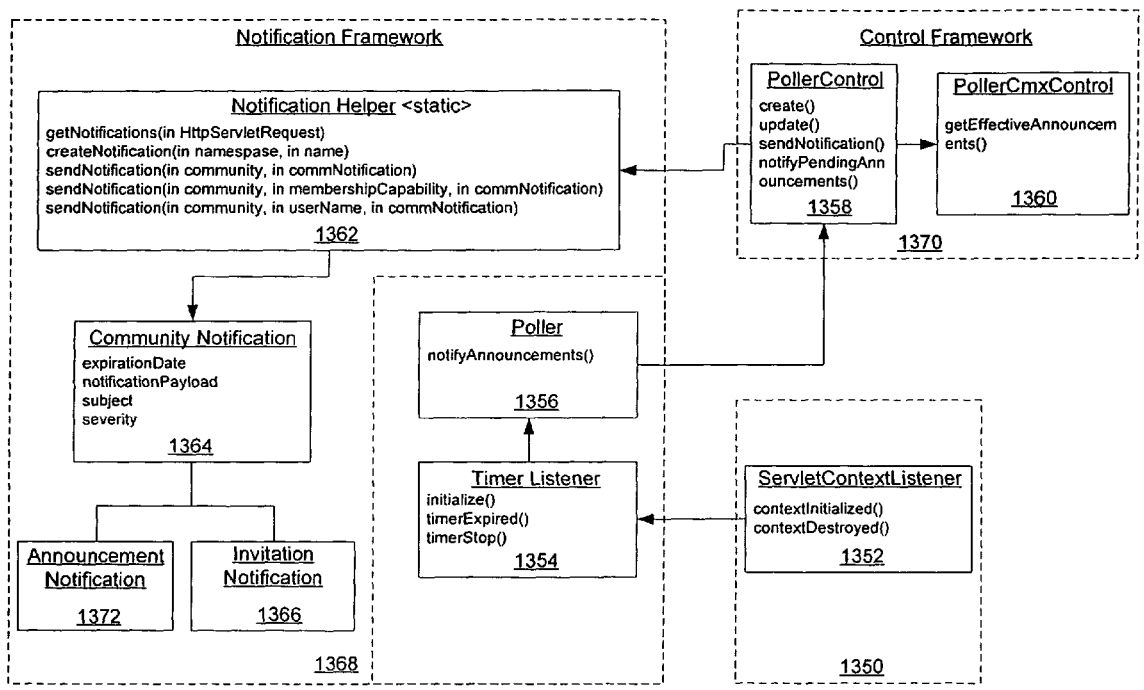
FIG. 13B is an exemplary illustration of the notification system class diagram in the communities framework, in accordance with various embodiments of the invention.

FIG. 13B is an exemplary illustration of the notification system class diagram, in accordance with one embodiment of the present invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As shown, notification can be provided for all announcements that are currently in effect. The servletContextListener (1352) can be implemented for listening to the servlet context events and responding to them via an appropriate interface. The timer listener (1354) object can be created for monitoring the timing intervals (if used) and for listening to invocations (or pings) from the client. The timer listener (1354) can invoke the poller (1356) object by calling upon a notifyAnnouncements( ) method. The poller (1356) class can be responsible for notifying the proper recipients of their respective announcements. It can use the control architecture (1370) in this endeavor. For example, the poller can implement generic pollerControl (1358) via the notifyPendingAnnouncements( ) method. The pollerControl can have the extensible pollerCmxControl (1360) associated with it for handling interaction with the nodes in the repository. Thus, the generic pollerControl can implement the extensible pollerCmxControl via the getEffectiveAnnouncementsToNotify ( ) and pollerControl can also implement sendNotification( ) for every announcement returned. The static notificationHelper (1362) can be responsible for creating the communityNotification (1364) and returning the implementation of the communityNotification to the pollerControl. The pollerControl can also be responsible for setting the attributes of the notifications and sending them appropriately. The announcementNotification (1372) and the invitationNotification (1366) classes can inherit from the communityNotification class and can be specific for each type of resource.

In one embodiment, the notification manager can be located on a server and can be executing in response to the client pinging for notifications. Any community application or portlet can register itself with the notification service in order to communicate to registered community members changes that occur within the application. For example, the issues log portlet can allow for community members to register their interest in changes to certain specific issues or to all issues resources. Afterwards, when issues are updated or new issues are added, the appropriate members can be notified of the change. As such, pinging for notifications allows community members to be notified upon updates to any of their subscribed-to information.

In one embodiment, the client can ping the server every so often, inquiring into updates of any information that the client has subscribed to. The server can then call on the notification manager to look up relevant information for that client that it knows and then return that information to the client. In one embodiment, the notification manager can know of this information through the publish and subscribe service. Thus, the information can be updated to the client automatically, requiring no input from the user. For example, newly arrived emails, tasks that are due soon, calendar items, meeting reminders, announcements sent to the member, invitations to a meeting, as well as other information can be updated by the notifications manager. In one embodiment, the server is informed of the community member's registered interests by the publish and subscribe service and upon each ping, the notifications manager can check the relevant updates for that community member. It can then call on the notifications center service (portlet) to modify the member's UI to display updated information.

One advantage of the pinging for notifications feature is that all of its functionality can be accomplished without the need for any server push. One commonly known way to provide automatic notifications of updated information to a client without the client requesting such information, is by implementing some sort of server push. A server push is a process whereby a server maintains an open connection with a browser after the initial request for a page. The server can then force-refresh the browser on the client every time a piece of information is updated on the server. There are multiple disadvantages with this type of system. Firstly, server push works poorly over slower networks. Secondly, it is difficult to implement server push and additional technology is typically required such as a flash plugin installed or an additional applet running in the background. The present system eliminates the need for such technology by employing the pinging for notifications feature. Another advantage of this type of system is that the notification process can implement the dynamic content tags feature instead of merely notifying the user upon web page refreshes. Thus, a community member may be informed of new notifications without requiring any action on his or her part and a granular portion of a page can be updated rather than fully re-posting the entire page.

Figure 14:
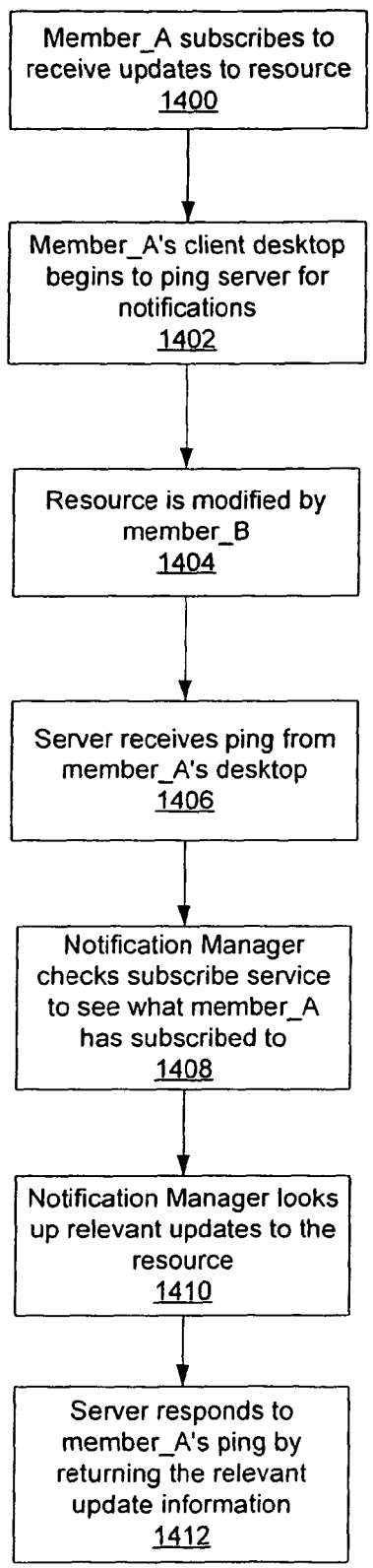
FIG. 14 is a flow diagram illustration of the functionality of the pinging for notifications feature in accordance with various embodiments of the invention.

FIG. 14 is a flow diagram illustration of the pinging for notifications feature functioning in combination with the notifications manager.

In step 1400, a member of a community, such as member_A can subscribe to receive notifications of any updates of a particular collaboration resource such as all the issues for example. In another embodiment, the member can subscribe to receive notifications about other data, such as reminders about tasks due, new emails and invitations. The publish and subscribe service can provide the member with this ability.

In step 1402, after subscribing, member_A's desktop can continuously ping the server for any updates to the presently available Issues. For example, the client computer can ping the server every fifteen seconds, requesting any available updates for member_A. The specific time amount can be configured by the user. Each ping can be implemented to send a minimum amount of information required, such as the user_id of member_A as well as any other necessary identifications (e.g. id of the community that member_A is in). By minimizing each ping, the performance of the notifications system can be significantly improved. Furthermore, the dynamic content feature (as described above) can be implemented in conjunction with the notification system so as to take advantage of more granular and dynamic client/server interaction.

In step 1404, the resource is modified in some manner. For example, another member_B may subsequently create a new issue and add it to the list of presently available issues. Upon receipt of the next ping, the notifications manager can then look up and update the relevant information.

Thus, in step 1406, the server would receive a ping from member_A's desktop requesting any available updates for member_A. At this point, the server can determine who is requesting the particular update/notification. In other words, the notification manager can determine from the ping which member is logged onto the client that sent the ping.

In step 1408, the notifications manager (preferably located on the server) can look up what information to update for member_A. There are several ways that it can perform this function. In one embodiment the notification manager can call on the publish and subscribe service to determine which information member_A has subscribed to. For example, member_A may have previously subscribed to receive updates of a particular stock price displayed in a portlet. The notification manager would know this from the publish and subscribe service and could go out acquire the required information. In an alternative embodiment, the notification manager does not require any input and can perform its own logic determining the appropriate information to return. For example, the notification manager may know to check for any new emails, announcements and/or invitations for member_A, all without requiring any input from the subscription service.

In step 1410, once the server knows that member_A has subscribed to updates of all issues, it can look up the change to the list of issues. In step 1412, the server can then return the relevant information back to the original pinging member_A. For example, the notifications manager can update the user interface portion of member_A's desktop automatically to display the updated information, without requiring any input from member_A. The notifications manager can be AJAX based. The dynamic content tags feature can be used in conjunction with the notifications manager in order to more responsively update the member's particular portlet or portion thereof. For example, a value within a portlet may be dynamically updated each time the notification manager updates it, without re-posting the entire browser. Thus, a granular and preemptive updating process is achieved, yet requiring very little or no user interaction.

Each ping can be implemented to be abstract and nonspecific so as to process the smallest possible amount of data. Thus, rather than asking the server for updates to a specific type of information (requiring the identification of that information), the client can instead send a much less complex request, such as a ping for any available information carrying the particular user's user_id. The server can then look up the relevant updates for that client which it can obtain from the publish and subscribe process discussed above and return that information to the requesting member. In other embodiments, each ping can also carry more information such as the identification of the requested info. The dynamic content tags feature can also be implemented with pinging for notifications, in order to more responsively update the user interface of the requesting member, without the need to refresh the entire page. The pinging for notifications can also be implemented with other services and portlets, enabling a more dynamic community membership experience. For example, any selected page value can be updated or notified by the pinging for notifications feature. A member can be automatically notified whenever a new email arrives addressed to him or her. In another embodiment, a member can be notified soon before a particular task becomes due as a reminder to complete that task. Whenever a member is invited to join a community, the notifications system can notify the member of this new invitation automatically. Yet in another embodiment, once an announcement is sent to multiple members, the notifications manager can notify each recipient member about the announcement and update their user interface accordingly. The notifications manager can perform all of the logic required, such as determining what kind of information needs to be looked up and when the user needs to be notified. This can free up each client from performing these tasks thereby enabling a faster and more dynamic community experience. A variety of notifications and reminders can be aggregated into one user interface, pulling various messages from multiple communities. Caching techniques may also be implemented, so as to improve access time to group projects and updates to information shared by multiple members. For example, there may be a large number of clients pinging for notifications of a specific item of data (e.g. a weather portlet update). In that scenario, it is undesirable for the server to retrieve the information repeatedly upon every ping/request for it. The notification system can implement caching in an effort to reduce such number of retrievals. Thus, upon the first ping, the notification manager can store the weather update information in a cache and upon subsequent pings from other clients, it have access to that information without the need to retrieve it again.

In one embodiment, a notification center portlet may be implemented for providing retrieved information to the user. For example, once a member is notified of a particular announcement, he may call the notification center portlet to display, organize and browse the appropriate data. The notification center can also be implemented to call upon other portlets for displaying the relevant data. As an illustration, member_A can be notified by the notifications manager of several announcements that are directed to that particular member. The notification center portlet can be rendered on member_A's desktop, informing him that several announcements are ready for viewing. Once member_A opens the window, the notification center can then call the appropriate announcement portlet to display each specific announcement.

Resource Interlinking

Another feature that can be provided to the communities framework is resource interlinking. A collaboration resource can allow for relationships to other collaboration resources. Each collaboration resource can allow other collaboration resources to be linked or related to it by a one-to-many type of relationship. These relationships can be turned into hyperlinks that activate the correct viewer or editor portlet for the particular resource type referred to.

In one embodiment, resource interlinking could implement the link properties type feature of the content management system. Any data within the content management system can be associated with any other data in the content management system, so long as one of those pieces of content has a link properties type on it. The link properties type can be a property type that a developer adds to a piece of content. In this manner, a relationship among two or more resources can be created. The content management system typically does not imply anything about what these relationships can mean or how to take advantage of them or how to navigate between them. Content within the repository can be of different types, i.e. containing different properties. For example, one resource may have the properties author, department number, and owner, while another resource may have entirely different properties (e.g. severity, description, etc.). Furthermore, some of this data may not even be intended to be human-readable. Thus, various viewer portlets may need to be provided for displaying resource information to the user, including its properties.

Because any resource type can be linked to any other resource type, the system should preferably determine what type of resource is linked to the selected resource. The system can then determine which associated viewer portlet can best display this type of content to the user. Thus the correct portlet should be called upon to view the data for the linked resource in some coherent fashion. For example, the announcement resource may have the view_announcement portlet, the document may have its own view_document portlet and so on. The system can determine which type of resource is linked and force the portal browser to navigate to and execute the portlet associated with that resource.

A relationship amongst resources can be specified via the drag and drop feature (as discussed below), or by pasting or in some other manner as available in the art. The related resources can be displayed in a section of the user interface, where each related item has its icon and a link to itself. Thus, clicking on a related resource title can take a user to that resource in its own portlet.

As an illustration, a given collaboration resource such as an Issue can have a property called related content. A user can then specify various other resources in that field by, for example, dragging a resource into the field and dropping it there. Thus, a user can select a given document and drag it into the related content field of a selected issue, dropping it there. Consequently, the user's selected document will relate to the selected issue. The user will then be able to navigate among the two resources by simply clicking on the appropriate link within the related content field. In this manner, a kind of neural network can be created amongst the collaboration resources, allowing for a more dynamic and fluid community experience for its members. Users are able to navigate between the application and the heterogenous resources as well as bring up tools of a particular resource. A referer/referee type of relationship can be implemented such that bi-directional navigation can be achieved between multiple resources. For example, the list of resources that the resource relates to can be labeled "references" and the list of resources that relate to the resource can be labeled "referenced from." It can be important to separate the references for security purposes. For example, a user may have access rights to remove links from one resource but he may not be allowed to remove links to that resource from other resources. Because the references are separated, the user can be precluded from deleting data outside of his capabilities.

Figure 15:
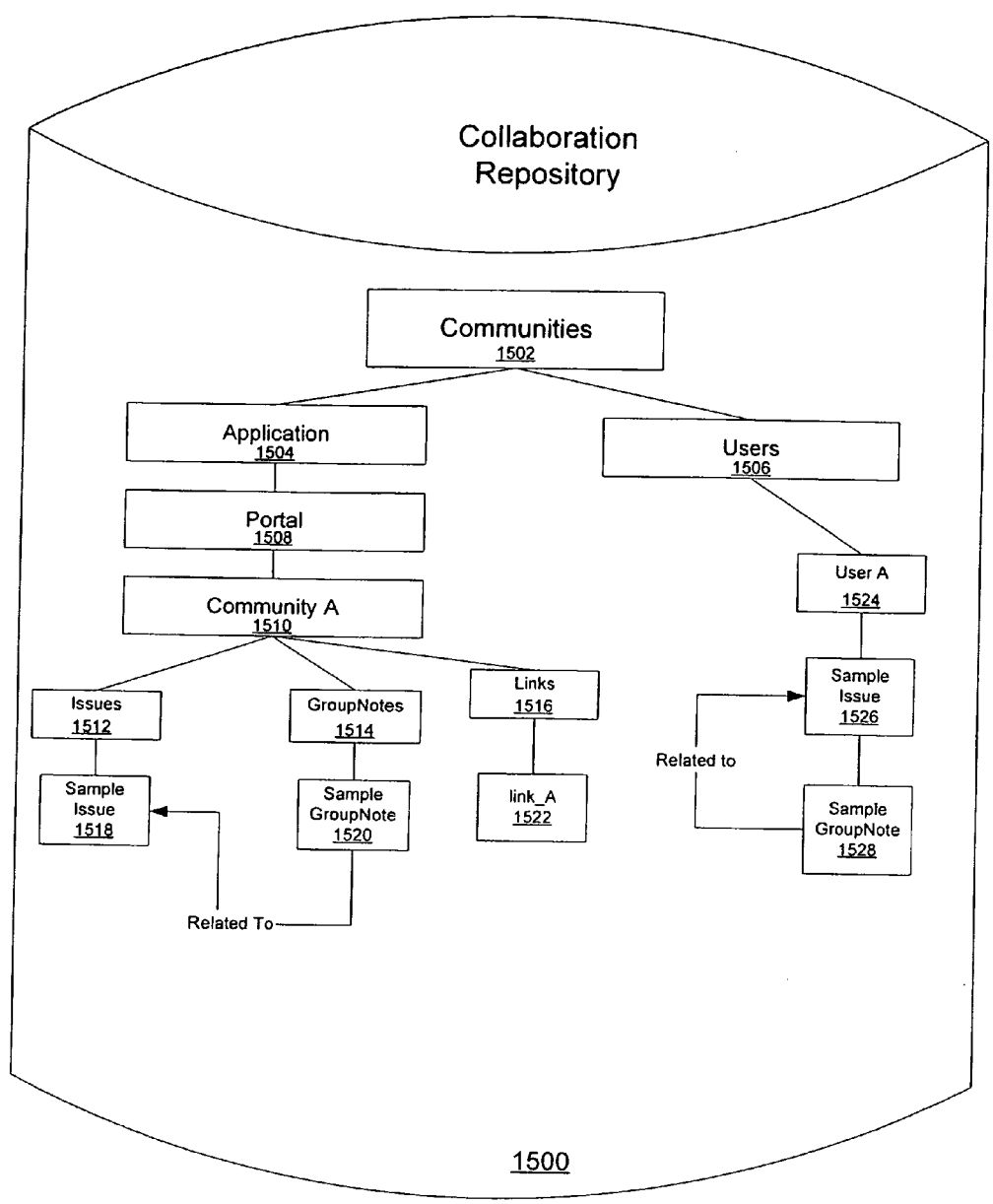
FIG. 15 is an exemplary illustration of the resource interlinking feature of the communities framework, in accordance with various embodiments of the invention.

FIG. 15 is an exemplary illustration of the resource interlinking feature, in accordance with various embodiments of the invention. A content repository is shown, containing various folders or nodes such as the communities folder (1502), the users folder (1506) and the application (1504), portal (1508) and community A (1510) folders. The repository (1500) contains various collaboration resources such as issues (1512), groupnotes (1514) and links (1516). Each collaboration resource can be stored as a node within the repository and a content object can wrap that node specifying the type of resource it is. Generic and extensible controls can interact with the object wrappers and nodes respectively. One user, such as user_A (1506) is able specify a relationship between two resources such as the SampleIssue (1518,1526) and SampleGroupnote (1520,1528) resources. Upon dragging and dropping or relating the two resources in some other manner, user_A (1524) can subsequently navigate between the groupnote and the issue resources. In this fashion, any number of resources can be related to other resources. For example, documents can relate to issues, announcements can relate to events and so on.

The term relationship, as used herein, can also refer to something more than a mere hyperlink in one document to another. While resource interlinking does provide an ability for community members to navigate between related resources by clicking on their links, it can also allow for a more versatile functionality. Other heterogeneous resources and services can know of a particular relationship among two resources and can implement that relationship in some meaningful way. For example, a search service may implement resource interlinking in order to search all related resources to a particular resource, while other services may implement resource interlinking for their own appropriate purposes. Resource interlinking can also be related to portlet activation. For example, there may be several instances of the issues portlet and one must be selected in order to show the issue that is related to some other resource and brought up from another portlet (e.g. document library portlet). The communities framework provides for a way to determine which issue should be activated and its details brought up. As such, the resource interlinking feature can provide a much more fluid, adaptable and user-friendly collaborative environment.

A developer can be provided with the ability to specify what a relationship among several resources may mean or imply. This need not be strictly defined within the communities framework so as to allow a more customized approach to collaboration. For example, one enterprise may wish to define a relationship to be merely a navigation link, while another may wish to implement relationships in their own implementations of various communities. Other applications of resource interlinking are possible and the above examples are not intended to exhaust all of them.

Drag and Drop

Another feature that can be provided to the communities framework is drag and drop functionality. The drag and drop tag library provides for the ability of a user to drag and drop various resources and portlets from one page element to another. Upon any given drop, a Javascript function could be called, a pageflow action could be submitted or a form action could be called to perform the desired functionality.

Figure 16:
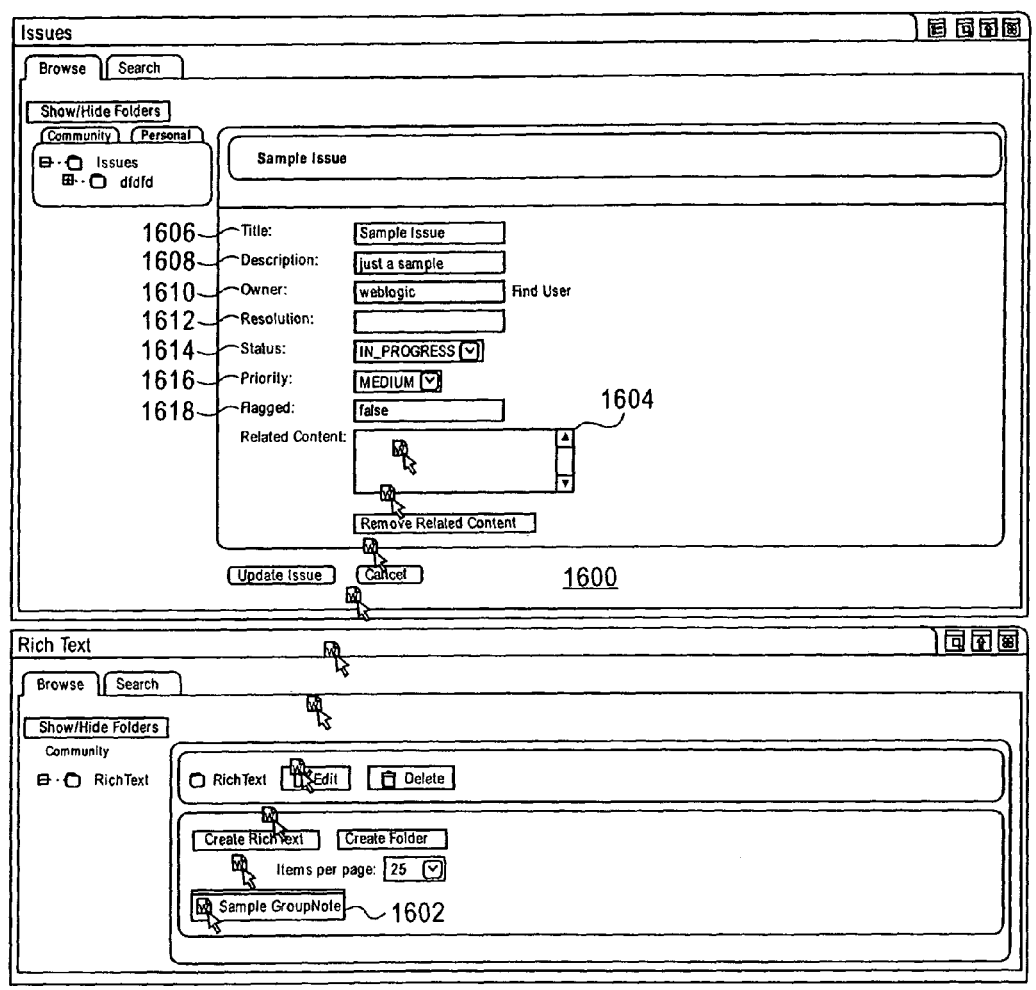
FIG. 16 is an exemplary illustration of the user interface implementing the drag and drop and resource interlinking features of the communities framework, in accordance with various embodiments of the invention.

FIG. 16 is an exemplary illustration of the drag and drop feature in accordance with various embodiments of the invention. A member's user interface is shown as displaying a collaboration resource of type issue, titled "Sample Issue" (1600). This resource has various properties associated with it such as title (1606), description (1608), owner (1610), resolution (1612), status (1614), priority (1616), flagged (1618) and related content (1604). The user is shown as dragging another resource named "Sample Groupnote" (1602) and dropping it into the related content field (1604) of the "Sample Issue" resource (1600). Thereby, the user is creating a relationship among the two collaboration resources (as described above under the heading "Resource Interlinking") by using the drag and drop functionality of the communities framework.

FIG. 17 is an exemplary illustration of the drag and drop feature in accordance with various embodiments of the present invention. The resource ASample Issue@ is displayed as having been updated after the action performed in the previous FIG. 16. A member's user interface is shown as displaying a collaboration resource of type issue, titled ASample Issue@ (1700). This resource has various properties associated with it such as title (1706), description (1708), owner (1710), resolution (1712), status (1714), priority (1716), flagged (1718) and related content (1704). It is worth noting that a link to the resource ASample GroupNote@ (1702) now appears in the related content (1704) field of the resource ASample Issue@ (1700). A user can henceforth click on this link and cause information about the ASample Groupnote@ to come up on his desktop. Similarly, other heterogenous services and resources can now know of the relationship between ASample Issue@ and ASample Groupnote@ and use this relationship for their respective purposes.

Drag and drop tag library can be implemented in various ways and the above example is only intended to be one illustration. For example, users may wish to relate various other resources, or to drag a resource into a service instead of entering its identifier. Similarly, a user could drag portlets such as the RSS portlet onto the page, dropping the portlet there for further execution. The drag and drop library can provide for a highly user-friendly and fluid interface for the communities framework.

In one embodiment, three tags may be defined in the drag and drop tag library. The first tag can be called dragDropScript tag and this is the tag that can be used to include the necessary drag and drop Javascript libraries into the page. As such, it preferably should be included before any other drag and drop tags are used on the page. This tag need not take in any attributes and can be included with a simple statement such as:

<dragdrop:dragDropScript/>

The second tag can be called draggableResource and it may specify a draggable resource on the page. It can take in such attributes as imageId, resourceId and resourceName and can be called upon as follows:

```
<dragdrop:draggableResource imageId="0" resourceId="${id}"
    resourceName="${name}">
<img src="/image.gif" width="16px" height="16px"
    dragdrop:image="true"/>${name}
</dragdrop:draggableResource>
```

The resourceId can be the unique identifier associated with the resource that is being dragged. Preferably, this identifier should be the same identifier that is used by the underlying business logic to uniquely identify that resource (e.g. its unique key). The resourceId value can be made accessible via a Javascriptfunction getsourceId( ) when it is dropped onto a resource drop zone. Similarly, the resourceName attribute and the imageId specify the representative name and the image file of the resource being dragged, respectively.

The third tag can be called resourceDropZone and it identifies an area on the page where draggable resources can be dropped. This tag can take in the attributes of targetId, jsFunctionCall, pageFlowAction and formAction. The targetId attribute can be the unique identifier of the drop zone object. It should preferably be an identifier that can be used by the underlying business logic to uniquely identify what object received the drop action. The jsFunctionCall attribute can be a Javascript function that gets executed when a draggable resource is dropped onto this resourceDropZone. The pageFlowAction attribute can specify the pageflow action that will be initiated when a draggableResource is dropped on the resourceDropZone. Finally, the formAction attribute can specify a Java Server Page (JSP) or a servlet that will receive a POST action when a draggableResource is dropped on this resourceDropZone.

One example of the code to perform a drag and drop of a resource can be written as shown below. This code illustrates how a move issue action can be coded.

```
@Jpf.Action (forwards={@Jpf.Forward(name="success",
        path="displayIssuesTree.do")} )
protected Forward moveIssue( )
{
        Forward forward = new Forward ("success");
        String sourceId = getRequest( ).getParameter("sourceId");
        String targetId = getRequest( ).getParameter("targetId");
        move (sourceId, targetId);
        return forward;
}
```

Figure 17B:
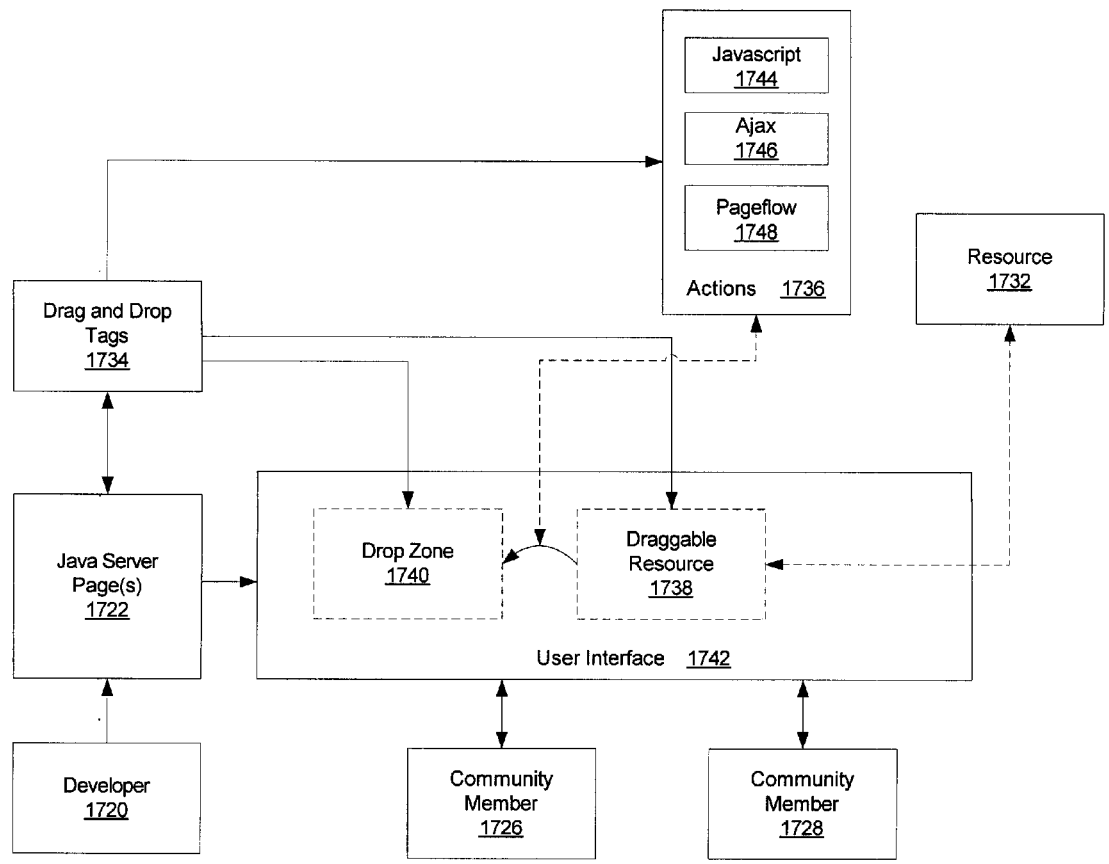
FIG. 17B is an exemplary illustration of drag and drop tag feature of the communities framework, in accordance with various embodiments of the invention.

FIG. 17B is an exemplary illustration of the drag and drop tag feature for the communities framework, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

A developer (1720) can use the drag and drop tags (1734) while creating Java server pages (1722), portlets or various other tools for the communities framework. A draggable resource (1738) and a resource drop zone (1740) can be displayed on the user interface (1742) such as a typical GUI for example. The draggable resource can associated with any resource (1732) capable of being displayed on the user interface including but not limited to users, documents, issues, discussions, announcements or other types of collaboration resources. The drop zone (1740) can be a specific area on the page that can be specified by the developer (1722) via one or more of the drag and drop tags (1734). Upon the user such as a community member (1726, 1728) selecting the draggable resource (1738) and dragging and dropping the resource into the resource drop zone (1740), an action (1736) can be performed by the system. This action can be specified in the drag and drop tag and can take the form of a Javascript function (1744), an AJAX call (1746) or a page flow action (1748). As an illustration, when a community member drops the draggable resource onto a drop zone, a dynamic content call can be made to a remote server, for updating the drop zone area of the user interface with an HTML fragment. Similarly, other implementations of the drag and drop tags are possible and are well within the scope of the present invention.

Active Menus

Another feature that can be provided to the communities framework is active menus. Active menus can provide the ability for developers to create, modify and otherwise customize menus associated with a given collaboration resource. Users and developers can be allowed to create the menu items dynamically, without the need for difficult hardcoding of such features into the various APIs.

As an illustration, anyone collaborative resource can have a menu associated with it. A mouse-over or right-click can cause that menu to come up, thereby displaying various menu items. For example, the collaboration resource announcement can have menu items such as edit, delete, deliver, link, as well as others. A given menu item can run page flow actions, be a hyperlink, call a javascript function or make an dynamic content call (as previously described). A user can be allowed to create these menu items for each collaborative resource and to add them to the existing menu of that resource. For example, a developer can create a new menu item called set_time_out_value and add it to the resource announcement. Subsequently, this new menu item can be displayed along with the previous ones upon mouse-over or right click by any member of the community. Thus, a member can be provided with the ability to set an expiration time (time_out_value) for a given collaboration resource announcement by clicking on the newly created menu item. Active menus can provide for many other implementations as well, allowing a fluid and user-friendly approach to creating and using menus with any given resource.

Figure 18:
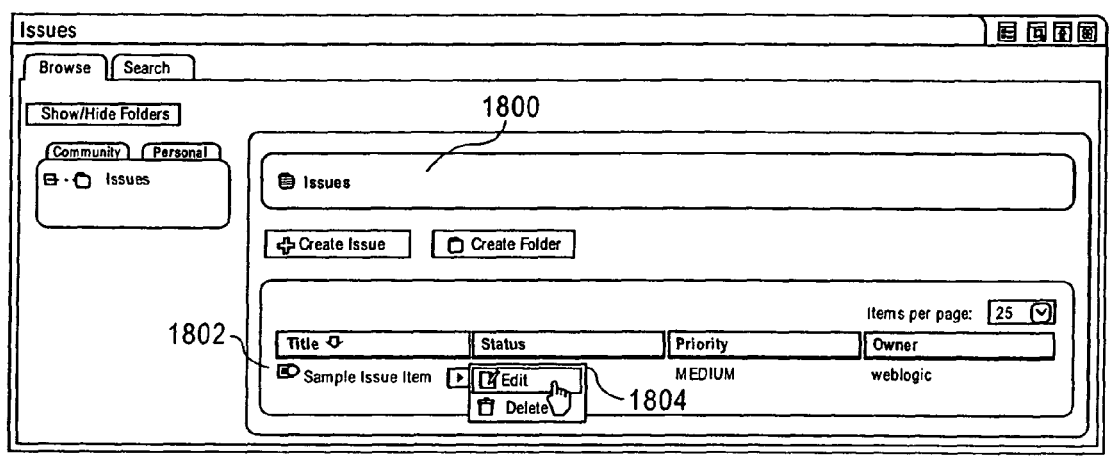
FIG. 18 is an exemplary illustration of the user interface implementing the active menus feature of the communities framework, in accordance with various embodiments of the invention.

FIG. 18 is an exemplary illustration of the active menus tags feature, in accordance with various embodiments of the invention. A user interface is shown, displaying a list of issue resources (1800) for a community. One particular issue named "Sample Issue Item" (1802) is selected by the user and upon mouse-over (or right click), a menu (1804) is displayed with various menu items. A selection of one menu item can cause the performance of a javascript function, a JSP call, or a pageflow action to be submitted. In this illustration, only two menu items, namely edit and delete are displayed for this particular menu. However, developers are provided an option to add, modify or remove menu items from this menu by using the active menu tags feature. Furthermore, developers are provided with the ability to define the style of displaying the menu, the text of each item and what action each menu item is to perform. All of this functionality can be implemented without the need for any hardcoding and API editing on the part of the developer.

Figure 19:
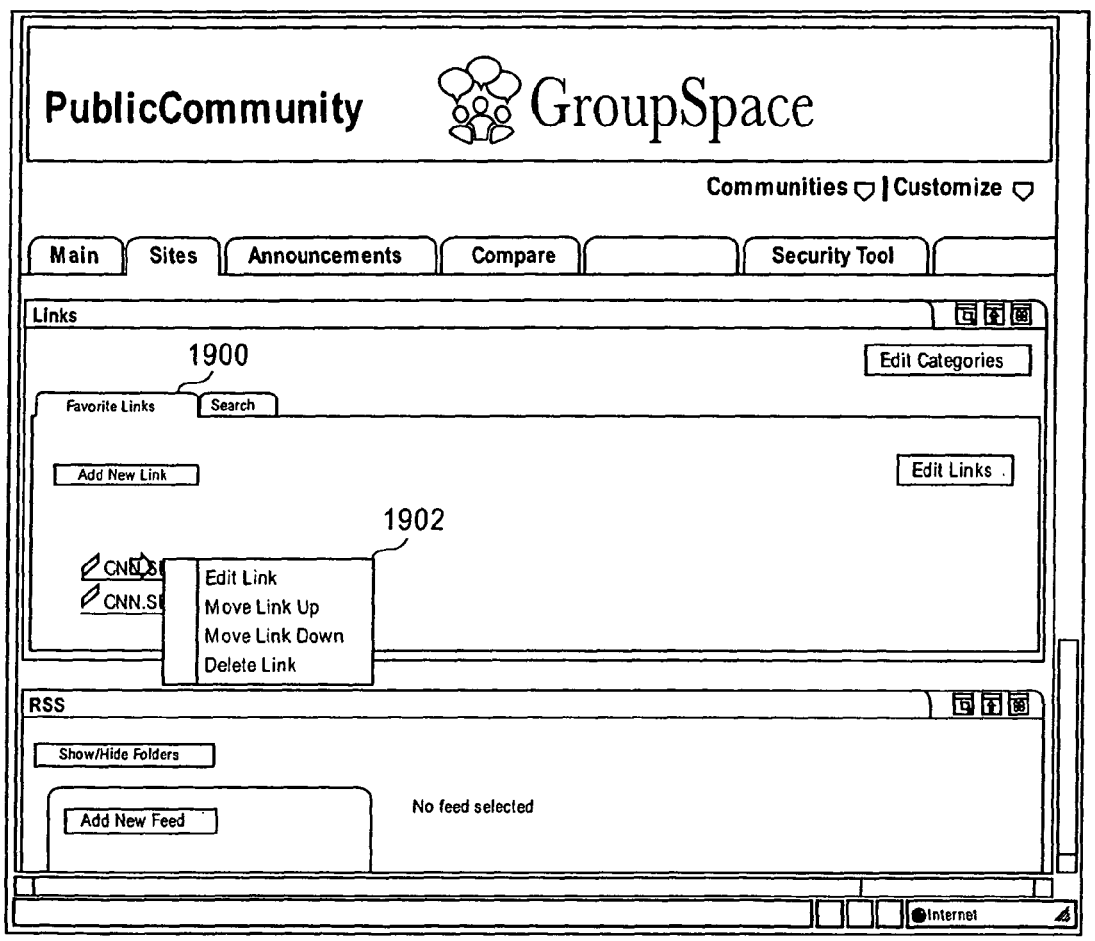
FIG. 19 is an exemplary illustration of the user interface implementing the active menus feature of the communities framework, in accordance with various embodiments of the invention.

FIG. 19 is an exemplary illustration of another active menus tag feature in accordance with various embodiments of the invention. A user interface is shown, this time displaying a list of favorite links (1900) for a member of a community. Upon mouse-over, a menu (1902) is displayed for the link selected. This menu (1902) contains other menu items such as Edit Link, Move Link Up, Move Link Down and Delete Link as specified by the developer for the link resource type. Many other implementations of menus and menu items are possible and all of them can be created via the use of tags and without intensive programing and in depth technical knowledge.

In one embodiment, a tag library is defined for allowing a developer to easily create new menus and menu items and associate them with various resources. Generally, JSP tag libraries can define modular functionality that can be used and re-used by a JSP page. Tag libraries can reduce the necessity to embed large amounts of Java code into JSP pages by moving the functionality of the tags into tag implementation classes.

Figure 20:
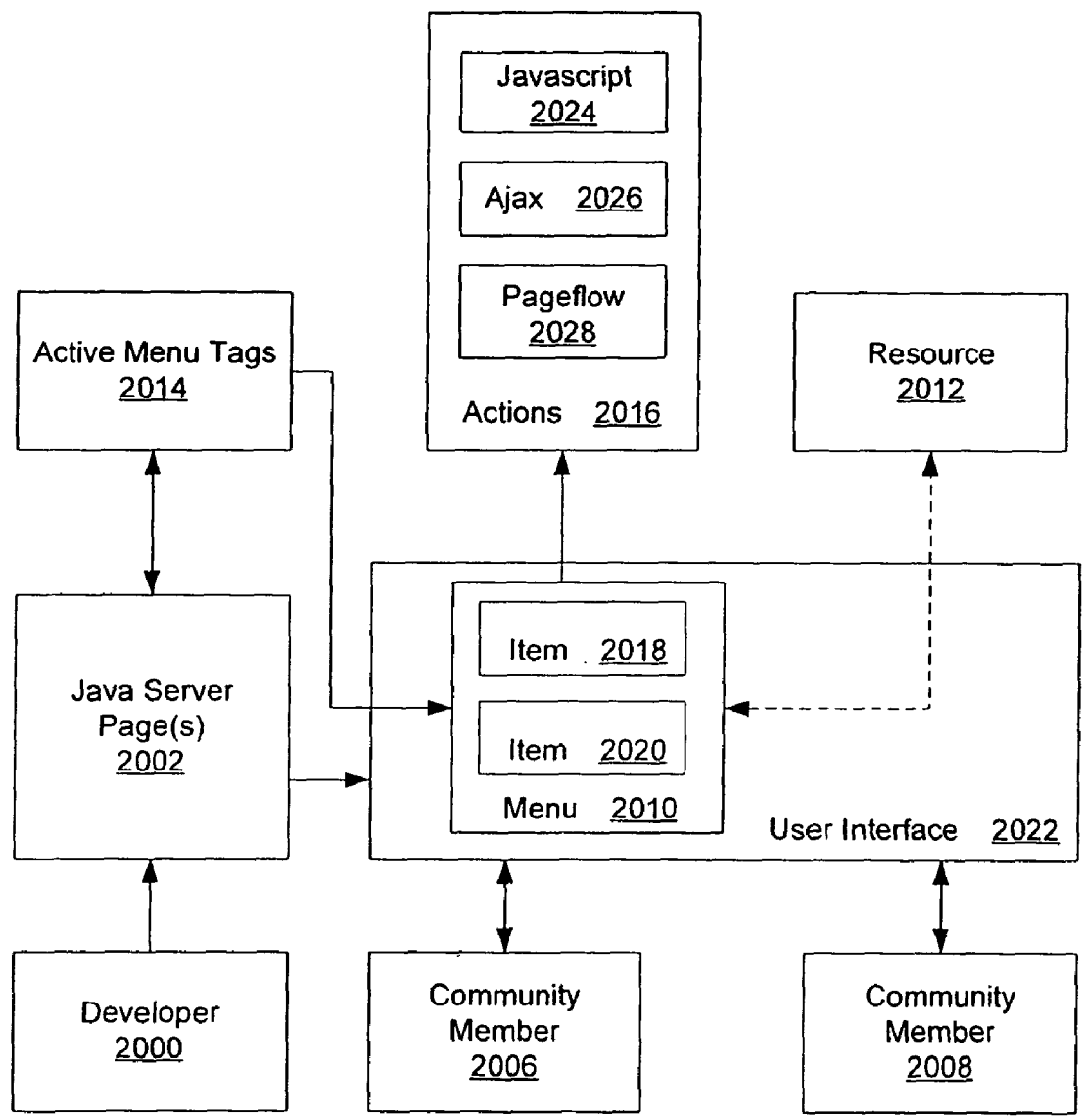
FIG. 20 is an exemplary illustration of the active menus framework, in accordance with various embodiments of the invention.

FIG. 20 is an exemplary illustration of the active menus framework, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

A developer (2000) can use the active menu tags (2014) while creating java server pages (2002), portlets or various other tools for the communities framework. A menu (2010) can be created using the active menu tags and this menu can be associated with a particular resource (2012) such as a document, link, announcement, user, event, or any other type of resource. The menu can perform various actions (2016), such as javascript functions (2024), AJAX calls (2026) or page flow actions (2028). The menu can have various menu items (2018, 2020) for executing each of the actions described. Active menu tags can be provided for describing each menu item. In this fashion, a developer can create new menus for resources as well as add new menu items to presently existing menus. Members of the community (2006, 2008) can subsequently access the resource menus via a user interface (2022).

The configuration and use of active menus will now be described in detail and with reference to examples of various implementations and code. Active menus can be configured by using a configuration file. The configuration file such as active menus-config.xml can be set up, the results of which can produce multiple menus that consist of various different items, styles and icons. The configuration file can contain various tags such as the type tag, the typeDefault tag and the menuItem tag. The type tag can define the individual menus that are to be used within the web application. For example a statement such as:

```
<type name="foo">
</type>
``` can define the name attribute to contain the text "foo." This name should preferably be unique for each menu because that is how the menu is referenced when using the active menus tag.

A typeDefault tag can define what will be displayed within the browser where the active menus stag is used. A developer can control the text displayed, the style of that text and the image shown on mouse-over (or right click) of that text. For example:

```
<typeDefault>
    <displayText className="com.foo.GetUserNameFromProfile"
    methodName="getName"/>
    <displayStyle class="popup" style="color:#000000"/>
    <displayMenuImage src="/foo/images/foo.gif"/>
<menuStyle class="menu" style="background-color:#FFFFFF;
border-style:dotted;"/>
</typeDefault>
```

The displayText attribute defines the actual text that can be shown. As illustrated above, it can call a specified class and a method within that class that returns a character string, which will in turn be displayed. An example of the code relating to the tag defined above can be as follows:

```
public class GetUserNameFromProfile
{
    public static String getName (String userName)
    {
        return "XXX-" + username + "-XXX";
    }
}
```

Thus, by using the above code, configuration and the following active menus tag:

```
<activemenus display="UserName" type='foo'/>
```

The text "XXX-UserName-XXX" will appear within the browser. This would allow the user to user the information that is entered in the body of the active menus tag to look up other information that can be displayed. For instance, a username could be used to look up a user's full name that would be displayed. Preferably, the rules would specify that this method must take in a character string and return a character string.

The menuItem tag can define the individual items within the popup menu. They can execute various different types of actions, such as Javascript functions, links, or submit pageflow actions. It can be left up to the developer to define which type of action will be performed. As an illustration, menu item tags can be written as follows:

```
<menuItem>
    <param name="userId"/>
    <xmlHttp url="GetFirstNameServlet"/>
    <row classs="menuRow" style="background-color:red"/>
    <text class="menuText" style="color:#000000"/>
    <rowRollover class="menuRowRollover"
    style="background-color:green"/>
    <textRollover class="menuTextRollover" style="color:#FFFFFF"/>
</menuItem>
<menuItem>
    <javascript>
        <name>Testing</name>
        <script>testing(this);</script>
    </javascript>
</menuItem>
<menuItem default="true">
    <link rul="http://www.google.com">
        <name>Google</name>
    </link>
</menuItem>
<menuItem>
    <allParams/>
    <action action="addEditLink">
        <i18nName bundleName="com.foo.LinksPopupMenu"
        key="edi.link"/>
    </action>
</menuItem>
<menuItem>
    <allParams/>
    <dcAction action="showFeedData"
    dcContainerId="feedDataContainer">
        <i18nName bundleName="com.foo.LinksPopupMenu"
        key="show.feedData"/>
    </dcAction>
</menuItem>
```

In the example above, the menuItem tag defines several types of individual items within the popup menu. First such item type can be javascript, i.e. any javascript that a developer wants to run when the user clicks on this menu item. To make it more useful, values specified in the param tag can be retrieved. Another such item type can be xmlHttp, which references a servlet (which can follow all standard servlet configuration). Whatever that servlet outputs can be shown in that row of the menu. Another item type can be a link (i.e. a static URL that will open a new browser window pointed to the defined URL). Yet another type can be action type, which is the name of an action that should be available to the page or portlet that contains the active menus tag. This can run the action within the current browser so as to allow the use of forwards to control pageflow. A dcAction type can also be allowed. If you have a dynamic content container set up within the page, a menu item can be set up to call an action and have it update the dynamic content container. This can be implemented very similar to the action menu item, the difference being that a developer may need to specify the dcContainerId which corresponds to the dcContainerId that is defined within dynamic content tag feature.

When using the active menus tags, several different attributes can be placed on the tag in order to define certain tag characteristics. For example, the display attribute can define what will be displayed in the place of the tag itself. The type attribute can define what will be in the menu and should preferably match up to a type defined in the activemenus-config.xml file. The href attribute can be used to override the default anchor href for the display text of the tag. A newWindow attribute can be used to specify that the link be opened in a new browser window. A class attribute can be used to define a cascading style sheet (CSS) class to style the display text. A style attribute can define a css style to be placed on the display text. A rightClick attribute can be used to turn a menu into a right-click menu instead of a mouse-over menu. A param attribute can be used to set up parameters that can be passed in and used when defining a menu item in the activemenus-config.xml file. The param attribute can further be specified by the name and value attributes of the parameter.

Displaying HTML Content from Portlet as a Page Element

Another feature that can be provided to the communities framework is displaying HTML content from a portlet as a page element. This feature of the communities framework allows a user to add rich text, such as italics, bold, colored text to a page in the community. Additionally, it can display documents as HTML content from several different portlets as a single document.

A groupnote collaboration resource can be created to hold various forms of information for the members of the community framework. A groupnote can hold data such as images, links, text as well as other HTML content. Various groupnotes can also be linked to other groupnotes in a hierarchical relationship. This allows for a more collaborative experience, enabling a rich site of interrelated information placed by community members.

A groupnotes portlet can also be provided to enable text editing features, to display the groupnote or collection of groupnotes as a single presentation and to operate as a mini browser within the actual user interface of the member of the community. This portlet can switch into floating element display presentation mode upon which the text editing features are removed and the groupnotes can be displayed in a floating element manner. The portlet preferences can specify whether the groupnotes portlet is in display or edit presentation mode. A groupnote can be selected as the home document from which the display mode can be first rendered. An entirely different view of groupnotes may be enabled upon the display mode. Chaff and other trivial text editing matter can be removed, and other members can be denied the ability to edit the groupnote while it is in display mode. In one embodiment, only the body (HTML text, images, links, etc.) of the groupnote and its title is displayed. The borders, title bar, buttons and any other portlet material can be removed and the remaining groupnote data is displayed as a floating page element. In this manner, multiple groupnotes can be combined or appended to make them look and feel like a single document. Links to other groupnotes may also be provided within the home groupnote.

Security can be implemented in order to control access to the display or edit mode of the groupnotes portlet. Roles and capabilities (as previously discussed) of the communities framework can provide this functionality. Thus, for example, non-owners or visitors may be denied from editing or deleting groupnotes that are in display mode within the groupnotes portlet. For example, once the groupnote is in display mode, the user can be precluded from editing it unless that user satisfies certain requirements (e.g. fits into a certain membership capability).

Page flow history and state can also be enabled via the groupnotes portlet. Thus, a member can be allowed to navigate back and forth through the various groupnotes and choose to edit selected ones. Both levels of security of the community framework can be implemented with this portlet, such as in order to prevent certain members from updating or deleting particular groupnotes, discussed above. Groupnotes can be linked or related to one another as well as to other collaboration resources by the resource interlinking feature or by an HTML link within the text of the groupnote. In such fashion, the displaying HTML content from a portlet as a page element feature allows for a more use friendly and dynamic approach to collaboration.

Figure 21:
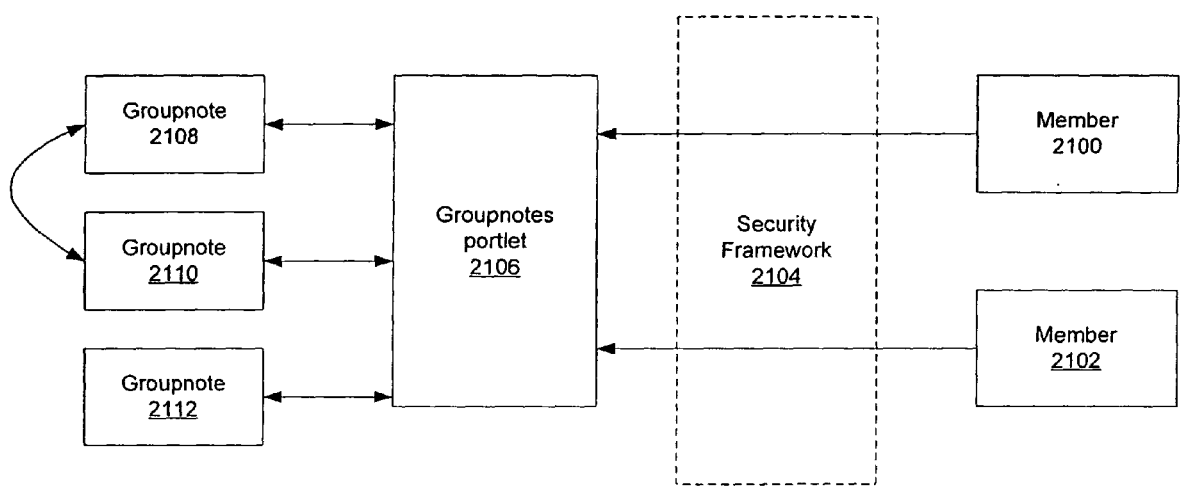
FIG. 21 is an exemplary illustration of displaying HTML content from a portlet as a page element, in accordance with various embodiments of the invention.

FIG. 21 is an exemplary illustration of displaying HTML content from a portlet as a page element, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

In one embodiment, various users who are members (2100, 2102) of a community can use the groupnotes portlet (2106) in order to access various types of information. This information can be contained in groupnote resources (2108, 2110, 2112) and stored in a repository for example. The groupnotes portlet can display a plurality of groupnotes and can allow members to edit, delete and add new groupnotes to the collection. Several modes of operation can be implemented for the groupnotes portlet. One such mode can be the floating element display presentation. Another mode could be edit mode. Various groupnotes (2108, 2110) can relate or link to one another. This link can be implemented as a hyperlink in the body of the groupnote or via the resource interlinking feature as previously described. Security framework (2104) can also be implemented in order to member access to the portlet. For example, members may be precluded from placing the groupnotes portlet into edit mode. Membership capabilities and functional capabilities can be implemented in the security framework as previously discussed. Similarly, entitlements can be placed upon groupnote data in order to control CRUD operations therein.

Test Framework

Another feature that can be provided to the communities framework is the test framework. The test framework can provide a more realistic and efficient testing of various community services by simulating a real-world type of application.

In order to create an instance of a community, regular portals should be first disassembled by creating various portal files. The test framework feature first runs regular portal instances through the disassembler. Portals can start life as a file with an extension ".portal" in XML. This file typically has pages, books, portlets, layouts, placeholders and other information to render that portal on the screen. This file can be disassembled by parsing the XML code and creating all necessary objects in the database and in this manner the .portal file can be turned into a desktop. Thus, in order to create a community, the .portal file should preferably be disassembled first. Users and developers may be provided with various wizards in an effort to automate this process.

Each major component (e.g. Search) may have several portals associated with its series of tests. Once the community instance for that portal is created via automated disassembly, the developer can write HMTLUnit tests to access that portal as some user with any given number of membership capabilities, using the components to perform various tests. HtmlUnit is an extended testing framework that can allow developers to write tests for an application based on HTML concepts such as links, forms and tables.

In one embodiment, each major test component can have its own community that is defined by a unique portal. Each of these communities can be created automatically from those portal files by running each portal file through the disassembler. These disassembled portals can be instances of the community created for the test framework feature. Thus, all tests can be executed in a community.

Furthermore, the test framework can automatically create users, giving them memberships in a community and mapping them to various membership capabilities of that community (as discussed above below the security level one heading). All test component code can then be accessed and run in the context of a real user/member of the community, thereby testing more realistic use cases.

Figure 22:
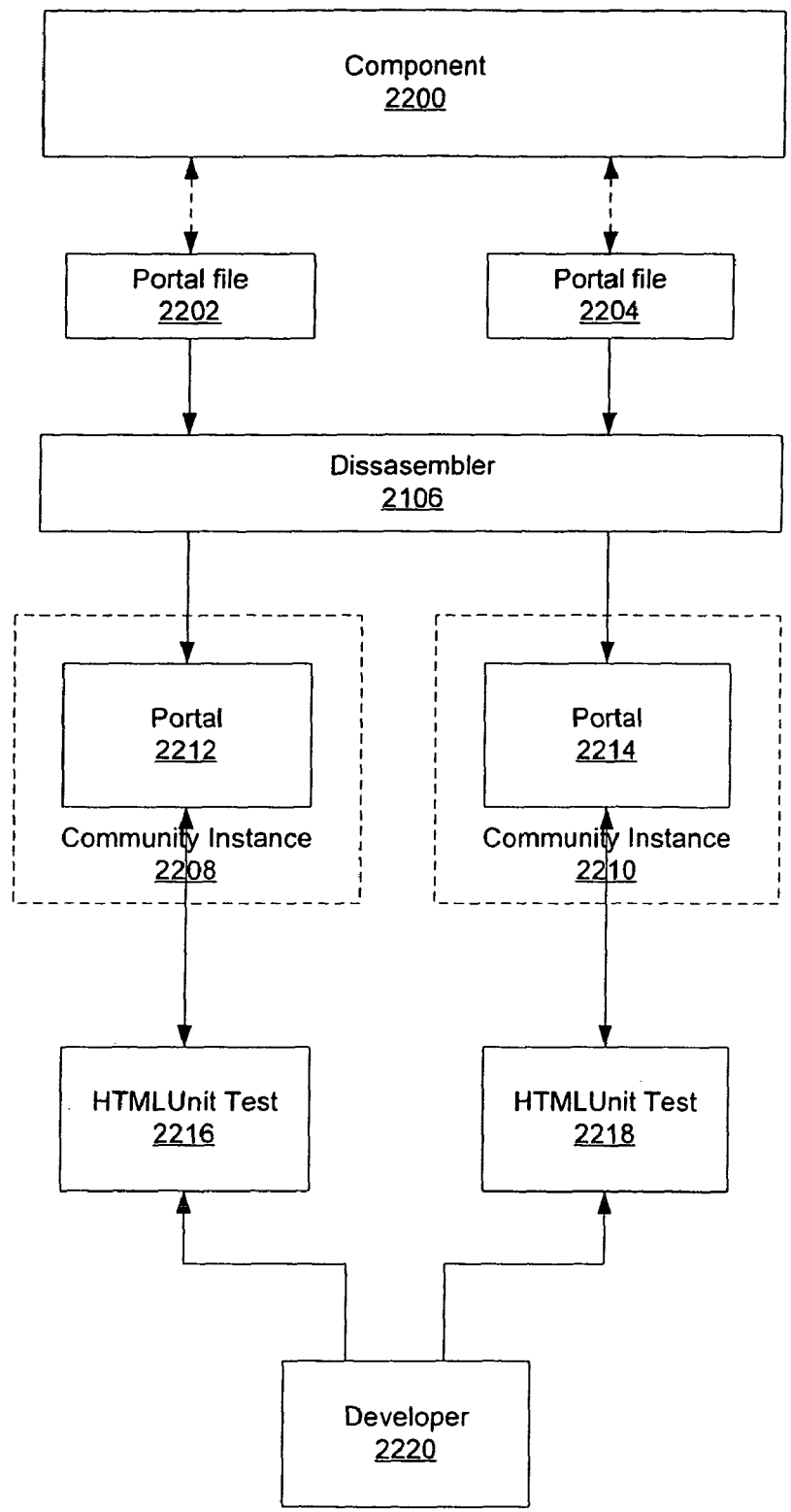
FIG. 22 is an exemplary illustration of the test framework feature, in accordance with various embodiments of the invention.

FIG. 22 is an exemplary illustration of the test framework feature, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

In one embodiment, each major component (2200) of the communities framework has multiple portals associated with its series of tests. Each of these portals can start out as a portal file (2202, 2204). These portal files can be ran through the disassembler (2206) in order to render the portals (2212, 2214) representing individual community instances (2208, 2210). Once the community instance is created for the portal, various HTML unit tests (2216, 2218) can be written by the developer (2220) in order to access that portal as some user with given membership and functional capabilities. Other similar testing methodologies can be implemented in alternative embodiments instead of using HTMLUnit tests. The test framework automatically creates users (not shown) giving them membership in the community and mapping them to membership capabilities. The component code can subsequently be accessed in the context of a real user or member of the community. In this manner, a more realistic and efficient testing environment is achieved, thereby enabling a better real-world type of simulation.

Search Controls

Another feature that can be provided to the communities framework is search controls. The search controls feature can provide the use of annotations to restrict the scope of the controls such as within one community or one repository or a particular location within a single repository or across an entire enterprise. They can also provide a simple and user-friendly ability to construct search queries rather than having to deal with the search APIs or the CM expression APIs themselves. The search controls can use the content management system APIS, coupled with the security features of the communities framework in an effort to retrieve data to members, for which the membership is entitled to view.

Several options of community searches can be implemented. For example, an inter-community search can be restricted to the data in the current community and can be constrained by the security in place for that particular community. Cross-community can search across several communities which are marked with the isSearchable community property. Communities related to certain topics can be searched in this manner. Those communities not marked with the isSearchable property can still be implemented to use entitlements and security level 2 feature of the communities framework. Federated (or virtual) repository searches can also be implemented via full-text expressions to each repository to execute and then aggregate the results and filter them based on user security entitlements. Enterprise searches can be performed such as for links to web pages or content available in particular sets of directories. Such searching capabilities can provide for a much more fluid and user configurable approach to developer collaboration and can improve the amount of time and effort required for various types of projects.

Community members can be allowed to perform full text searches against the shared library. There can be a search field available in the shared library view. A community search portlet can be implemented for providing global search capabilities for a community. Users can search across any community related resource such as documents, links, events, threaded discussion groups, members of the community and pages/books within the community. Large results sets can be paginated for ease of use, and the system can cache common searches for performance reasons. Security features (as previously discussed) of the communities framework can be employed to control user access and viewing of the various search results. Thus, result sets that are returned to the user can include only the items that the user has the right to view, as determined by the security features of the communities framework.

In one embodiment, a community member is able to search all resources within a community that he belongs to. In another embodiment, a community member is able to search for resources in all communities that he is a member of. Yet in another embodiment, users are able to search for communities that they are interested in. For example, a user may wish to find any community that is targeted at a particular interest group. These may include communities that the user is a member of as well as communities that the user is not a member of but which he may be eligible to join. These types of searches can be implemented against community meta data. Result sets could include only those communities that the user is member of or those that are public and can be organized by either relevance, date or resource type.

Developers or users can specify how many search results to return, to save a certain number of last search results and to save this search query. They can also specify the search criteria in an easy intuitive fashion and the search controls can constrict the complex search from that. The search result object can be returned and represented by something that the user can click on to access.

The searches can all be scoped according to the particular control specified by the developer. For example, community_FullTextSearchControl can search only the community repository, while RepoFullTextSearchControl can search only the non-community enterprise repositories and the EnterpriseSearchControl can search all other configured enterprise resources. The user need not explicitly specify these criteria.

In one embodiment, each search control can return the appropriate collection of search results, depending on the control. For example, community_ExpressionsSearchControl can return a collection of collaboration resources, ExpressionsSearchControl can return a collection of nodes and EnterpriseSearchControl can return a collection of Autonomy ResultDocument types.

The community-specific search controls can scope the search paths according to which community instance the search is being executed in, as well as to which user is performing the search. The developer need not specifically set the search path for the controls.

A developer can be allowed to further limit the search by specifying the object class and bean type (e.g. which type of CommunityContent) the search will be executed against. Retrieved content nodes can then be used to dynamically create that type as the nodes are iterated over.

Additional parameters on the controls, i.e. control annotations may be specified for the search, such as how many search results to return for example. The controls can be configurable by the developer in an Integrated Development Environment (IDE) so that the annotations can show up as configurable properties for the controls in the IDE.

Figure 23:
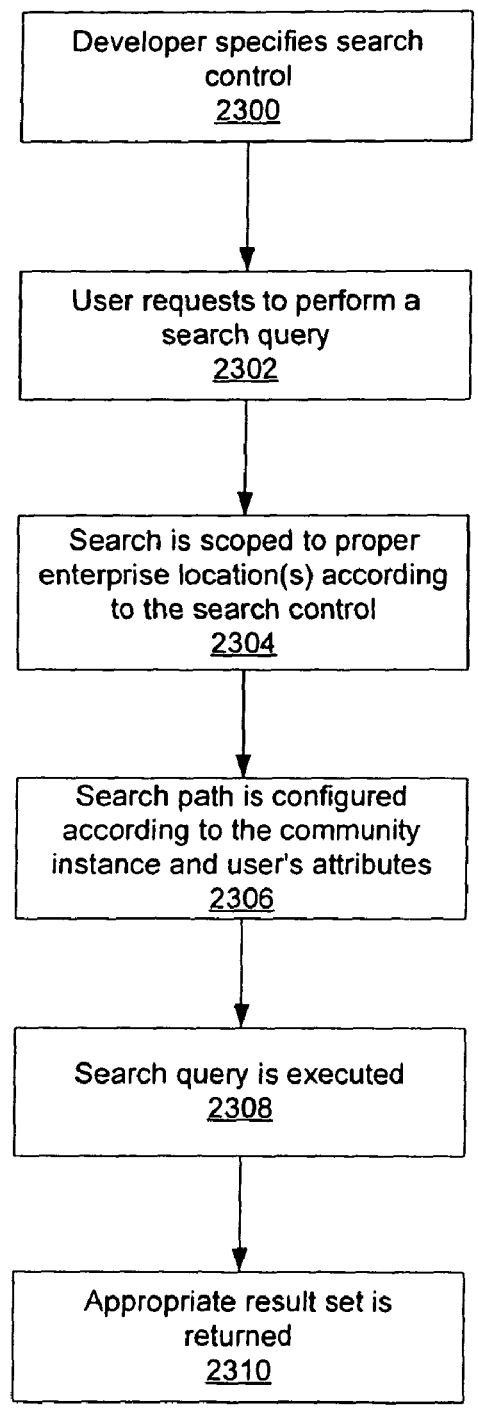
FIG. 23 is a flow diagram illustration of the search controls feature for the communities framework, in accordance with various embodiments of the invention.

FIG. 23 is a flow diagram illustration of a method implementing the search controls feature, in accordance with various embodiments.

In step 2300, a developer can specify which search control is to be called upon in response to a user's request, such as by placing a call to the control within a JSP. In step 2302, a user or member of the community can request a search to be performed. The request can be a full text search type, a search for particular objects, or another type of search. At this point a search query can be formulated by the search control. In step 2304, the search control can scope the search to some particular location, such as a particular repository within the enterprise, a location within the repository or some other enterprise resource. In step 2306, the search path for the query can be configured by the search control according to the community that the request was made from or according to which user has made the request. Security features (as previously discussed) can be implemented by the search controls in order to restrict search access. In step 2308, the search control can carry out the execution of the search, such as by calling an appropriate search engine. In step 2310, the search control can return a set of results to the user and display them in a coherent fashion, such as within a portlet.

Figure 24:
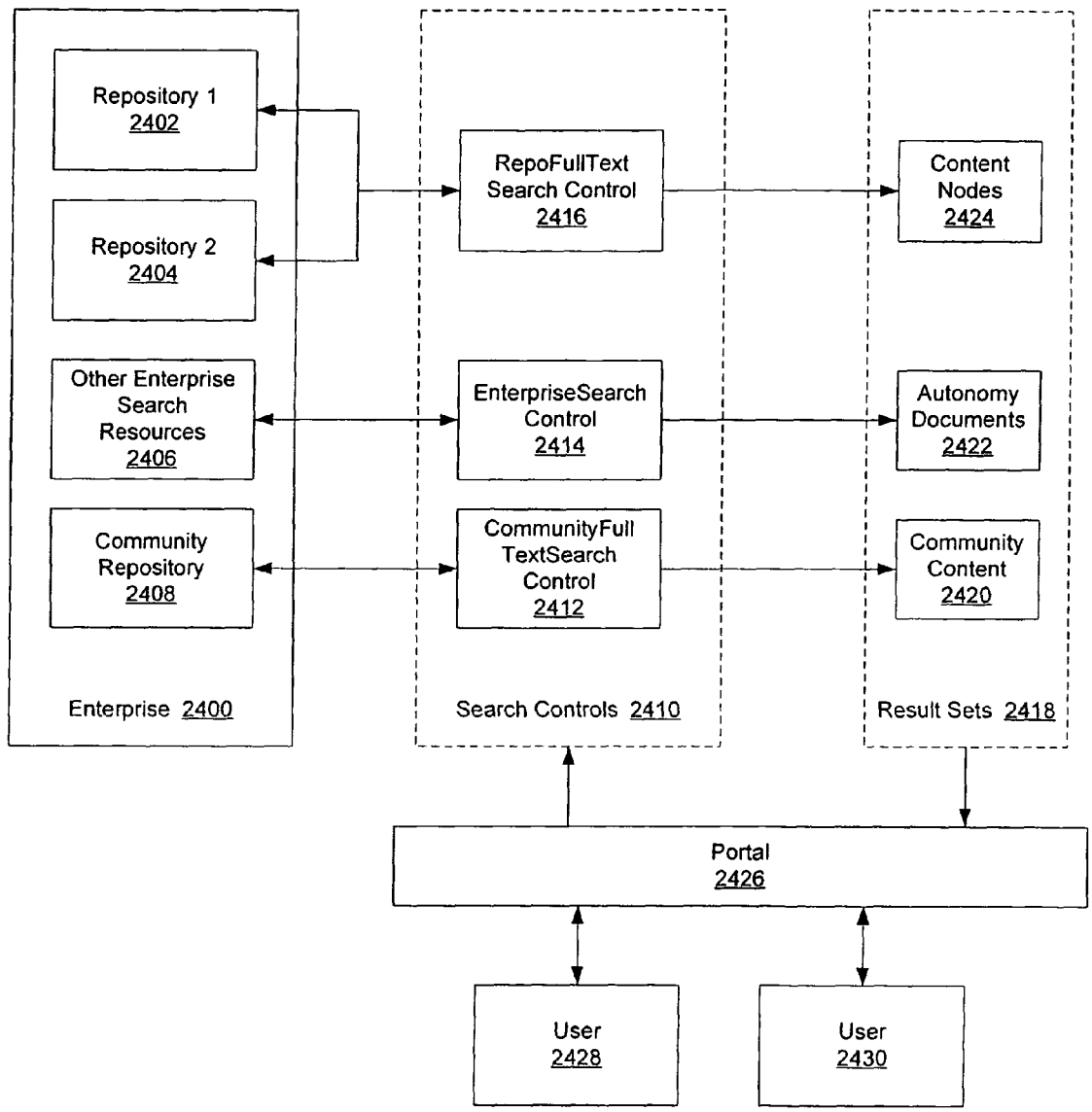
FIG. 24 is an exemplary illustration of the search controls feature for the communities framework, in accordance with various embodiments of the invention.

FIG. 24 is an exemplary illustration of the search controls feature for the communities framework, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

In one embodiment, an enterprise (2400) can contain various resources such as the community repository (2408), repositories designated for non-community use (2402, 2404) and other enterprise resources that can be configured to be searchable (2406). A separate search control can be implemented for each resource or group of resources. For example, a CommunityFullTextSearchControl (2412) can be deployed so as to be responsible for searching the community repository (2408). A RepoFullTextSearchControl (2416) can be responsible for performing searches in non-community repositories and an EnterpriseSearchControl (2414) can be called upon to search other enterprise resources. Similarly, other search controls can also be implemented, such as separate controls for searching within a particular location of the community repository.

In one embodiment a developer can associate the search controls with appropriate JSPs. Users (2428, 2430) can request searches and thus call upon the search controls (2410) via a portal (2426) or some other form of user interface. The search controls can be responsible for formulating and executing the search requests as previously discussed. Each search control can then return an appropriate result set (2418) as the product of executing the query. For example, the CommunityFullTextSearchControl (2412) can return a result set of community content (2418) (e.g. collaboration resources). Similarly, RepoFullTextSearchControl (2416) can return a result set (2418) of repository content nodes (2420) and the EnterpriseSearchControl (2414) can return the result set of autonomy document type (2422). The resulting sets of appropriate objects can then be displayed back to the requesting user via the portal page.

A sample search control is illustrated via the use of commented code and method declarations below. As illustrated, this class can perform a full text search outside the scope of the enterprise repositories.

```
// The use can be as follows:
// Limit the scope of the search (getAvailableResources( ), setSearchResource( ))
// Set the return type
// Limit the number of indexed fields in the return type
// Construct the full text query
// Execute the query
@ControlInterface
public interface EnterpriseSearchControl extends FullTextSearchControl
{
// Set the defaults for search parameters. Possibilities are
// EnterpriseScope.ALL_CONFIGURED and EnterpriseScope.NAMED_RESOURCE
@PropertySet
@Target({ElementType.FIELD, ElementType.TYPE})
```

```
@Retention(RetentionPolicy.RUNTIME)
public @interface EnterpriseSearchParams
{
    public String DiSHServerHost( ) default "localhost";
    public int DiSH_aciPort( ) default 20000;
    public int IDOL_aciPort( ) default 9014;
    // all types. Could also be "doc", for example. For multiple types, it is possible to use
    // limitSearchToDocTypes
    public String limitDocType( ) default "";
    // Return only the top N search results whose relevance weights are above this
    public int limitRelevanceScore( ) default 80;
    // Additional fields to include in the found document
        public String printFields( ) default "title,author,dredate,creationdate,drefullfilename";
    // Additional fields to include in the found document. Default can be to sort by relevance.
    // Note that, if that sort field does not exist on the document, it will not even be returned
    // by the search. Some examples are:
    // DATE
    // REVERSEDATE
    // RELEVANCE
    // MyField:numberincreasing
    // MyField:numberdecreasing
    // MyField:alphabetical
    // MyField:reversealphabetical
    // Relevance+DRETITLE:alphabetical+Date (combined, sorted in that order)
        //public String sortString( ) default "TITLE:alphabetical";
        public String sortString( ) default "";
        // Page size
        public int pageSize( ) default 10;
        // Max to return is on parent class, SearchControl
    }
// Show indexed fields that are available to search. These may be used to construct
// FullTextQueryParameter expressions, eg//todo: give example. For now, see Autonomy_UT
        public Set<String> getSearchFields( ) throws Exception;
// Limit search to only those documents ending with this suffix. For example, to find all
// PDF documents, the suffix would be "pdf". Html oocs could be the set of suffixes: html, htm.
// You can search any combination of document types in this manner. These criteria will be
// combined with the other criteria specified in the argumens to the findDocuments( ) methods.
// This can override the property ;limitDocTypes( ), which specifies a single doc type to
// restrict the search to.
        public void limitSearchToDocTypes(Set<String> docTypeSuffix) throws Exception;
// Search for this text in these fields, Is not confined by searching for a particular word in the
// content itself. EG, find all docs whose keywords contain 'foo' returns null if none found.
        public SortableFilterablePagedResult<ResultDocument> findDocuments(String
        fieldText, Set<String> searchFields) throws Exception;
// Contstruct a simple query that will search all the Autonomy databases for this 'text'.
// returns null if none found
        public SortableFilterablePagedResult<ResultDocument> findDocuments(String text)
        throws Exception;
// Contstruct a simple query that will search all the Autonomy databases for this
// FullTextSearch expression.
// returns null if none found
        public      SortableFilterablePagedResult<ResultDocument>
        findDocuments(FullTextSearch search) throws Exception;
}
```

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the invention may be used in a WebLogic environment, other application servers may use and benefit from the invention. In addition, while the invention is described in terms of clients accessing servers, it will be evident that the invention also applies to servers accessing other servers. The code example given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A drag and drop system comprising:
a computer having a user interface and a portal page rendered thereon;
a community framework on said computer that includes a set of files to allow users to create one or more communities of user members having access to a plurality of collaboration resources wherein each of the plurality of collaboration resources is associated with a node of a plurality of nodes in a repository, wherein the collaboration resources are data types including at least one of the following: a document, a group note, an announcement and an issue, said community framework further including
a draggable first collaboration resource of the plurality of collaboration resources displayed on the portal page configured to be selected and dragged;
a resource drop zone portion of the portal page associated with a second collaboration resource of the plurality of collaboration resources that specifies the location of the draggable resource to be dropped; and
a drag and drop tag library that comprises a first tag that is used to include the tag library into the portal page, a second tag that specifies the first draggable resource and a third tag that identifies the resource drop zone portion of the portal page where the first draggable resource is enabled to be dropped;
wherein the tag library is used to add drag and drop functionality to the community framework by employing the first tag, the second tag and the third tag;
wherein during customizing the one or more communities, the computer reads the first tag, the second tag and the third tag and, based on reading the second tag, the computer determines which resource is draggable and based on reading the third tag, enables the first draggable resource to be dragged and dropped into the drop zone portion of the portal page; and
wherein the computer executes an action upon the dropping of the draggable resource in the resource drop zone, wherein the action causes an interlinking relationship to be established between the draggable first collaboration resource and the second collaboration resource, wherein the interlinking relationship is represented by a linking object created in the second collaboration resource, and, when the linking object is clicked on, the linking object directs the user interface to navigate from the second collaboration resource to the draggable first collaboration resource, and wherein upon the dropping of the draggable resource, the computer sends a dynamic content call to a remote server to update the resource drop zone area of the portal page with an HTML fragment, without refreshing the entire portal page.

2. The system of claim 1 wherein the action executed is a Javascript function call and wherein the resource drop zone tag further includes a Javascript function call attribute for specifying the action.

3. The system of claim 1 wherein the action is a page flow action initiated when the draggable resource is dropped and wherein the resource drop zone tag further includes a page flow action attribute for specifying the action.

4. The system of claim 1 wherein the action executed is a form action and wherein the resource drop zone tag further includes a form action attribute for specifying the action to be performed upon the drop.

5. The system of claim 1 wherein:
the repository is connected to the computer and has one or more resources stored thereon for containing community data and wherein the one or more resources is displayed on the portal page.

6. The system of claim 1 wherein a developer is capable of using the draggable resource tag and the drop zone tag to enable users to drag and drop resources in the communities framework.

7. The system of claim 1 wherein the draggable resource tag further includes a resource identifier attribute for specifying the unique identifier of the resource to be dragged and dropped.

8. The system of claim 1 further comprising:
a drag drop script tag for including the necessary Javascript libraries into the page, the Javascript libraries enabling the action to be performed.

9. The system of claim 1 further comprising:
a community accessed via the portal, the community including one or more members having access to the draggable resource and capable of sharing the draggable resource.

10. A method for dragging and dropping resources, comprising:
providing a computer having a user interface and a portal page rendered thereon;
providing a community framework on said computer that includes a set of files to allow users to create one or more communities of user members having access to a plurality of collaboration resources wherein each of the plurality of collaboration resources is associated with a node of a plurality of nodes in a repository, wherein the collaboration resources are data types including at least one of the following: a document, a group note, an announcement and an issue; said community framework further including
a draggable first collaboration resource of the plurality of collaboration resources displayed on the portal page and configured to be selected and dragged by a user;
a resource drop zone portion of the portal page associated with a second collaboration resource of the plurality of collaboration resources that specifies the targeted area where the first collaboration resource is to be dropped; and
a drag and drop tag library that comprises a first tag that is used to include the tag library into the portal page, a second tag that specifies the first draggable resource and a third tag that identifies the resource drop zone portion of the portal page where the first draggable resource is enabled to be dropped;
wherein the tag library is used to add drag and drop functionality to the community framework by employing the first tag, the second tag and the third tag;
wherein during customizing the one or more communities, the computer reads the first tag, the second tag and the third tag and, based on reading the second tag, the computer determines which resource is draggable and based on reading the third tag, enables the first draggable resource to be dragged and dropped into the drop zone portion of the portal page;
executing an action upon the dropping of the draggable first collaboration resource in the resource drop zone, wherein the action causes an interlinking relationship to be established between the draggable first collaboration resource and the second collaboration resource, wherein the interlinking relationship is represented by a linking object created in the second collaboration resource, and, when the linking object is clicked on, the linking object directs the user interface to navigate from the second collaboration resource to the draggable first collaboration resource; and sending, upon the dropping of the draggable resource, a dynamic content call to a remote server to update the resource drop zone area of the portal page with an HTML fragment, without refreshing the entire portal page.

11. The method of claim 10 wherein the action executed is a Javascript function call and wherein the resource drop zone tag further includes a Javascript function call attribute for specifying the action.

12. The method of claim 10 wherein the action is a page flow action initiated when the draggable resource is dropped and wherein the resource drop zone tag further includes a page flow action attribute for specifying the action.

13. The method of claim 10 wherein the action executed is a form action and wherein the resource drop zone tag further includes a form action attribute for specifying the action to be performed upon the drop.

14. The method of claim 10 further comprising:
providing a repository connected to the computer and having one or more resources stored thereon for containing community data and wherein the one or more resources is displayed on the portal page.

15. The method of claim 10 wherein the draggable resource tag and the drop zone tag are used by the developer to enable users to drag and drop resources in the communities framework.

16. The method of claim 10 wherein the draggable resource tag further includes a resource identifier attribute for specifying the unique identifier of the resource to be dragged and dropped.

17. A computer-readable storage medium having instructions stored thereon that when executed by one or more processors cause the one or more processors to:

provide a computer having a user interface and a portal page rendered thereon;

provide a community framework on said computer that includes a set of files to allow users to create one or more communities of user members having access to a plurality of collaboration resources wherein each of the plurality of collaboration resources is associated with a node of a plurality of nodes in a repository, wherein the collaboration resources are data types including at least one of the following: a document, a group note, an announcement and an issue; said community framework further including a draggable first collaboration resource of the plurality of collaboration resources displayed on the portal page and configured to be selected and dragged by a user;

a resource drop zone portion of the portal page associated with a second collaboration resource of the plurality of collaboration resources that specifies the targeted area where the first collaboration resource is to be dropped; and a drag and drop tag library that comprises a first tag that is used to include the tag library into the portal page, a second tag that specifies the first draggable resource and a third tag that identifies the resource drop zone portion of the portal page where the first draggable resource is enabled to be dropped;

wherein the tag library is used to add drag and drop functionality to the community framework by employing the first tag, the second tag and the third tag;

wherein during customizing the one or more communities, the computer reads the first tag, the second tag and the third tag and, based on reading the second tag, the computer determines which resource is draggable and based on reading the third tag, enables the first draggable resource to be dragged and dropped into the drop zone portion of the portal page;

execute an action upon the dropping of the draggable first collaboration resource in the resource drop zone, wherein the action causes an interlinking relationship to be associated between the draggable first collaboration resource and the second collaboration resource, wherein the interlinking relationship is represented by a linking object created in the second collaboration resource, and, when the linking object is clicked on, the linking object directs the user interface to navigate from the second collaboration resource to the draggable first collaboration resource; and send, upon the dropping of the draggable resource, a dynamic content call to a remote server to update the resource drop zone area of the portal page with an HTML fragment, without refreshing the entire portal page.

18. The system of claim 1 wherein the interlinking relationship allows a search service to search all related collaboration resources to a particular collaboration resource.

19. The system of claim 1 wherein the interlinking relationship allows the selection of a portlet to show an issue that is related to a particular collaboration resource brought up from another portlet.

* * * * *

UNITED STATES PATENT AND TRADEMARK OFFICE
CERTIFICATE OF CORRECTION

| | | |
|---|---|---|
| PATENT NO. | : 8,255,818 B2 | Page 1 of 2 |
| APPLICATION NO. | : 11/371767 | |
| DATED | : August 28, 2012 | |
| INVENTOR(S) | : Bales et al. | |

It is certified that error appears in the above-identified patent and that said Letters Patent is hereby corrected as shown below:

On sheet 7 of 29, in figure 7, Box 700, line 2, delete "resoruce" and insert -- resource --, therefor.

On sheet 17 of 29, in figure 13B, Box 1362, line 3, delete "namespase," and insert -- namespace, --, therefor.

On sheet 27 of 29, in figure 22, Box 2106, line 1, delete "Dissasembler" and insert -- Disassembler --, therefor.

In column 8, line 1, delete "get_all_issue ( )," and insert -- get_all_issues ( ), --, therefor.

In column 8, line 30, delete "lilks" and insert -- links --, therefor.

In column 13, line 26, delete "<lssue>" and insert -- <Issue> --, therefor.

In column 15, line 44, delete "newtype," and insert -- newType, --, therefor.

In column 17, line 10, delete "alltogether." and insert -- altogether. --, therefor.

In column 22, line 51, delete "contenType" and insert -- contentType --, therefor.

In column 22, line 56, delete ""ne tui"%>" and insert -- "netui"%> --, therefor.

In column 23, line 27, delete "dcContainerld" and insert -- dcContainerId --, therefor.

In column 23, line 31, delete "dcContainerld" and insert -- dcContainerId --, therefor.

In column 23, line 41, delete "dcContainerld" and insert -- dcContainerId --, therefor.

In column 23, line 48, delete ""descriptio n"/>" and insert -- "description"/> --, therefor.

Signed and Sealed this
Eighteenth Day of December, 2012

David J. Kappos
*Director of the United States Patent and Trademark Office*

CERTIFICATE OF CORRECTION (continued)
U.S. Pat. No. 8,255,818 B2

In column 33, line 31, delete "Java" and insert -- java --, therefor.

In column 35, line 20, delete "active menus" and insert -- activemenus --, therefor.

In column 35, line 24, delete "menuItem" and insert -- menuItem --, therefor.

In column 36, line 13, delete "menuItem" and insert -- menuItem --, therefor.

In column 36, line 24, delete "classs" and insert -- class --, therefor.

In column 36, line 51, delete "menuItem" and insert -- menuItem --, therefor.

In column 38, line 17, delete "use" and insert -- user --, therefor.

In column 39, line 8, delete "HMTLUnit" and insert -- HTMLUnit --, therefor.

In column 39, line 45, delete "dissassembler" and insert -- disassembler --, therefor.

In column 43, line 37, delete "argumens" and insert -- arguments --, therefor.

In column 43, line 45, delete "Contstruct" and insert -- Construct --, therefor.

In column 43, line 49, delete "Contstruct" and insert -- Construct --, therefor.